US006542262B1

(12) United States Patent
Tachibana et al.

(10) Patent No.: US 6,542,262 B1
(45) Date of Patent: Apr. 1, 2003

(54) SCANNER DEVICE AND CONTROL METHOD THEREOF, AND FILM FEEDING DEVICE

(75) Inventors: Kiyoshi Tachibana, Tokyo (JP); Takanori Kodaira, Yokohama (JP); Makoto Miyawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/025,088

(22) Filed: Feb. 17, 1998

(30) Foreign Application Priority Data

| Feb. 19, 1997 | (JP) | 9-034660 |
| Feb. 19, 1997 | (JP) | 9-035356 |
| Feb. 19, 1997 | (JP) | 9-035357 |
| Feb. 19, 1997 | (JP) | 9-035358 |
| Feb. 19, 1997 | (JP) | 9-035359 |
| Feb. 19, 1997 | (JP) | 9-035360 |
| Feb. 19, 1997 | (JP) | 9-035370 |

(51) Int. Cl.[7] .................................. H04N 1/04
(52) U.S. Cl. ......................... 358/487; 358/506
(58) Field of Search ........................ 358/487, 474, 358/404, 408, 444, 468, 506, 7.17, 296; 382/318

(56) References Cited

U.S. PATENT DOCUMENTS

| 4,656,524 A | | 4/1987 | Norris et al. ............... 358/280 |
| 5,212,512 A | | 5/1993 | Shiota ......................... 354/319 |
| 5,337,164 A | * | 8/1994 | Yabe .......................... 358/487 |
| 5,523,876 A | | 6/1996 | Tellam et al. ............... 359/196 |
| 5,541,644 A | * | 7/1996 | Nanba ......................... 348/96 |
| 5,568,225 A | | 10/1996 | Tazawa et al. ................ 355/75 |
| 5,576,836 A | | 11/1996 | Sano et al. .................. 359/196 |
| 5,754,314 A | * | 5/1998 | Araki ......................... 358/487 |
| 6,025,934 A | * | 2/2000 | Matsumoto ................. 358/474 |
| 6,049,392 A | * | 4/2000 | Kida ......................... 358/1.17 |
| 6,195,182 B1 | * | 2/2001 | Kunishige .................. 358/488 |

FOREIGN PATENT DOCUMENTS

| JP | 08037566 | 2/1996 | ............ H04N/1/04 |
| JP | 08167973 | 6/1996 | .......... H04N/1/100 |
| WO | WO97/00572 A | 1/1997 | |

* cited by examiner

Primary Examiner—Jerome Grant, II
Assistant Examiner—Negussie Worku
(74) Attorney, Agent, or Firm—Morgan & Finnegan, LLP

(57) ABSTRACT

In order to accurately perform correction of focal distance and color of film before pre-scanning, the image at the generally center area of the first frame of film is read in a first pre-scan, auto-focusing and judgment between negative/positive is made, exposure parameters are set in a second pre-scanning, and the image is read in main scanning.

28 Claims, 33 Drawing Sheets

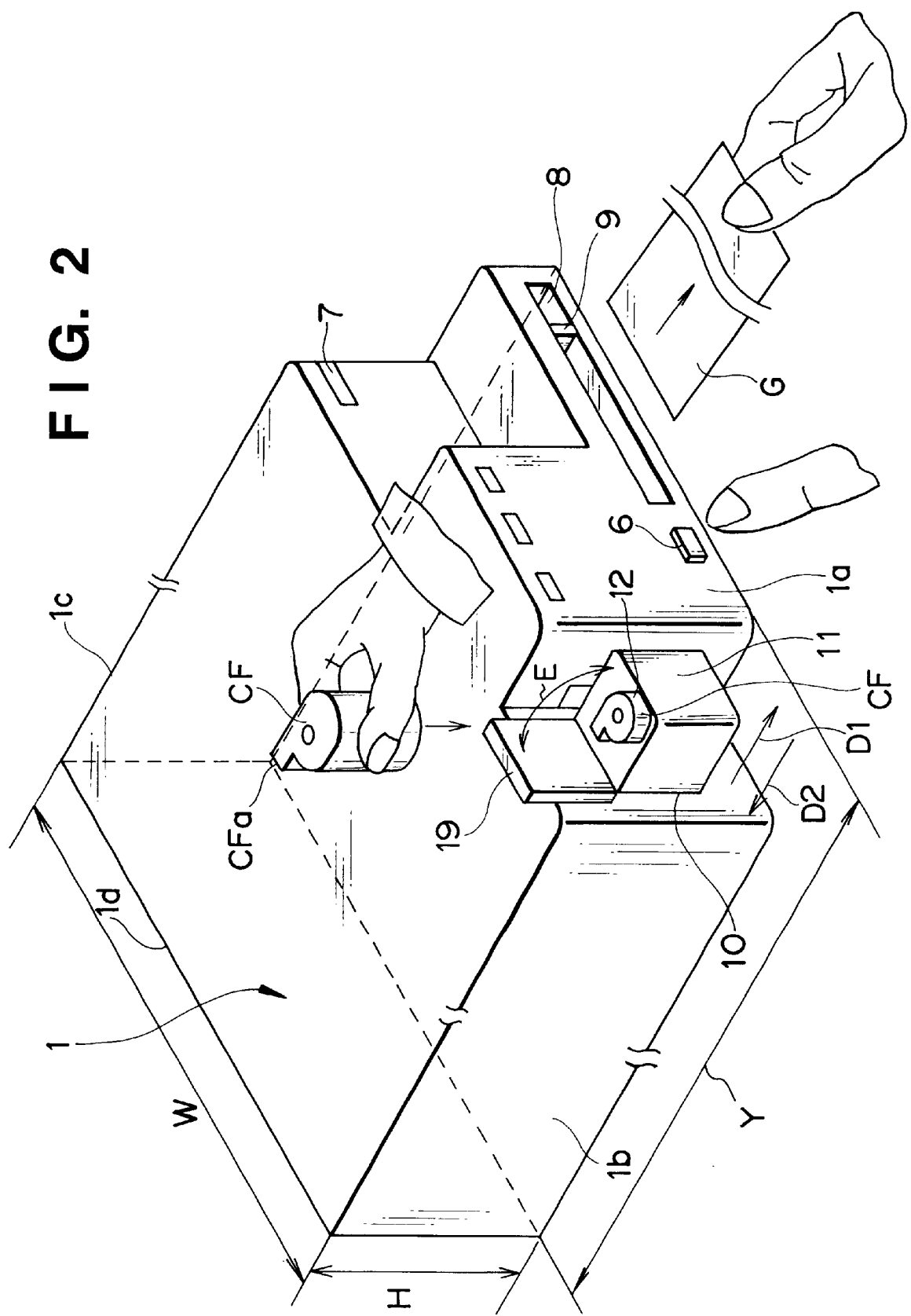

SCANNER DEVICE AND CONTROL METHOD THEREOF, AND FILM FEEDING DEVICE

BACKGROUND OF THE INVENTION

1. Field of the Invention

The present invention relates to a scanner device which reads film of a predetermined format and a control method thereof, and a film feeding device.

2. Description of Related Art

Services are currently available for users to have laboratory shops process negative or positive developed silver-salt-type film (135 mm film) by cutting the film in strips of six frames which are stored in negative sheets and returned to the user along with the prints, or mounting the film one frame at a time in mounts for use with a projector.

On the other hand, there is a new-standard film which is developed silver-salt-type film stored within a case which provides users with a service wherein a 40-exposure film for example is developed and processed in the laboratory shop, and following exposure, the film is wound again into the light-shielding case and stored therein, and the user is provided with a so-called index print on which all of the photographed frames are printed with the index numbers thereof.

Also, such developed silver-salt-type film of printed photographs can be read into a computer using a specialized scanner device which reads images with a photo-electric converting device, following which the image data can be output after certain processing, using various types of digital output devices such as ink-jet printers. Thus, users can obtain printed photographs without relying on laboratory shops. However, achieving such an arrangement is difficult in reality, since a great number of types and formats of scanners are required for scanner-reading and computer processing of all images on silver-salt-type film including 135 mm film, and reversible film mounted in slide mounts, resulting in a large system.

A known scanner device which handles two types of film, namely film strips and film stored in cartridges is disclosed in Japanese Patent Laid-Open No. 5-145838. However this arrangement is insufficient in handiness since attachments must be changed in order to deal with a plurality of film types, and the operator must make his/her own judgment whether or not a film is being processed.

Further, this arrangement is insufficient in that electrical circuit are required for each switch in the event that an opening/closing switch for mounting film stored in a cartridge and a force-eject switch for forcibly ejecting film being processed are separately provided, and the switching circuitry including the layout becomes complicated.

Now, the new-standard film is handled by the user and operator in the state of the film being wound and stored within the case, and ease of loading to cameras is the greatest advantage thereof.

U.S. Pat. No. 4,841,319 discloses a thrust-type film cartridge. This film cartridge is configured such that the film is ejected from a film ejecting opening by opening a light-shielding door provided to the ejecting opening and rotating a film supplying spool within the film cartridge. The new-standard film is approximately of the same construction.

Film feeding mechanisms for devices which use this thrust-type cartridge (i.e., cameras) include such as proposed in Japanese Patent Laid-Open No. 4-86633, for example, constructed such that the film is fed by driving with a roller, and the amount of film feeding is detected by the amount of roller rotation, following which driving force to the roller is cut off.

Also, the thrust-type cartridge returns to the user in the state that the film is completely wound within the cartridge following developing of the film, as well.

Accordingly, scanner devices which handle new-standard film comprised of developed silver-salt-film stored in a case must also provide ease of use, the same as the cameras.

The film which is extracted from the new-standard film case and sequentially run by a scanner is comprised to be rewound into the case following the reading thereof at the photo-electric conversion reading unit, but it cannot be said that there is no chance of trouble such as jamming occurring due to unforeseen causes, so damage to the film must be minimal in the event that such trouble does occur.

Accordingly, in the case of scanning film with a film scanner, the film must be fed from the cartridge, and the film must be fed at a constant speed. To this end, an actuator appropriate for constant-speed feeding such as a step motor or the like is employed, and a method is employed wherein the driving force thereof is transferred to a roller in the same manner as with a camera to feed the film.

Now, regarding the thrust-type cartridges, the film must be returned to the user in a completely wound state, following reading of the film with a film scanner, as well. In other words, the film is subjected to a process of being ejected from the cartridge (wound) within the film scanner and a process of being rewound within the cartridge.

Accordingly, it is desirable that scanning can be performed at both the time of winding the film and rewinding the film. Such an arrangement allows for pre-scanning to be performed at the time of winding the film so as to detect the state of the images and set the reading conditions thereof, and perform actual scanning at the time of rewinding. It is necessary to make the feeding speed of the film constant at the time of winding and at the time of rewinding and also prevent any warping from occurring in the film, in order to perform such bi-directional scanning.

Now, with the method wherein the film is fed by spool driving, such as proposed in Japanese Patent Laid-Open No. 4-69634, the outer diameter grows greater as the spool winds the film, resulting in the problem that accurate film feeding cannot be carried out.

Now, known original document transporting type scanner devices use silicon-elastomer rubbers for the cylindrical elastic portion of the driving roller for transporting the originals, so as to obtain desired friction.

Such silicon-elastomer rubbers are used in various devices, since the desired resistance can be obtained thereby, and such can be manufactured relatively inexpensively.

However, such silicon-elastomer rubbers have viscosity, which causes problems of adhesion of dust, and in cases the adhered dust may accumulate and be transferred into the surface of the original or onto the film, which has been seriously problematic in the event that the original or film is read with such dust thereupon.

Also, the known scanner device has independently provided a sensor for detecting whether or not a film strip has been mounted and a sensor for reading bar-code data provided to the film strip relating to the film are provided separately, so electrical circuits are required for each sensor, and the sensor circuitry including the layout becomes complicated, meaning that this arrangement falls short in this aspect also.

SUMMARY OF THE INVENTION

The present invention has been made to solve the aforementioned problems of the known art, and it is an object thereof to provide a scanner device capable of easily handling cartridge film in which developed silver-salt-type film is stored within a case, wherein damage to the film can be kept at a minimal level in the event of trouble.

It is another object of the present invention to deal with the above problems by providing a scanner device, a continuous film transporting unit, and a slide transporting unit, capable of handling both: continuous silver-salt-type film comprised of a plurality of continuous frames of developed film; and individual silver-salt-type film of single frames.

It is yet another object of the present invention to deal with the above problems by providing a scanner device capable of doing away with contamination and damage to the image surface in the event that the following are performed: reading an image while scanning negative or positive developed silver-salt-type film; reading an image while scanning a reflective original document; and reading an image while scanning cartridge film in which developed silver-salt-type film is stored within a case.

It is a further object of the present invention to deal with the above problems by providing a scanner device capable of handling all of the following while excelling in operability: negative or positive developed silver-salt-type film; reflective original documents; and cartridge film in which developed silver-salt-type film is stored within a case.

It is a still further object of the present invention to deal with the above problems by providing a scanner device and a control method thereof wherein a plurality of types of film can be easily mounted, and the operator can be warned by forbidding processing of other film while one film is being processed.

It is another object of the present invention to deal with the above problems by providing a scanner device wherein the open/close switch for the film mounting unit and a forced termination switch are shared, so as to prevent erroneous operation and to reduce costs by simplifying the switch circuitry.

It is yet another object of the present invention to deal with the above problems by providing a scanner device capable of reducing costs by simplifying the sensor circuitry.

It is a further object of the present invention to deal with the above problems by providing a film feeding device enabling winding and rewinding of film at a constant speed without allowing flexing of the film, and also to provide a film reading device having the film feeding device.

In order to solve the above problems and achieve the objects, the construction of the scanner device according to the present invention is as follows:

A scanner device comprises: an image reading unit for performing photo-electric conversion while performing relative movement of an image of cartridge film in which developed silver-salt-type film is stored in a case as to said image reading unit; a base which forms the external form of said scanner device; and transporting means for moving said cartridge film in a direction generally orthogonal to a same plane which includes the front surface of said base in order to transport said cartridge film as to said image reading unit relatively; wherein the structure is such that said cartridge film can be loaded and ejected from the same plane including said front surface. This is a first aspect according to the present invention.

Also, the scanner device according to the present invention has the following configuration:

A scanner device comprises: a first image reading unit for performing photo-electric conversion while performing relative movement of an image of negative or positive developed silver-salt-type film as to said first image reading unit; a second image reading unit for performing photo-electric conversion while performing relative movement of an image of a reflective original document to the second image reading unit; and a third image reading unit for performing photo-electric conversion while performing relative movement of an image of cartridge film in which developed silver-salt-type film is stored in a case. This is a second aspect according to the present invention.

Also, the scanner device according to the present invention has the following configuration:

A scanner device comprises: an image reading unit for performing photo-electric conversion of images recorded on cartridge film comprising developed silver-salt-type film stored in a case; a mounting unit for mounting said cartridge film; and a transporting unit for transporting said cartridge film as to said image reading unit; wherein the mounting direction of said cartridge film to said mounting unit and the transporting direction of said cartridge film by said transporting unit is generally the same. This is a ninth aspect according to the present invention.

Also, the scanner device according to the present invention has the following configuration:

A scanner device comprises: an image reading unit for performing photo-electric conversion while running developed continuous silver-salt-type film of a plurality of continuous frames or individual silver-salt-type photography film of a single frame; a base which forms the external form of said scanner device; and transporting means for running said continuous silver-salt-type film or individual silver-salt-type film as to said image reading unit, so as to allow loading and ejecting thereof from the same plane including said front surface of said base. This is a tenth aspect according to the present invention.

Also, the continuous film transporting unit used in the scanner device according to the present invention has the following configuration:

cl13 A continuous film transporting unit to be used with a scanner device comprising an image reading unit for performing photo-electric conversion while running developed continuous silver-salt-type photography film of a plurality of continuous frames; wherein the continuous silver-salt-type film is run as to the image reading unit; and wherein loading and ejecting thereof from the front surface of the scanner device is facilitated. This is a thirteenth aspect according to the present invention.

Also, the slide film transporting unit used in the scanner device according to the present invention has the following configuration:

A slide film transporting unit to be used with a scanner device comprising an image reading unit for performing photo-electric conversion while running developed individual silver-salt-type photography film of a single frame; wherein the individual silver-salt-type film is run as to the image reading unit; and wherein loading and ejecting thereof from the front surface of the scanner device is facilitated. This is a fourteenth aspect according to the present invention.

Also, the scanner device according to the present invention has the following configuration:

A scanner device comprises: a first image reading unit for performing photo-electric conversion while running negative or positive developed silver-salt-type film; a second image reading unit for performing photo-electric conversion while performing running a reflective original document; a third image reading unit for performing photo-electric conversion while running cartridge film in which developed silver-salt-type film is stored in a case; first transporting means for running the silver-salt-type film as to the first image reading unit; second transporting means for relatively moving the reflective original document as to the second image reading unit; third transporting means having a transporting unit for running the cartridge film to the third image reading unit; and rollers of a cylindrical elastic urethane rubber member formed integrally with a shaft provided to each of the first transporting means, the second transporting means, and the third transporting means, and used as a transporting roller subjected to predetermined driving. This is a fifteenth aspect according to the present invention.

Also, the scanner device according to the present invention has the following configuration:

A scanner device comprises: a first image reading unit for performing photo-electric conversion of light from negative or positive developed silver-salt-type film; a second image reading unit for performing photo-electric conversion of light from a reflective original document; a third image reading unit for performing photo-electric conversion of light from cartridge film in which developed silver-salt-type film is stored in a case; a base which forms the external form of the scanner device; first transporting means for relatively moving an image of said silver-salt-type film as to the first image reading unit; second transporting means for relatively moving an image of said reflective original document as to the second image reading unit; and third transporting means for relatively moving an image of said cartridge film to the third image reading unit; wherein the above are provided to a single plane including the front surface of the base, thus enabling the silver-salt-type film and the reflective original document and the cartridge film to be loaded and ejected from the front surface and the same plane. This is a seventeenth aspect according to the present invention.

Also, the scanner device according to the present invention has the following configuration:

A scanner device comprises: a first image reading unit for performing photo-electric conversion of light from negative or positive developed silver-salt-type film; a second image reading unit for performing photo-electric conversion of light from a reflective original document; a third image reading unit for performing photo-electric conversion of light from cartridge film in which developed silver-salt-type film is stored in a case; a base which forms the external form of the scanner device; first transporting means for relatively moving an image of said silver-salt-type film as to the first image reading unit; second transporting means for relatively moving an image of said reflective original document as to the second image reading unit; and third transporting means for relatively moving an image of said cartridge film to the third image reading unit; wherein the above are provided to the front surface of the base, thus enabling the silver-salt-type film and the reflective original document and the cartridge film to be loaded and ejected from the front surface; and wherein the scanner device further comprises optical path changing means for selectively setting between the optical axis between the first image reading unit and the first transporting means and the optical axis between the third image reading unit and the third transporting means, in order to share the photo-electric converting device and optical system provided to the first image reading unit and the third image reading unit. This is a twenty-fourth aspect according to the present invention.

Also, the scanner device according to the present invention has the following configuration:

A scanner device which reads images of a plurality of film formats as image data comprises: a plurality of film mounting means capable of mounting images of the plurality of formats of film each at differing positions; a plurality of image processing means for reading the images of each film mounted to the film mounting means as image data; a plurality of detecting means for detecting whether or not film is mounted to each of the film mounting means; and forbidding means for forbidding image data reading of another film by the image processing means, in the event that one of the detecting means detects mounted film. This is a twenty-fifth aspect according to the present invention.

Also, the scanner device according to the present invention has the following configuration:

A scanner device which reads images of a plurality of film formats as image data comprises: first film mounting means capable of mounting film of a first format; second film mounting means capable of mounting film of a second format; third film mounting means capable of mounting film of a third format; first image processing means for reading as image data the image of the film of the first format mounted to the first film mounting means; second image processing means for reading as image data the image of the film of the second format mounted to the second film mounting means; third image processing means for reading as image data the image of the film of the third format mounted to the third film mounting means; first film detecting means for detecting whether or not film of the first format is mounted to the first film mounting means; second film detecting means for detecting whether or not film of the second format is mounted to the second film mounting means; third film detecting means for detecting whether or not film of the third format is mounted to the third film mounting means; and forbidding means for forbidding reading of image data by the second and the third image processing means, in the event that the first detecting means detects mounted film of the first format. This is a twenty-eighth aspect according to the present invention.

Also, the scanner device according to the present invention has the following configuration:

A scanner device which reads images of a plurality of film formats as image data, the scanner device comprising: first film mounting means capable of mounting film of a first format; second film mounting means capable of mounting film of a second format; third film mounting means capable of mounting film of a third format; first image processing means for reading as image data the image of the film of the first format mounted to the first film mounting means; second image processing means for reading as image data the image of the film of the second format mounted to the second film mounting means; third image processing means for reading as image data the image of the film of the third format mounted to the third film mounting means; first film detecting means for detecting whether or not film of the first format is mounted to the first film mounting means; second film detecting means for detecting whether or not film of the second format is mounted to the second film mounting means; third film detecting means for detecting whether or not film of the third format is mounted to the third film mounting means; and ejecting means, wherein in the event that the first detecting means detects mounted film of the first format and film is mounted to the second or the third film mounting means, the image reading by the first image processing means is terminated, and the film of the first format is ejected. This is a twenty-ninth aspect according to the present invention.

Also, the scanner device according to the present invention has the following configuration:

A scanner device which reads images of a plurality of film formats as image data, the scanner device comprising: a plurality of film mounting means capable of mounting images of the plurality of formats of film each at differing positions; a plurality of image processing means for reading the images of each film mounted to the film mounting means as image data; and opening/closing means for opening or closing the film mounting means corresponding with film of a predetermined format at the time of mounting the film of the predetermined format; wherein, in the event that the opening/closing means is operated during reading of image data by the image processing means, the reading of image data undergoing processing is terminated. This is a thirty-fourth aspect according to the present invention.

Also, the control method for the scanner device according to the present invention has the following configuration:

A control method for a scanner device which reads images of a plurality of film formats as image data, the scanner device comprising a plurality of film mounting means capable of mounting images of the plurality of formats of film each at differing positions, a plurality of image processing means for reading the images of each film mounted to the film mounting means as image data, and a plurality of detecting means for detecting whether or not film is mounted to each of the film mounting means; wherein, in the event that one of the detecting means detects mounted film, reading of the image data of other film by the image processing means is forbidden. This is a fortieth aspect according to the present invention.

Also, the scanner device according to the present invention has the following configuration:

A scanner device which reads images of a plurality of film formats as image data comprises: film mounting means capable of mounting film of a predetermined format; and detecting means provided near the film mounting opening of the film mounting means for detecting whether or not film is mounted to the certain film mounting means; wherein the detecting means reads data relating to the film provided upon the film, in the event that film of the predetermined format is mounted to the film mounting means. This is a forty-third aspect according to the present invention.

Also, the film feeding device according to the present invention has the following configuration:

A film feeding device comprises: a winding spool for winding film extracted from a film cartridge; spool driving means for driving an in-cartridge spool provided within the film cartridge in the direction of rewinding the film; and a feeding roller for feeding the film in the direction for winding the film and the direction for rewinding the film, between the winding spool and the film cartridge; further comprising speed controlling means for controlling the film winding speed by the winding spool at the time of winding film to a speed which is faster than film feeding by the feeding roller, and for controlling the film rewinding speed by the spool driving means and the in-cartridge spool at the time of rewinding film to a speed which is faster than film feeding by the feeding roller. This is a forty-seventh aspect according to the present invention.

Also, the film feeding device according to the present invention has the following configuration:

A scanner device comprises: the film feeding device; and reading means for reading images from film positioned between the driving fork and the feeding roller. This is a fifty-first aspect according to the present invention.

Other objects and advantages besides those discussed above shall be apparent to those skilled in the art from the description of the preferred embodiments of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is an external perspective view of the scanner device relating to an embodiment of the present invention;

DETAILED DESCRIPTION OF THE PREFERRED EMBODIMENTS

The following is a detailed description of the preferred embodiments of the present invention, with reference to the attached drawings. First, FIG. 1 is an external perspective view relating to the embodiments, showing the overall construction of the system for using the scanner device 1.

Figure 1:
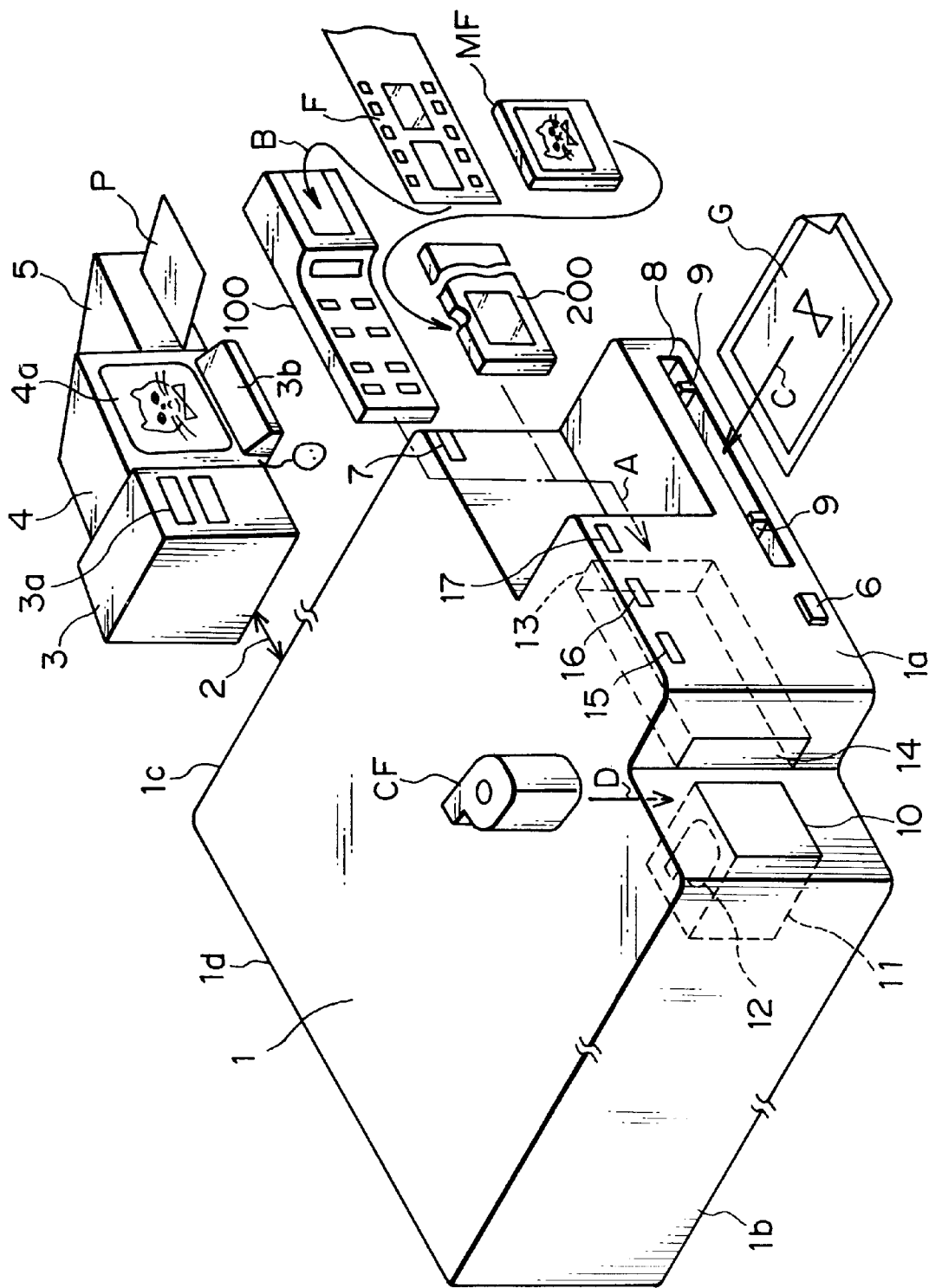
FIG. 1 is an overall constructional view of the usage state of the scanner device relating to an embodiment of the present invention.

In the Figure, there are various types of use of the scanner device 1, but a representative method of use thereof will be briefly described with reference to the overall constructional diagram of the system as shown in FIG. 1.

This scanner device 1 performs the following operations: (i) performs main scanning and sub-scanning of a negative or positive image recording medium on which a color or monochrome analog image is recorded; (ii) performs analog/digital conversion of the analog image obtained by photo-electric conversion of an image recorded on an image recording medium, by means of a photo-electric converter including a built-in high-resolution line image sensor; (iii) sends the digital signals obtained by this A/D conversion to an image processing unit 3a of a personal computer 3 via an interface cable 2 such as a SCSI cable or the like; (iv) the user confirms the read image on the screen 4a of the display device 4 which is a monitor device, and changes the image as desired by operating the operating unit 3b which includes a mouse, keyboard, etc., to synthesize, enlarge, reduce, paste, etc.; and (v) outputs the image thus obtained in color or monochrome on recording sheets of a certain size including standard paper by means of a recording device 5 including ink-jet printers, thus obtaining a recorded sheet P recorded with the image recorded at a desired size.

With the above-described as a basic usage form, the formats of image recording medium carrying analog images which can be handled with this scanner device 1 are can be generally divided into the following four groups:

First, a first image recording medium is negative and positive film F used for silver-salt-type cameras which are in widespread use today. For example, a 36-exposure developed strip of 135 mm film is cut into strips of 6 continuous frames, each strip being the same length, and stored in a negative sheet case and handed to the user along with the prints.

Consideration has be made so that the scanner device is capable of structurally handling 36-exposure 135 mm film which has not yet been cut into 6-frame slits, as well.

On the other hand, a second image recording medium is mounted film MF which is comprised of developed positive (reversible) film cut in single frames and mounted in slide frames to enable use mainly with slide projectors.

Also a third image recording medium is color or monochrome silver-salt photographs and various printed materials, these being reflective original documents G from which an analog image recorded on the surface thereof is read by reflection, such as an original document G of a panorama photograph which is inserted in the longitudinal direction in the direction of the arrow and is read.

Finally, a fourth image recording medium cartridge film CF corresponding to the Advanced Photo System. This Cartridge film CF is known art, but to make a brief description thereof, a 40-exposure film for example is wound on a built-in spool and stored in a case which shields the film from external light. The film is stored again in the case in a wound state following camera photography and processing by a laboratory shop, the user being provided with the film along with a so-called index print which has all of the frames printed with index numbers. Accordingly, the user indicates the desired index numbers in order to obtained the desired photographs. This film is capable of recording photography conditions and the like using electromagnetic means along with the image, and the user indicates this information when scanning the image.

This scanner device 1 is capable of handling all of the above first through fourth image recording mediums. The following is a schematic description of the operation procedures of each of the image recording mediums, with reference to FIG. 1.

First, in order to handle the film F which includes 135 mm film which is the first image recording medium, the continuous film unit 100 is used. This continuous film unit 100 is structure so as to be automatically mountable to the scanner device 1.

Accordingly, the continuous film unit 100 is provided so as to be insertable in the direction shown by an arrow A from the right opening portion 13 shown by broken lines, provided so as to open to the right and left as shown in the Figure at the front 1a of the scanner device 1. In the event that the presence of the continuous film unit 100 is detected by an optical sensor which also serves as a bar-code reader for barcode provided to the top and bottom portions of the film, this sensor being the sensor k3 provided near the right opening 13 of the device 1, a later-described built-in motor m2 is automatically activated upon reception of the second detection results, so that the inserted tip of the continuous film unit 100 is transported to the left opening 14 shown with solid lines, and the arrangement is such that the unit 100 automatically stops at the left opening 14.

Following mounting of this continuous film unit 100 to the device 1, preliminary sub-scanning of the film F is performed by manually setting a negative or positive film F of six continuous frames in the unit 100 in the direction indicated by the arrow B. The film F is transported in the reverse direction so as to perform sub-scanning of the image recording medium upon which the analog image is recorded, (i) main scanning and sub-scanning of the image recording medium upon which the analog image is recorded is performed, (ii) photo-electric conversion of the analog image recorded on the film F is performed by means of the photo-electric conversion including the aforementioned built-in high-resolution line image sensor while performing, the operations of (iii) through (v) are performed, and thus obtaining a recorded sheet P of output on recording sheets of a certain size including standard paper by means of a recording device 5 including ink-jet printers. Accordingly, this continuous film unit 100 is indispensable.

Also, in order to handle slide-mounted film MF of film mounted in a slide mount which is the second image recording medium, the slide film unit 200 is used in the state of the above continuous film unit 100 being removed from the device 1.

This slide film unit 200 is constructed such that six slide-mounted films MF can be set from the upper opening thereof such that each are retained in certain positions. The overall length thereof is slightly linger than that of six frames of continuous film F, and the width dimensions ahead of and behind the slide film unit 200 is set at approximately 5 mm.

On the other hand, the width dimensions of the above continuous film F is around 0.15 mm, meaning that the later-described transporting functions are necessary for both.

This slide film unit 200 can be automatically mounted to the scanner device 1 in the same manner as with the above continuous film unit 100, and accordingly, is provided so as to be insertable in the direction shown by an arrow A from the right opening portion 13 shown by broken lines, provided so as to open to the right and left as shown in the Figure at the front 1a of the scanner device 1. In the event that the presence of the slide film unit 200 is detected by the optical sensor provided near the right opening 13 of the device 1, the built-in motor is automatically activated upon reception of the detection results.

Consequently, the slide film unit 200 is transported to the left in the drawing to an appropriate position via the left opening 14 illustrated in the Figure in solid lines, and preliminary sub-scanning of the six mounted films MF in the slide mounts is performed by transporting in the reverse directions so as to perform sub-scanning. For example, preliminary sub-scanning of six of the mounted films MF set in slide mounts is performed, (i) the mounted films are transported in the reverse direction to perform sub-scanning, (ii) photo-electric conversion of the analog image is performed by means of the photo-electric converter including the aforementioned built-in high-resolution line image sensor, the operations of (iii) through (v) are performed, thus obtaining a recorded sheet P of output on recording sheets of a certain size including standard paper by means of a recording device 5 including ink-jet printers. Incidentally, the image formed on the emulsion surface of the film F mounted to the continuous film unit 100 and transported, and the image formed on the emulsion surface of the mounted film MF set to the slide film unit 200 differ in distance from the image reading surface of the later-described line image sensor, so the a converging lens is provided with an automatic focusing mechanism. Accordingly, accurate focusing of the image can be performed even in the event that the film F and the mounted film MF are each set backwards.

Also, the reflective original document G which is a third image recording medium includes original documents which are quite long in the sideways direction, such as panorama photographs and the like. The device 1 is constructed such that such original documents G and standard so-called service-size print photographs can be inserted in the direction of the arrow C in the document inserting/ejecting opening 8 provided to the lower portion of the front 1a of the device 1 as shown in the Figure, whereby the original document is automatically drawn in and read. After the reading operation, the original document is then ejected from the same inserting/ejecting opening 8.

Accordingly, the external dimensions of the device 1 following the forward/rear directions are determined with consideration to the dimensions of panorama photographs following the longitudinal dimensions thereof. Provided to this inserting/ejecting opening 8 are original width adjusting plates 9 which are original width adjusting plates 9 which restrict the original document G in the width direction, these being arranged according to known arrangement such that moving one or both causes the plates to either be removed from a center position.

The cartridge film CF which is the fourth image recording medium is set in the direction shown by the arrow D to the cartridge film mounting unit 11 provided next to the left opening 14 in the front 1a of the device 1 as shown in broken lines in the Figure. Accordingly, the device 1 is provided with an opening 10 for allowing the mounting unit 11 to move forwards and backwards, so as to allow for storage of the cartridge film cartridge CF via the mounting hole 12 formed in the mounting unit 11, following forward movement as described later.

Next, an indicator 7 comprised of a light-emitting diode or the like which is continuously lit according to the state of the main power being switched on to serve as an indicator for indicating the on/off state of the main electrical power switch provided to the rear 1d or the side 1b or 1c of the device 1 is provided to a portion to the upper right corner of the front 1a of the device 1 which does not interfere with the above units 100 or 200 when mounted.

Also, provided to the front 1a between the above left and right openings 13 and 14 is an indicator 15 which indicates the reading operation state of cartridge film, an indicator 16 which indicates the reading operation state of standard film F including 135 mm film and mounted film MF, and an indicator 17 which indicates the reading operation state of original documents G, these indicators being arrayed from the left to the right respectively, each constructed so as to indicate each mode as follows: a solid green for a waiting state, a blinking green for a normal operating state, and a blinking red for an abnormal state such as incorrect operation such as jamming.

Formed below these indicators 15, 16, and 17 is an eject switch 6 to be pressed in order to move the cartridge film Cartridge film mounting unit 11 from the opening 10 toward the front of the device 1.

FIG. 2 is an external perspective view of the device 1, showing the state wherein reading of an original has been completed and the eject switch 6 has been pressed.

In the Figure, the constructions which have already been described with reference to FIG. 1 are denoted with the same reference numerals and description thereof will be omitted, with description being limited to unexplained portions. At the point that the eject switch 6 is pressed, a later-described mounting unit moving mechanism is activated, and the mounting unit 11 of the cartridge film CF is moved toward the front of the device 1 in the direction of the arrow D1 via the opening 10, so as to fill the left opening 14. Accordingly, in this state, other mediums, i.e., film F or mounted film MF can not be accepted, at least visually.

In the state shown in the Figure, a lid 19 provided above the mounting unit 11 and axially borne is rotated in the direction of the arrow, so that the cartridge film CF film extracting opening CFa can face the device, regarding the mounting hole 12 of the mounting unit 11. This resembles the film loading system for Advanced Photo System cameras, so users can use without feeling difficult.

Once set in the mounting hole 12, the cartridge film CF is detected by a micro switch built into the mounting unit 11, this detection causing the mounting unit moving mechanism to operate, moving the mounting unit 11 in the direction of the arrow D2, and at the same time the lid 19 closes.

The external dimensions of the device 1 defined by the width dimensions W and depth dimensions Y and height dimensions H are such that take into consideration usage in the state of a flatbed-type scanner for an A4 size document, for example. Accordingly, the mounting operations of the above various mediums can be all performed from the front 1a side of the device 1, in the case that a flatbed-type scanner is mounted. Also, consideration is taken so that the overall height is small when a flat-bed-type scanner is mounted.

In other words, each of the later-described transporting systems and optical systems are set according to such considerations.

Incidentally, regarding the preset embodiment, the arrangement is such that each of the units are mounted from the right, taking into consideration the face that the majority of people are right-handed, but it is needless to say that the device can be set to appropriately deal with left-handed people.

Figure 3A:
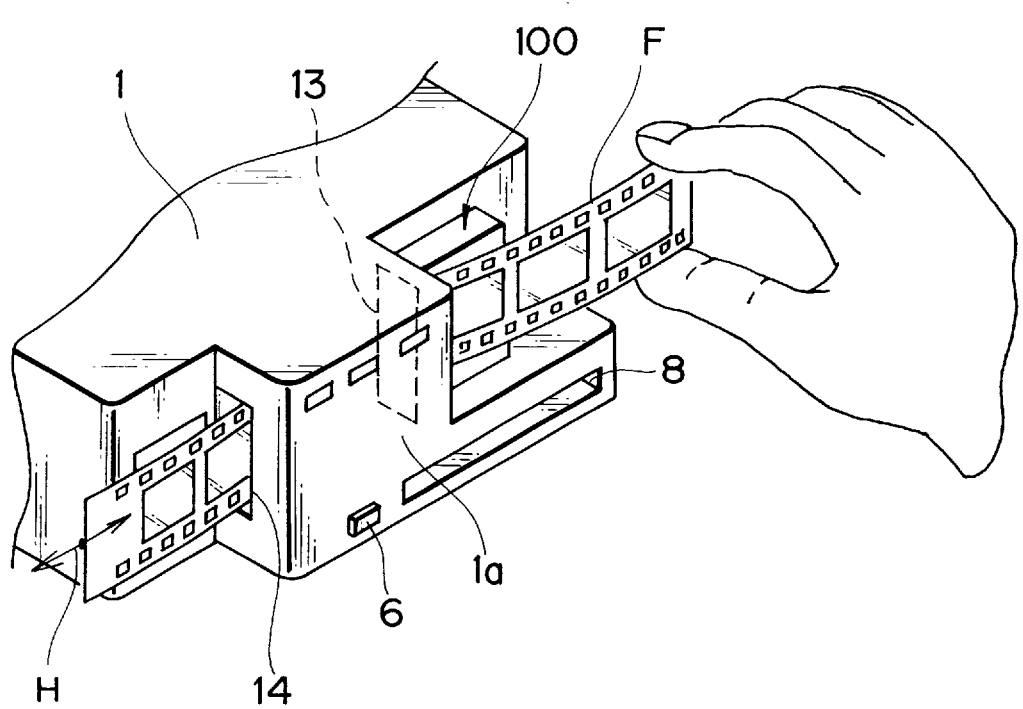
FIG. 3A is an external perspective view illustrating the usage state of a continuous film unit 100.
Figure 3B:
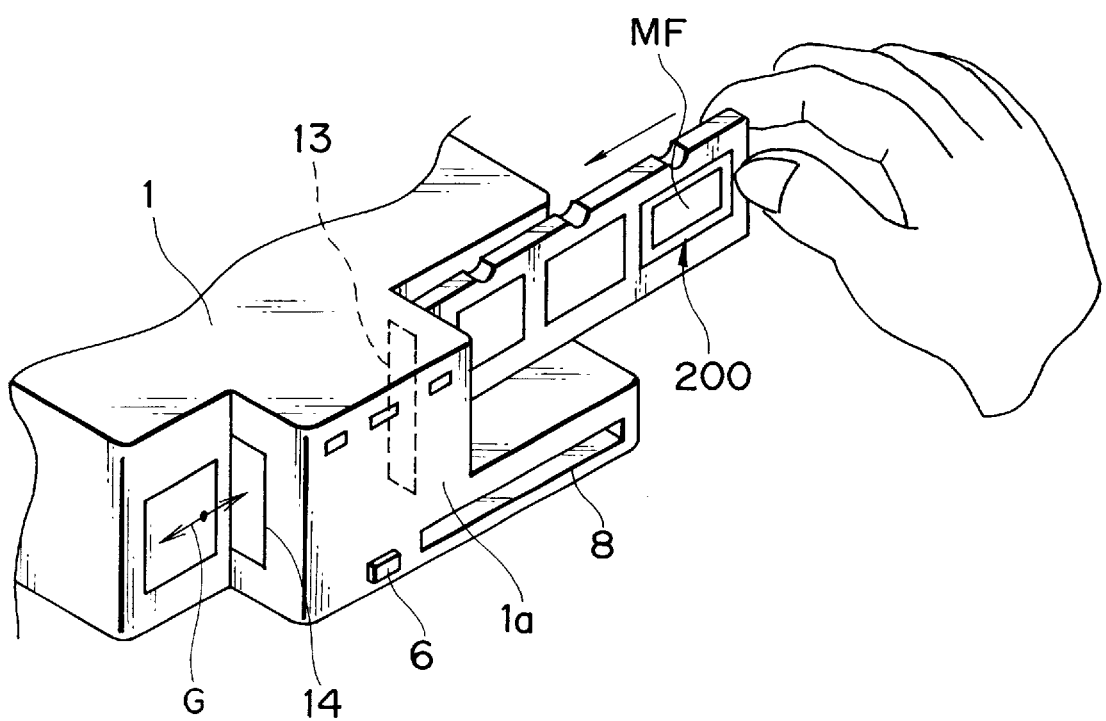
FIG. 3B is an external perspective view illustrating the usage state of a slide film unit 200.

Next, FIG. 3A is an external perspective view illustrating the state of the continuous film unit 100 mounted to the device 1, and FIG. 3B is an external perspective view illustrating the state of the slide film unit 200 mounted to the device 1.

First, in FIG. 3A, once the continuous film unit 100 is mounted via the right opening 13 shown by broken lines to the device 1 and is automatically moved to the predetermined position, the resultant state is such as shown in the Figure. Now, the operator holds the certain film F including 135 mm film so as not to directly touch the image surface, and sets the film in the continuous film unit 100. The film F is then transported in the reverse direction (arrow H) from the left opening 14 and sub-scanning thereof is performed.

Also, in FIG. 3B, once the slide film unit 200 set with up to six mounted films MF beforehand is mounted via the right opening 13 shown by broken lines to the device 1 and is automatically moved to the predetermined position, the resultant state is such as shown in the Figure. This is then transported in the reverse direction (arrow H) so that there is partway protrusion from the left opening 14 and sub-scanning thereof is thus performed.

The above construction means that new cartridge film CF cannot be handled in this state, at least visually.

Figure 4:
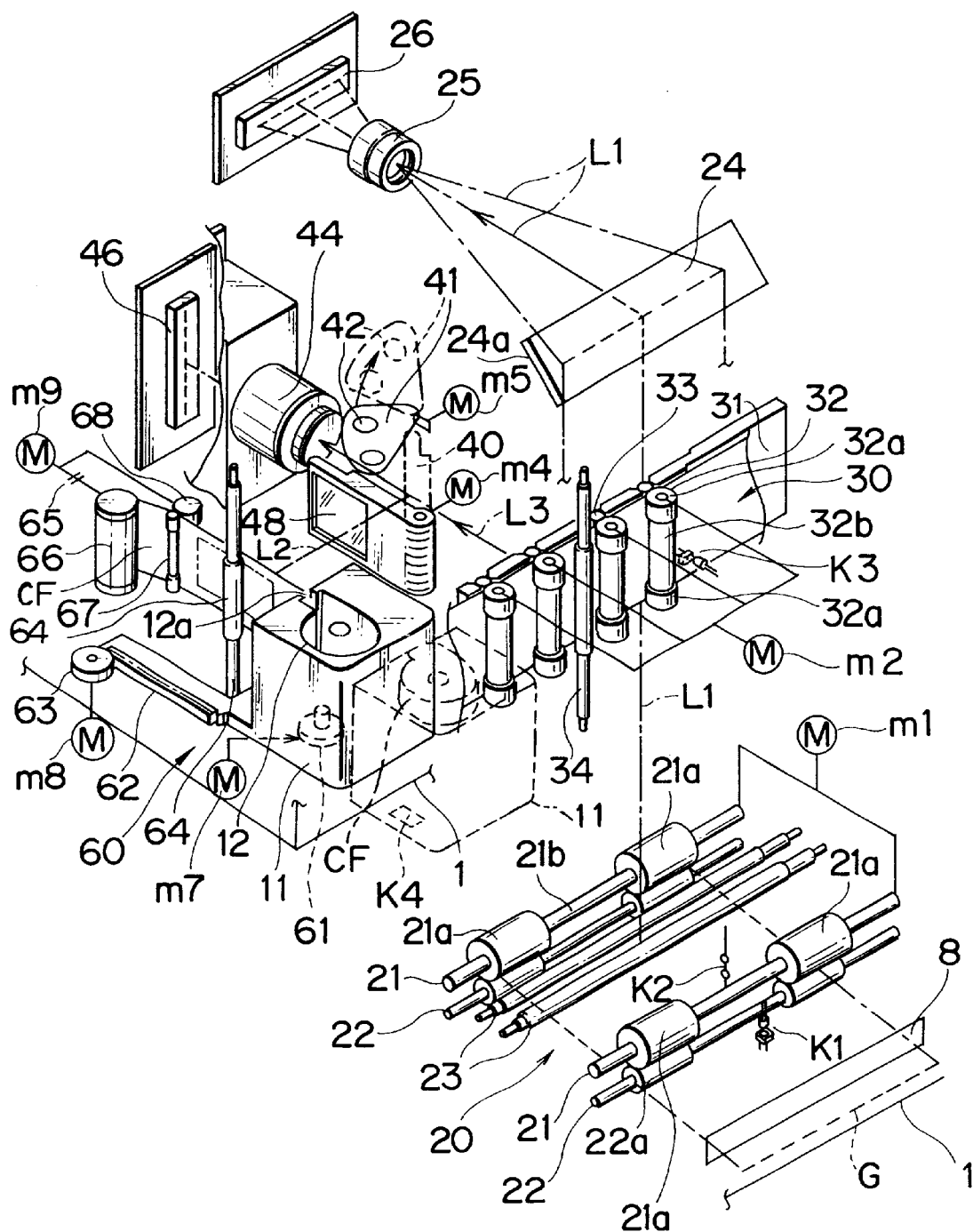
FIG. 4 is an external perspective view of each of the reading units built into the scanner device.

FIG. 4 is an exterior perspective view illustrating the mechanism of device 1, and the constructions which have already been described are denoted with the same reference numerals and description thereof will be omitted.

First, the original G reading unit 20 shown with broken lines is constructed as follows: Force is obtained from a first motor m1 such as a stepping motor or the like, and urethane rubber is used for right and left elastic members 21a which come into direct contact with the surface of the original. A pair of roller pairs, comprised of the elastic members being fixed to shafts 21b comprising drive rollers 21 and idlers 22 which are in constant contact with the drive rollers 21 at a certain pressure and follow the rotation thereof, is provided, with another such roller pair being also provided downstream, and further two sets being provided to an unshown base.

Provided between these roller pairs are two cold cathode tubes 23 by which high brightness can be obtained at low temperature, fixed to the base (unshown), so as to irradiate the surface of the original document G.

Provided above the two cold cathode tubes 23 is a reflecting mirror 24 having a reflecting surface 24a of the width direction of the original document G fixed to the base (unshown) so as to be at a 45/ angle as to the original document surface, so as to direct the optical axis L1 from the surface of the original in between the two cold cathode tubes 23 toward a converging lens 25, converging to a line image CCD 26 of a certain resolution fixed to the base, so as to perform main scanning of the original document surface.

Incidentally, these are stored in an unshown dark box, shielded from exterior light. Also, the state of transportation of the original document G is continuously monitored by sensor K1 and sensor K2 which are optical sensors comprised of photo-emitting photo-receptor diodes provided to the positions shown in the Figure, thus enabling detecting of presence or absence of original documents, and detecting of completion of the reading operation.

Next, the construction of the 135 mm film F reading unit 30 is as follows: fixed to the unshown base is a second motor m2 which is capable of reverse rotation such as a stepping motor and is driven according to set driving pulses, so as to drive the total four first drive rollers 32 via a force transmitting mechanism shown is solid lines in the Figure regarding this second motor m2.

Each of the first drive rollers 32 is comprised of a shaft 32b upon which is provided a pair of elastic members 32a using urethane rubber at the upper and lower portions where direct contact is made with the outer surface of the image recording portion of each frame of the film F.

Also, provided to positions opposing each of the first drive rollers 32 are idler rollers 33, rotatable and pressed, so as to maintain a gap smaller than the approximately 5 mm which is the width of the above slide film unit 200, these being provided rotatably to the base 31.

On the other hand, a cathode tube 34 is provided between the first drive rollers 32 centrally positioned, such that the image of the film F is directed toward the converging lens 44, converging to the line image CCD 46 of the certain resolution fixed to the base, so as to perform main scanning and sub-scanning of the film F and the mounted film MF. Also, these are stored in later-described dark box, shielded from exterior light.

Also, an optical path converting mechanism 40 provided with a reflecting mirror 48 is provided in the optical axis L3 shown in the Figure by a single-dot broken line connecting the converging lens 44 and cathode tube 34, arranged so as to be rotatable by 45/ by means of a fourth motor m4, constructed so as to be in states of shielding the optical axis L3 and directing the optical axis L3 to the converging lens 44.

Further provided between this optical path converting mechanism 40 and the converging lens 44 is a filter converting mechanism 41 having a plurality of filters, provided so as to be rotated by a fifth motor m5, constructed so as to insert an appropriate filter 42 into the optical axis L3, according to the concentration of the film F negative, positive, or image of the various stipulations.

Next, the cartridge film CF reading unit which is the fourth image recording medium is constructed as follows:

A sensor K4 comprised of a micro switch is provided to the base plane of the mounting hole 12 of the above mounting unit 11 to which the cartridge film CF is to be mounted. Also provided to the bottom plane of the mounting hole 12 is a dowel member 61 shown by broken lines, with a member constructed so as to engage the film winding spool of the cartridge film CF being provided rotatably thereto, so that the mounting unit 11 meshes with this dowel member 61 via an unshown planetary gear mechanism as to a seventh motor m7 at the position shown by solid lines.

Also, a rack 62 is extended from the mounting unit 11 as shown in the Figure, such that the mounting unit 11 is driven to the solid-line and broken-line positions in the Figure via the opening 10 of the above device 1, by reverse driving of an eighth motor m8 provided to the output shaft of a pinion 63 which constantly meshes with this rack 62.

In the state of this mounting unit 11 being mounted such, a cold cathode tube 64 is provided downstream from the film extracting opening CFa of the cartridge film CF, and with the optical axis L2 (shown by single-dot broken line) connecting the cold cathode tube 64 and the above optical path converting mechanism 40 is directed to the above converging lens 44 by the optical path converting mechanism 40 being rotated about 45/ to rotate to the position shown by broken line, thus sharing the line image CCD 46 of the certain resolution between the above films F and MF.

Provided further downstream from the cold cathode tube 64 is a driving roller 68 having an elastic cylindrical urethane rubber member as the driving portion thereof, arranged so as to directly receive force from a ninth motor m9, and is constructed so as to pinch the cartridge film CF being fed from the film extracting opening CFa for the cartridge film CF by means of driving of the above seventh motor m7 between this driving roller 68 and an idle roller 67 provided so as to oppose this driving roller 68, such that the cartridge film CF passes over the cold cathode tube 64 at a constant speed, thereby performing main scanning and subscanning reading operations.

Provided further downstream from the driving roller 68 and idle roller 67 is a winding spool 66 arranged to obtain force from the above ninth motor m9 via a clutch 65, and the cartridge film CF is temporarily all wound into the winding spool 66 after reading.

Following the above reading operation, the ninth motor m9 is reversed, and the cartridge film is fed out backwards with an appropriate amount of back tension provided to the cartridge film CF and the spool within the case of the cartridge film CF is rotated by the dowel member 61 by driving the seventh motor m7, thereby storing all. Subsequently, this is ejected from the opening 10.

In this way, moving the mounting unit 11 in the direction following the film ejecting direction for cartridge film CF structured to wind film on a spool stored within a cartridge, damage to the film can be kept at a minimal level in the event of jamming of the film.

Specifically, in the event that the indicator 15 shown in FIG. 1 turns red, the winding operation can be terminated and the top plate of the device 1 opened, allowing for the film to be directly grasped from above.

Figure 5:
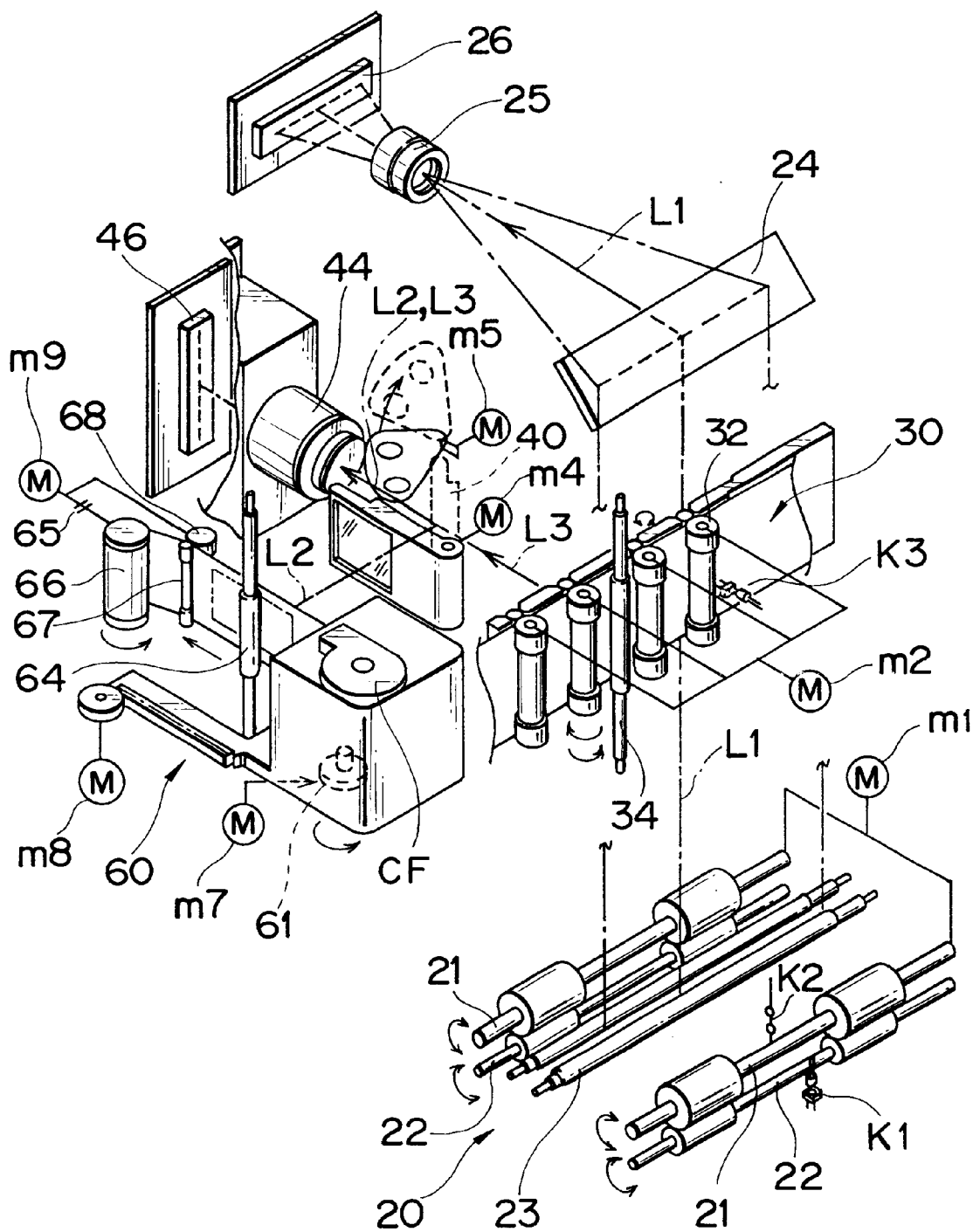
FIG. 5 is an external perspective view for describing the operation of FIG. 4.

FIG. 5 is an explanatory diagram of the operations of the reading units of FIG. 4. The constructions in the Figure which have already been described are denoted with the same reference numerals and description thereof will be omitted.

First, at the point that the original document G is inserted into the reading unit 20, the sensor Kl detects the leading edge of the original, activates the first motor m1 and rotates the drive roller 21 in a counter-clockwise direction, causing the original document G to run past two cold cathode tubes 23, and directs the optical axis Ll to the converging lens 25 with a reflecting mirror 24 having a reflecting surface 24a of the width of the original document G, thereby reading at the CCD 26. The drive roller 21 here can be constantly kept clean, since urethane rubber which has less viscosity than silicone rubber is used at the portions coming into direct contact with the surface of the original. Accordingly, the user's originals can be kept from being soiled. Once this reading is completed, the first motor m1 is reverse-rotated and the original is ejected.

Next, after standard film F is set in the continuous film unit 100 or mounted film MF is set in the slide film unit 200, detection of starting of mounting is detected by a sensor K3, causing the second motor m2 to be activated which rotates the four first drive rollers 32, thereby performing the certain reading operation.

At this time, each of the first drive rollers 32 is constructed such that a pair of elastic members 32a using urethane rubber is provided on the shaft 32b at the positions at which direct contact is made with the outer sides of each of the frames of the film F.

Next, the reading operation of the cartridge film CF which is the fourth image recording medium is performed as follows: Once the mounting unit 11 is moved to the position shown by solid lines by means of operation of the eighth motor m8, the seventh motor m7 is activated, the film of the cartridge film CF is fed between the drive roller 68 and idle roller 67, past the cold cathode tube 64 to the downstream of the film extracting opening CFa of the cartridge film CF. Next, the ninth motor m9 is activated, driving the drive roller 68 and idle roller 67, so as to perform reading while winding the whole with the winding spool 66. Following the above reading operation, the ninth motor m9 is reversed and the cartridge film CF is fed out backwards with an appropriate amount of back tension provided to the cartridge film CF and the spool within the case of the cartridge film CF is rotated by the dowel member 61 by driving the seventh motor m7, thereby storing all. Subsequently, this is ejected from the opening 10.

Figure 6:
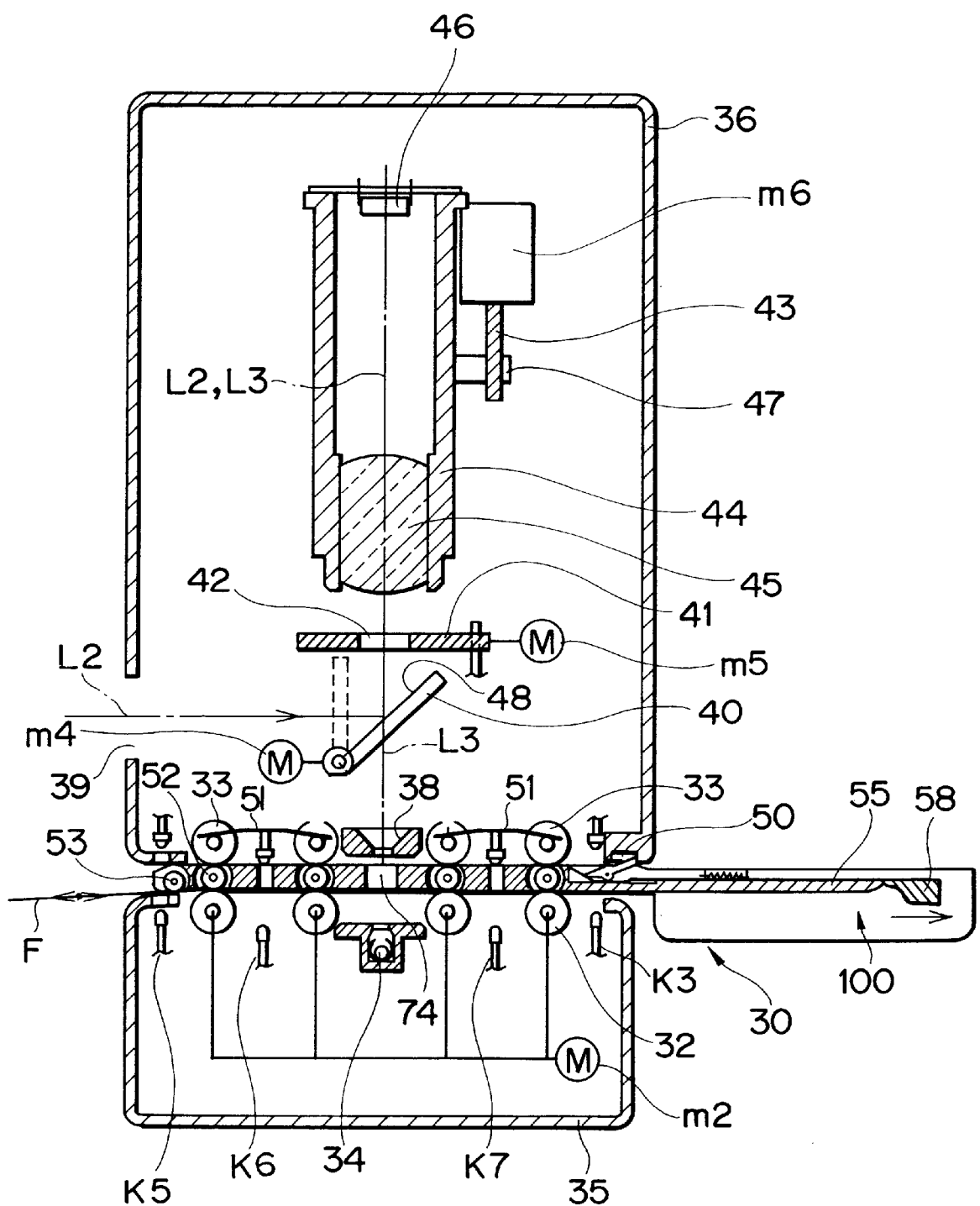
FIG. 6 is a cross-sectional diagram along the principal members of the film reading unit.
Figure 7:
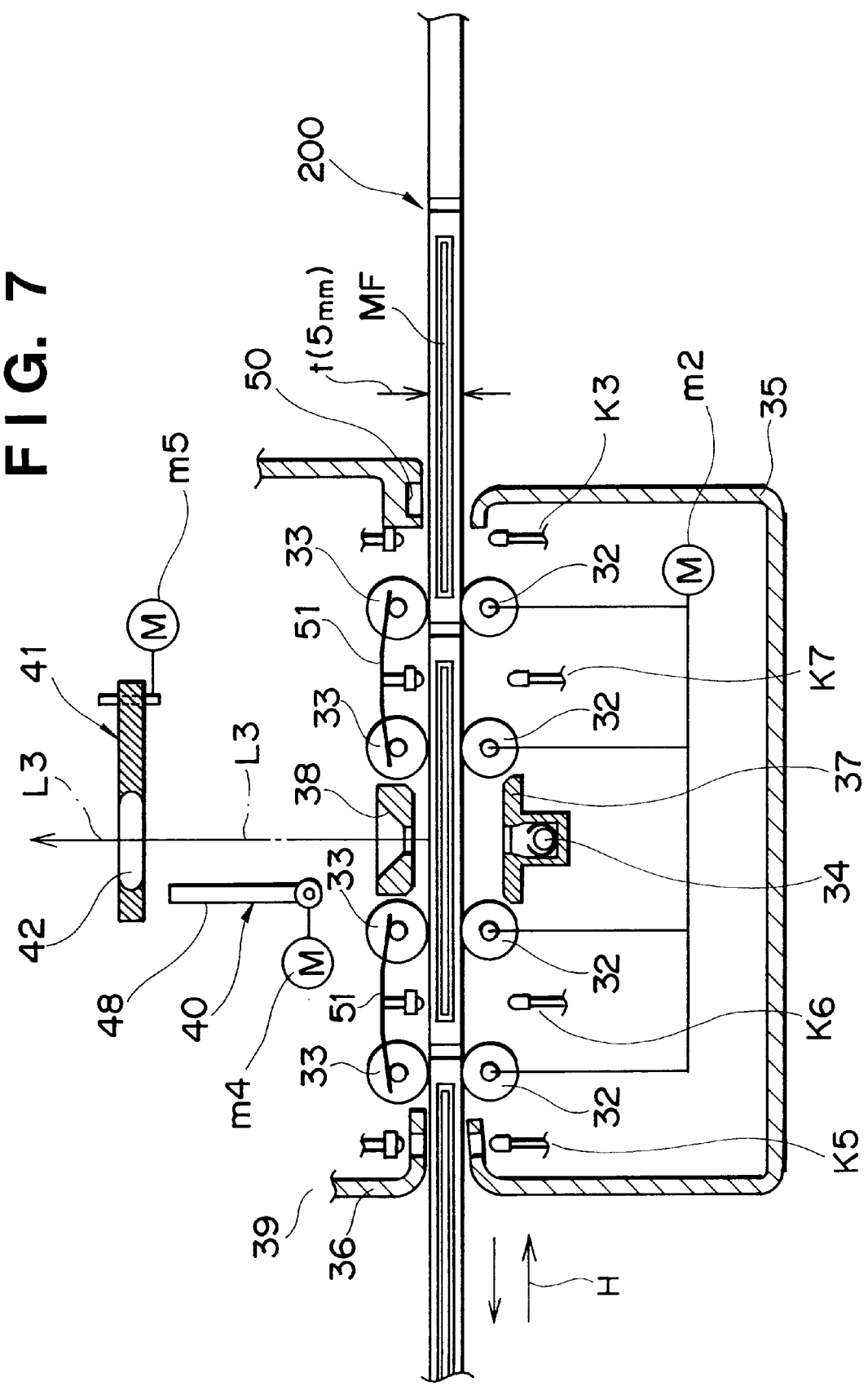
FIG. 7 is another cross-sectional diagram along the principal members of the film reading unit.

Next, the slide film unit 200 as described above is constructed in a storable manner so that six slide mounted films MF can be set from the upper opening and retained in a certain position, the overall length being somewhat longer that six frames of developed continuous film F, and since the forward and back width dimensions of the slide film unit 200 is approximately 5 mm and the width dimensions of the continuous film F is 0.15 mm, the space between the drive roller 32 and idle roller 33 must be 5 mm or more, and description will be made with reference to the cross-sectional diagrams of principal members of FIG. 6 and FIG. 7 regarding a mechanism which enables use of both the units 100 and 200. Here, the constructions which have already been described are denoted with the same reference numerals and description thereof will be omitted.

First, in FIG. 6, the converging lens 44 is constructed of a lens 45 built into a lens barrel, configured so as to converge the optical axes L2 and L3 to the CCD 46, with a screw-hole member 47 further provided to this lens barrel. This screw-hole member 47 screws to a worm screw 43 fixed to an output shaft of a sixth motor m6 fixed to the unshown base. The above construction provides for an automatic focusing mechanism. Also, an opening for introducing the optical axis L2 is formed to the dark box 36 at the position shown in the Figure.

Also, an engaging recessed portion 50 for fixing the continuous film unit 100 unmovable at the time of setting is provided to the dark box 36. Each of the idle rollers 33 are provided in a state pressed toward the drive rollers 32 by means of spring 51, and constructed so as to come into contact with the free roller 52 and rotate in the state that the continuous film unit 100 has been mounted, as shown in the Figure.

On the other hand, sensors K3, K5, K6, and K7 are provided at the positions shown in the Figure, monitoring each operation. Also, an aperture 38 is provided at the center position facing the cathode tube 34.

Now, FIG. 7 illustrates the state in which the slide film unit 200 is mounted and being transported in the direction of the arrow H, in which case the slide film unit 200 is pinched between the idle roller 33 and the drive roller 32. That is, the width dimensions t of the unit 200 are approximately 5 mm, so the slide film unit 200 can be transported as such.

The configuration of the continuous film unit 100 will be described based on the frontal view shown in FIG. 8 and the cross-sectional diagram of the principal components shown in FIG. 9.

Figure 8:
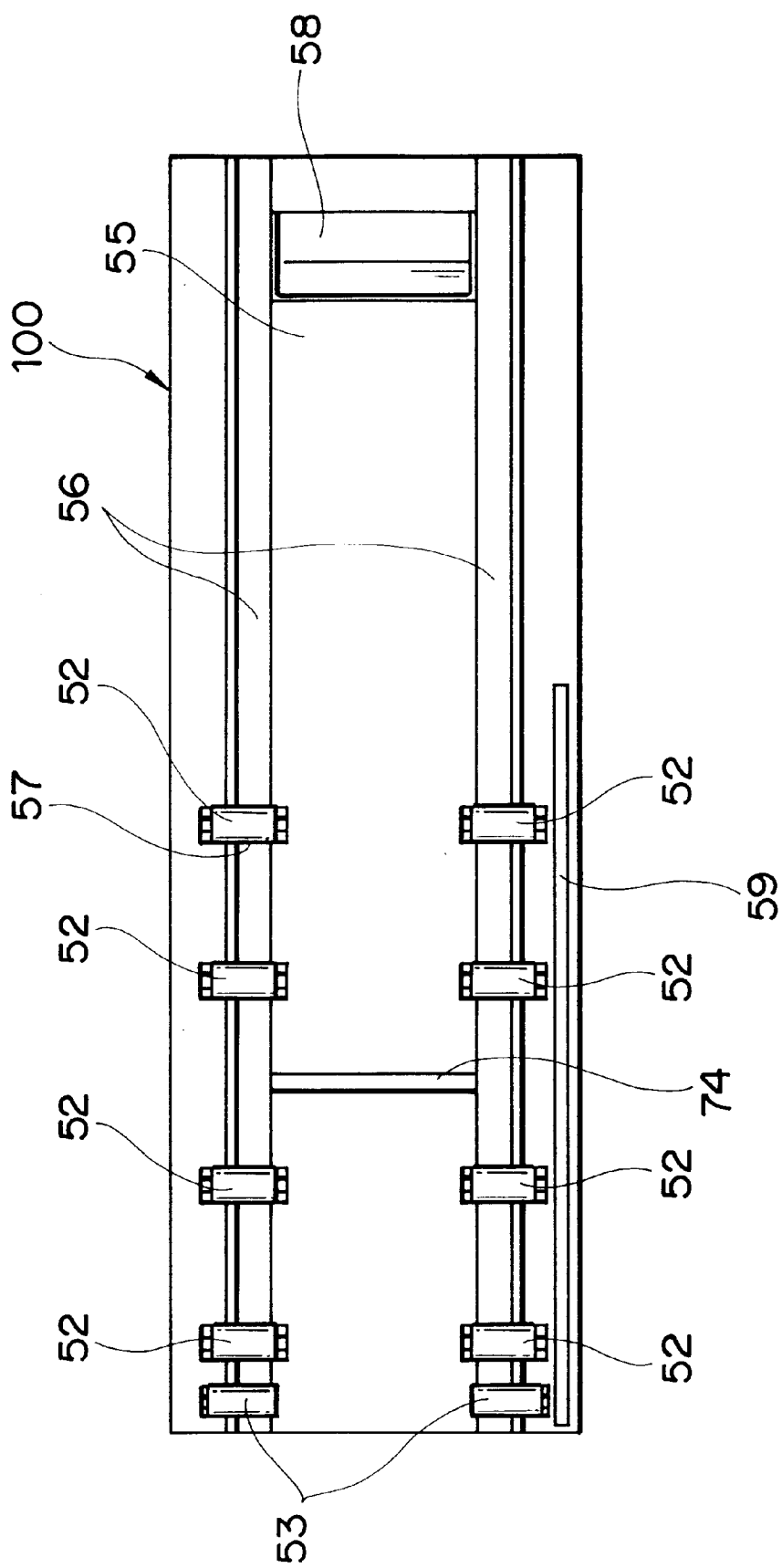
FIG. 8 is a frontal view of the continuous film unit 100.
Figure 9:
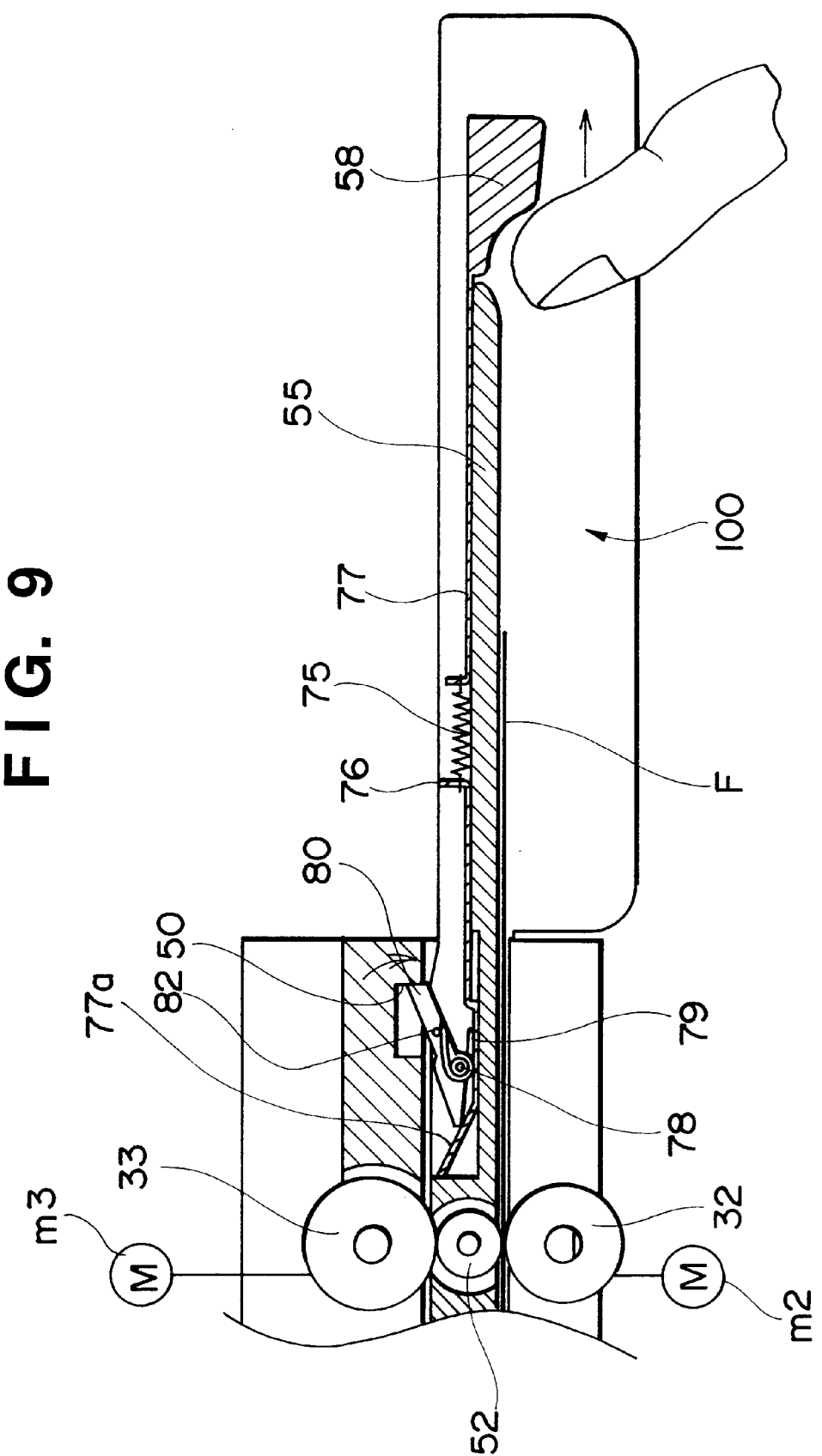
FIG. 9 is a plan view of the continuous film unit 100 following mounting.

In FIG. 8, the continuous film unit 100 is provided with a base 55 having a somewhat protruding film running surface 56 and aperture 74 for passing light source from the cathode tube, and also has rotatably built in a total of eight of the above free rollers 52. The continuous film unit 100 also has free rollers 53 rotatably built in, as well.

Figure 10:
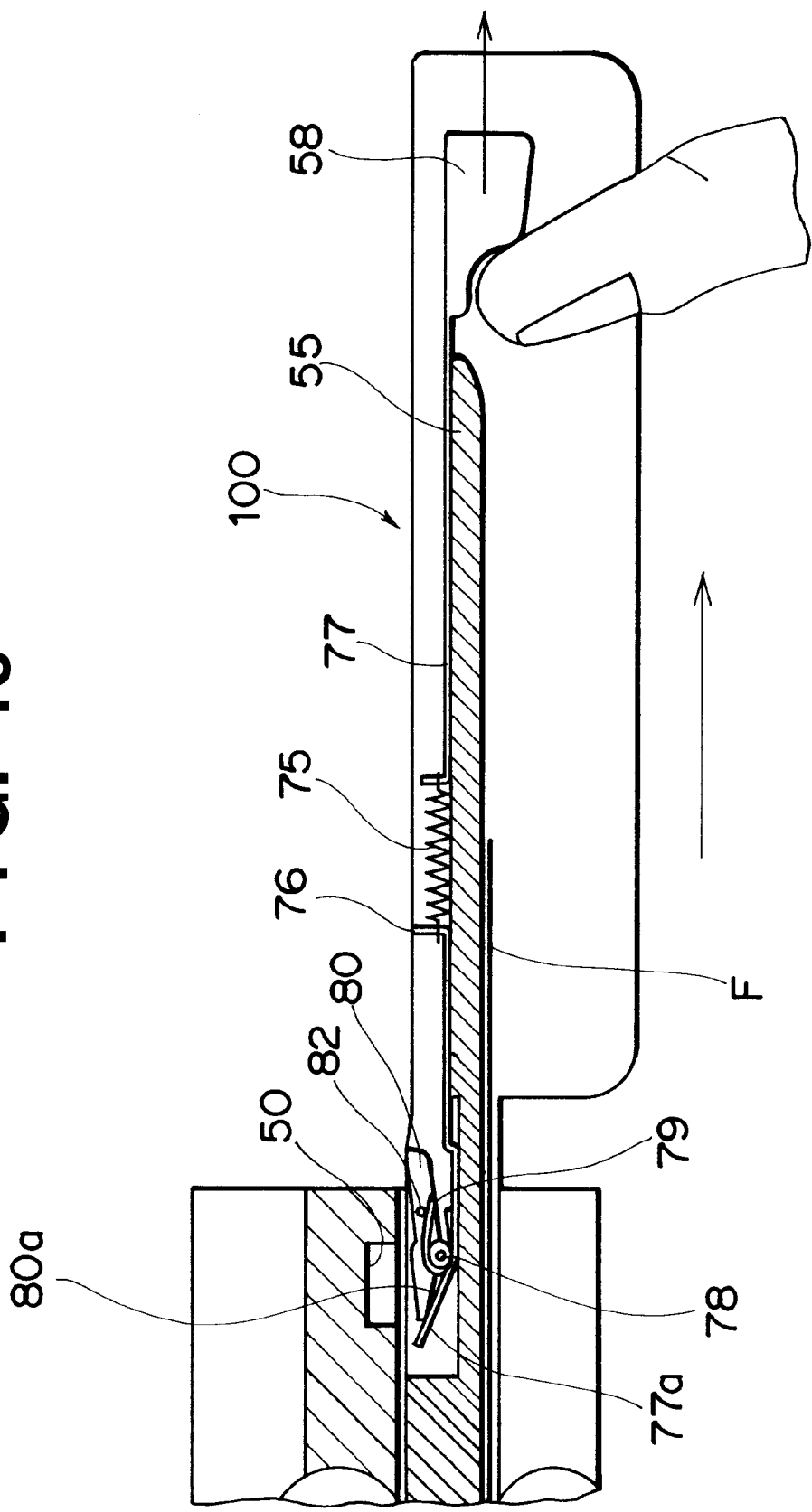
FIG. 10 is a plan view of the continuous film unit 100 in the extracted state.

Next, making reference further to FIG. 10, the base 55 is arranged such that the lever 58 is movable in the left and right directions, and is provided with the plate 77 integrally. The end 77a of this plate 77 operates upon an operating end 80a of a member 80 which is provided rotatably around a pin 78 and also pressed in a counter-clockwise direction by a torsion spring 79, constructed such that the unit 100 is inserted from the right opening 13 shown in FIG. 1 and moved to the predetermined mounting position, whereupon the member 80 engages the recessed portion 50 as shown in FIG. 9.

In order to disengage this engaged state, the operator operates the lever 58 in the right direction, and removes the member 80 from the recessed portion 50.

Figure 11:
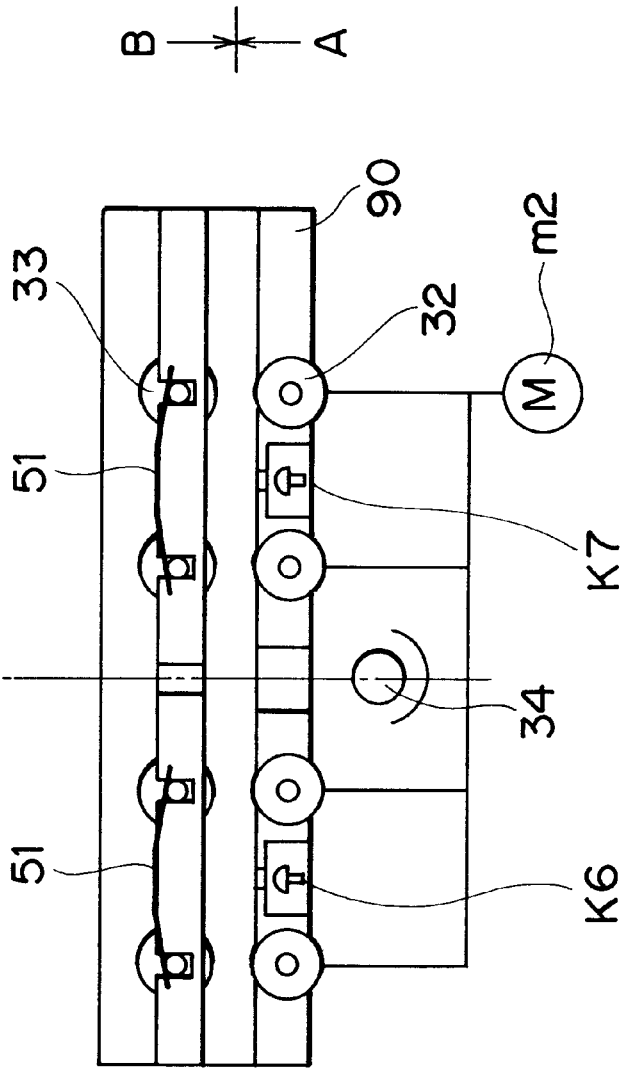
FIG. 11 is a systematic diagram of the film reading unit.
Figure 12:
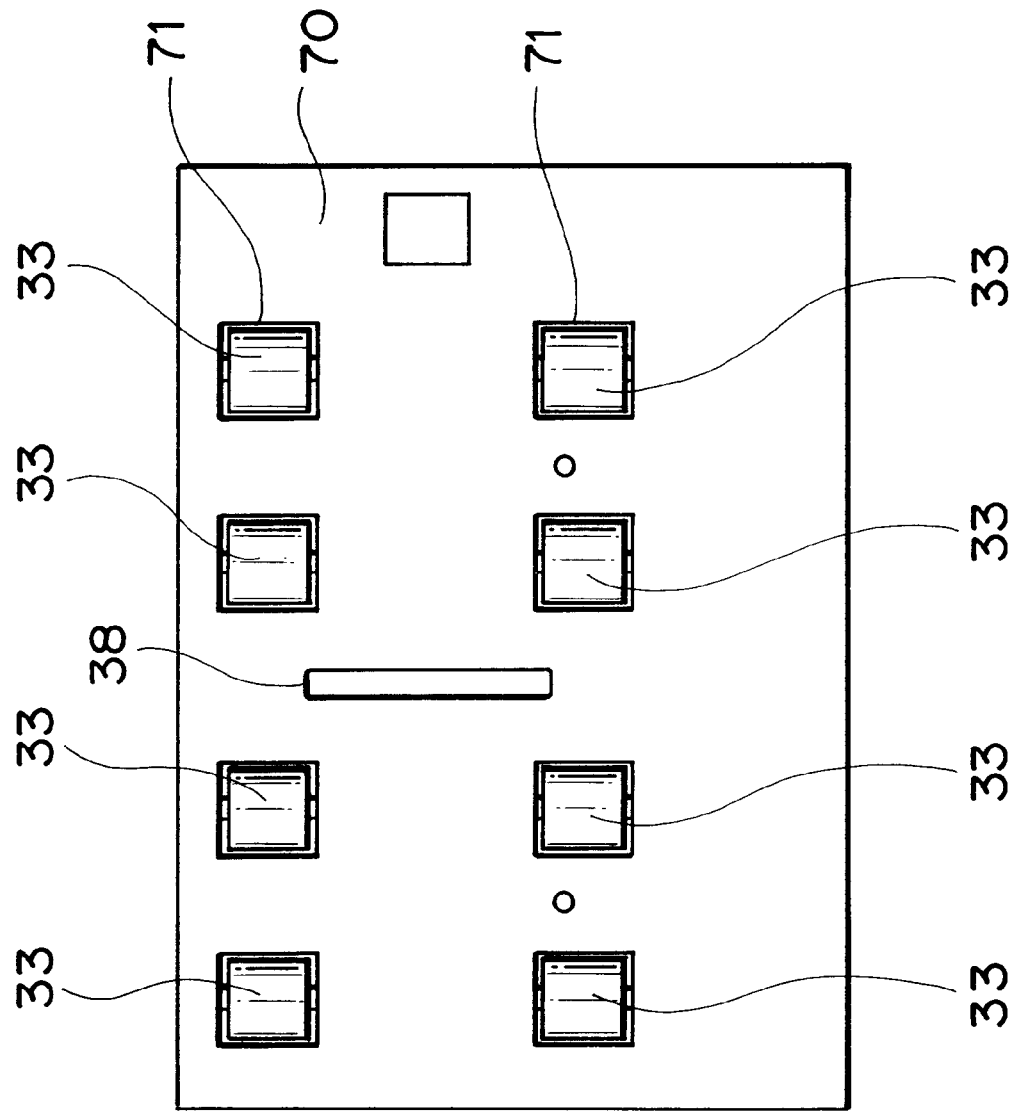
FIG. 12 is a diagram illustrating FIG. 11 from the direction of arrows A—A.

FIG. 11 is a plan view describing the construction of the drive rollers 32 and idle rollers 33. FIG. 12 is a diagram illustrating FIG. 11 from the direction of arrows A—A, and FIG. 13 is a diagram illustrating FIG. 11 from the direction of arrows B—B.

Figure 13:
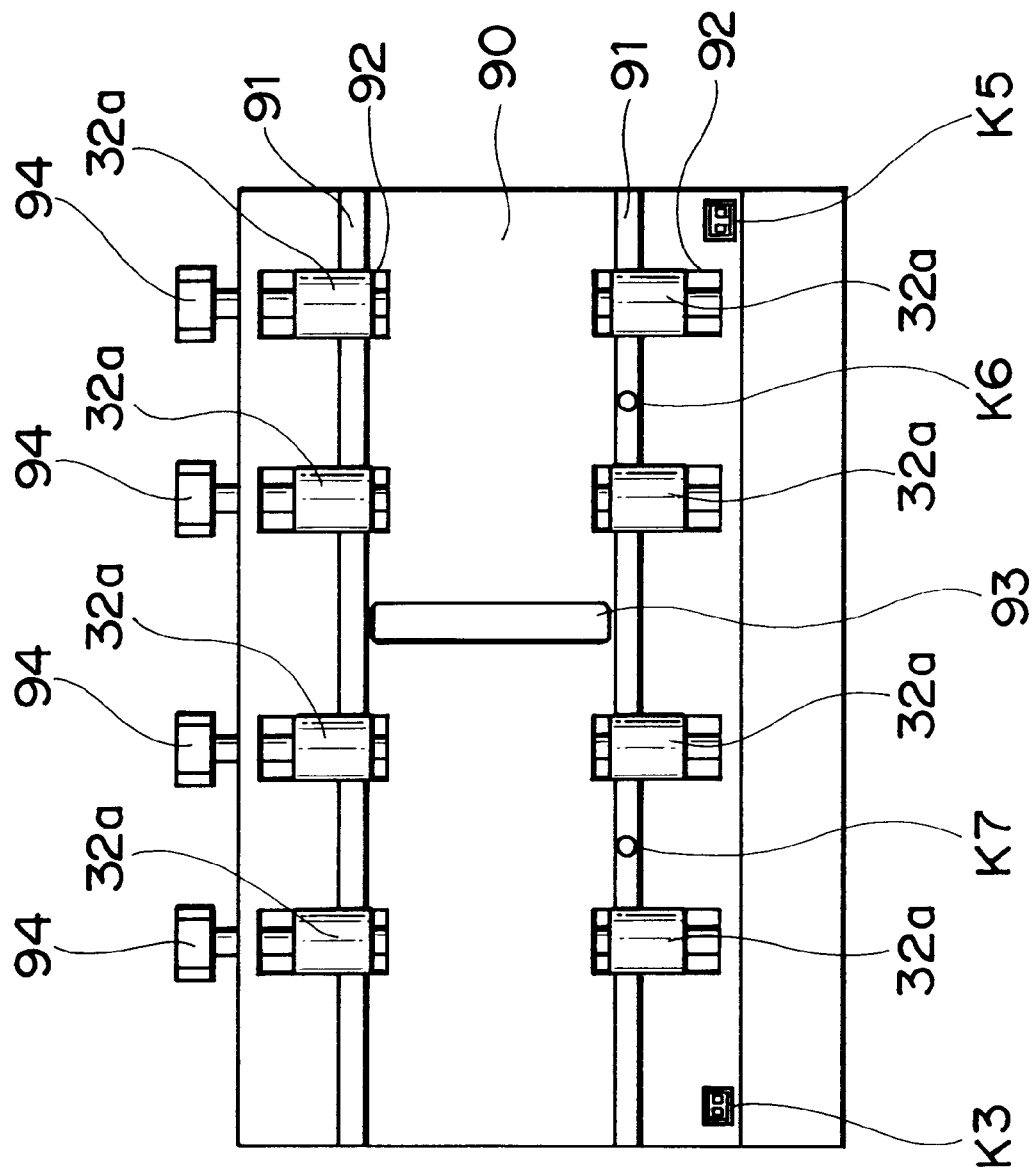
FIG. 13 is a diagram illustrating FIG. 11 from the direction of arrows B—B.

In FIG. 11 and FIG. 13, each of the drive rollers 32 are axially borne in a rotatable manner by the base 90 and each having gears 94 fixed to the ends of the shafts. Also, the elastic member portions 32a protrude from windows opened in the base 90, and the windows are arranged along the protrusions 91 guiding the units 100 and 200, so that the elastic member portions 32a come into contact with the outer plane pair each of the units, thus providing transporting force.

On the other hand, in FIG. 12, the above idle rollers 33 are arranged so as to partly protrude from the windows 71 in the base 70.

Figure 14:
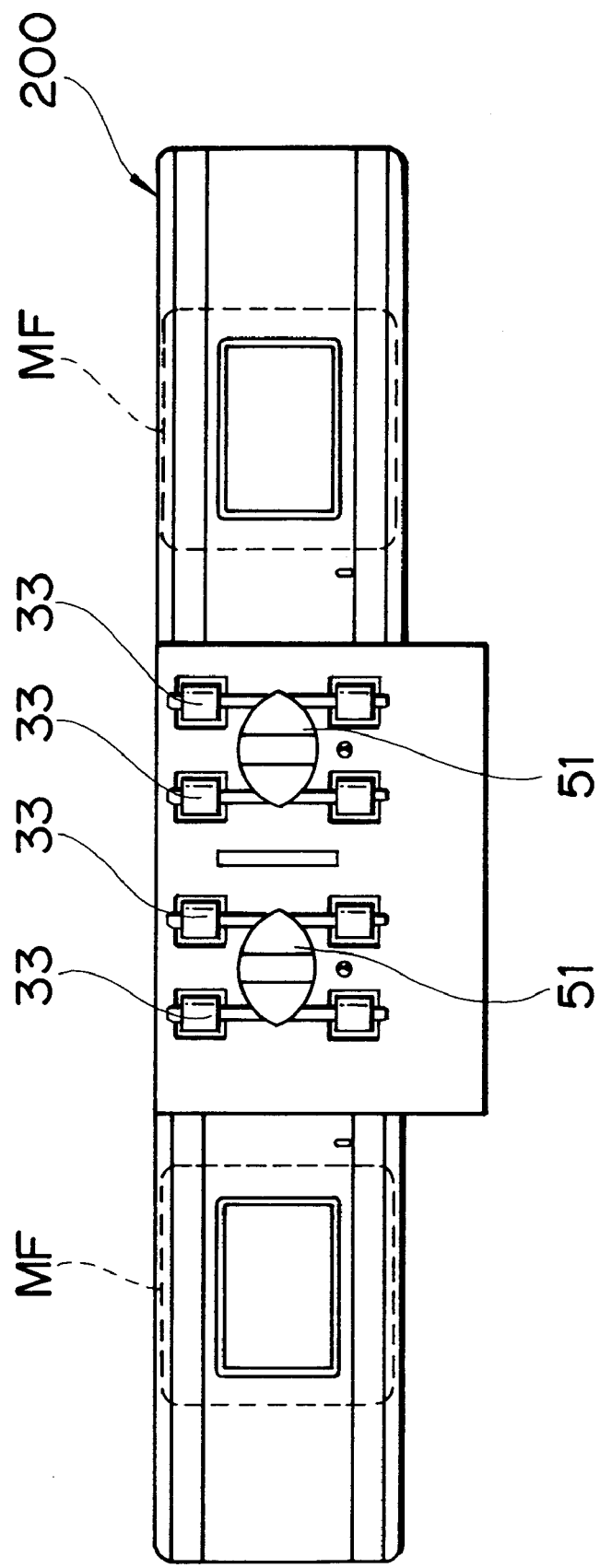
FIG. 14 is a rear view illustrating the film reading unit and slide film unit 200 together.

Also, FIG. 14 is a front view of the device 1 as viewed from the inside outwards, with springs 51 operating on each of the idle rollers 33 as shown in the Figure, and with the idle rollers 33 coming into contact as to the running direction of the slide film unit 200.

Figure 15:
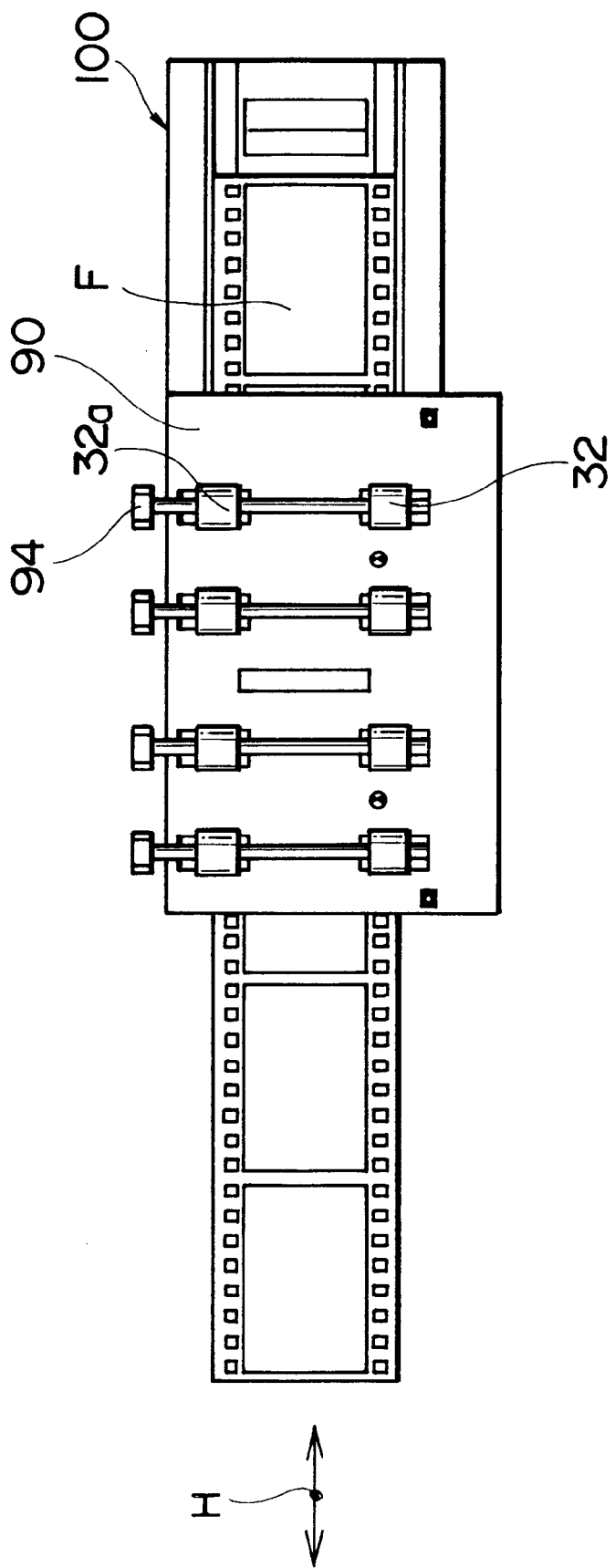
FIG. 15 is a rear view illustrating the film reading unit and continuous film unit 100 together.
Figure 16:
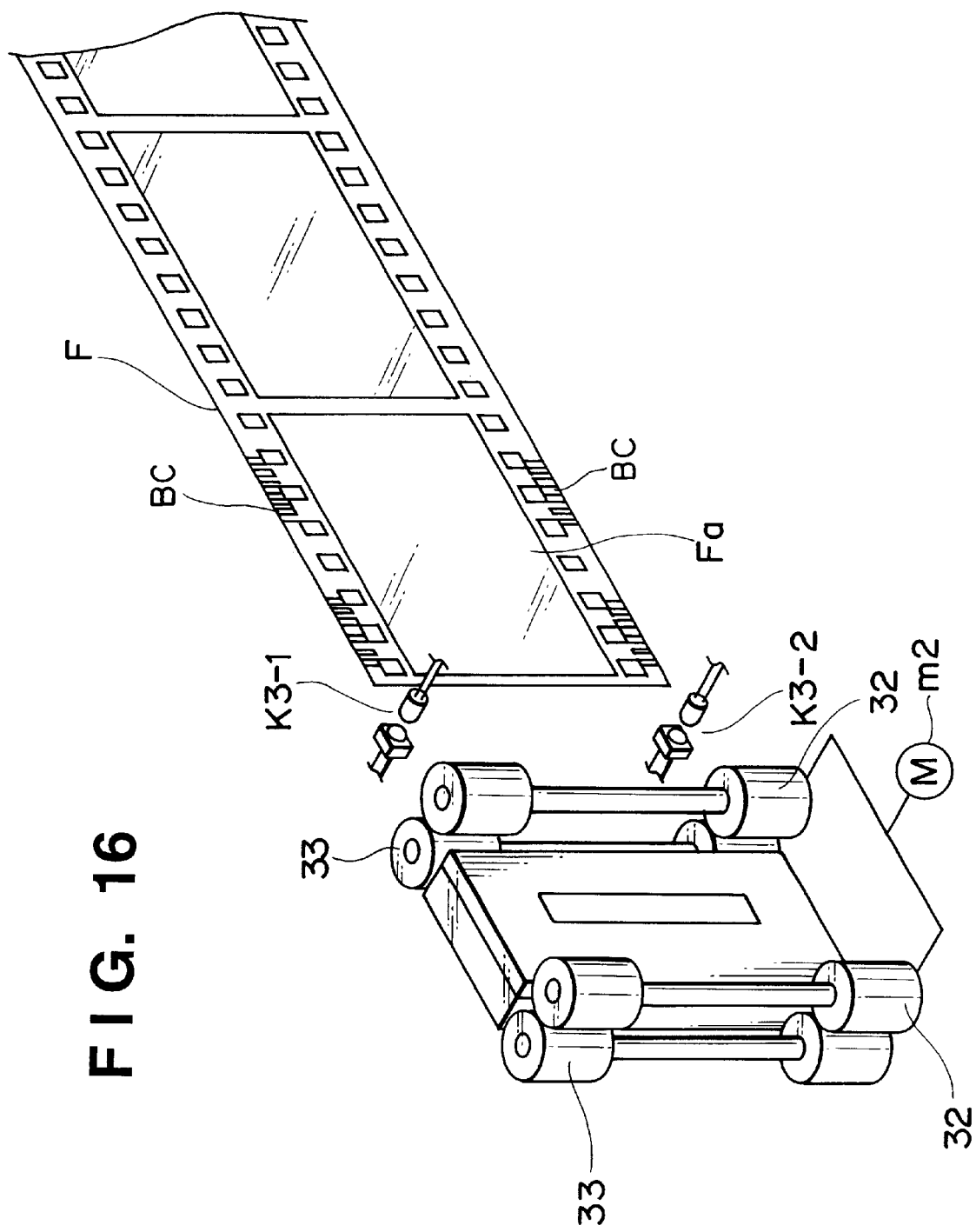
FIG. 16 is an external perspective view illustrating the film reading unit and film F together.

Also, FIG. 15 and FIG. 16 illustrate the state of activation following mounting of the above continuous film unit 100, and is configured in the Figure such that the elastic portion 32a of each of the drive rollers are positioned to the portion with bar-code formation which is the feeding perforation portion of the film F.

Also, the sensor K3 is provided as sensor K3-1 and sensor K3-2 above and below in order to read the above and below bar-codes BC as shown in FIG. 16, so that the top and bottom of the film F can be detected event when the film is set ing the unit 100 upside down.

Figure 17A:
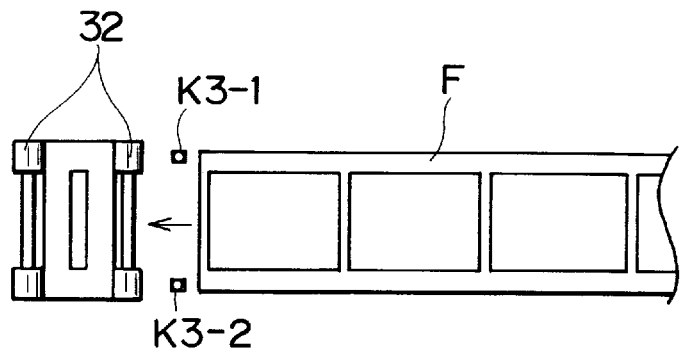
FIGS. 17A through 17E are diagrams for explaining the operation of the film reading units.
Figure 17B:
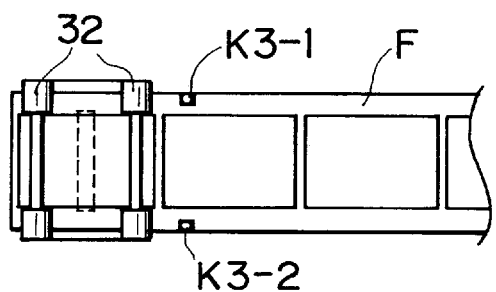

FIGS. 17A through 17E are diagrams for describing the operation of the running state of the film F. In FIGS. 17A and 17B, pre-pre-scanning of the film F is performed, scanning of one line in the vertical direction in the generally center position of the first frame is executed, and an automatic focusing adjustment mechanism is activated so that the contrast is maximal based on this data. Filter replacement is performed based on judgment made from the image concentration, focusing of the converging lens and setting of the desired filter is performed, following which the film is returned in the reverse direction in FIG. 17C, preparation is made for pre-scanning. All frames are fed in FIG. 17D and pre-scanning is performed, and reverse transporting is made in FIG. 17E to perform main scanning.

[Configuration of the Control Circuit]

Figure 18:
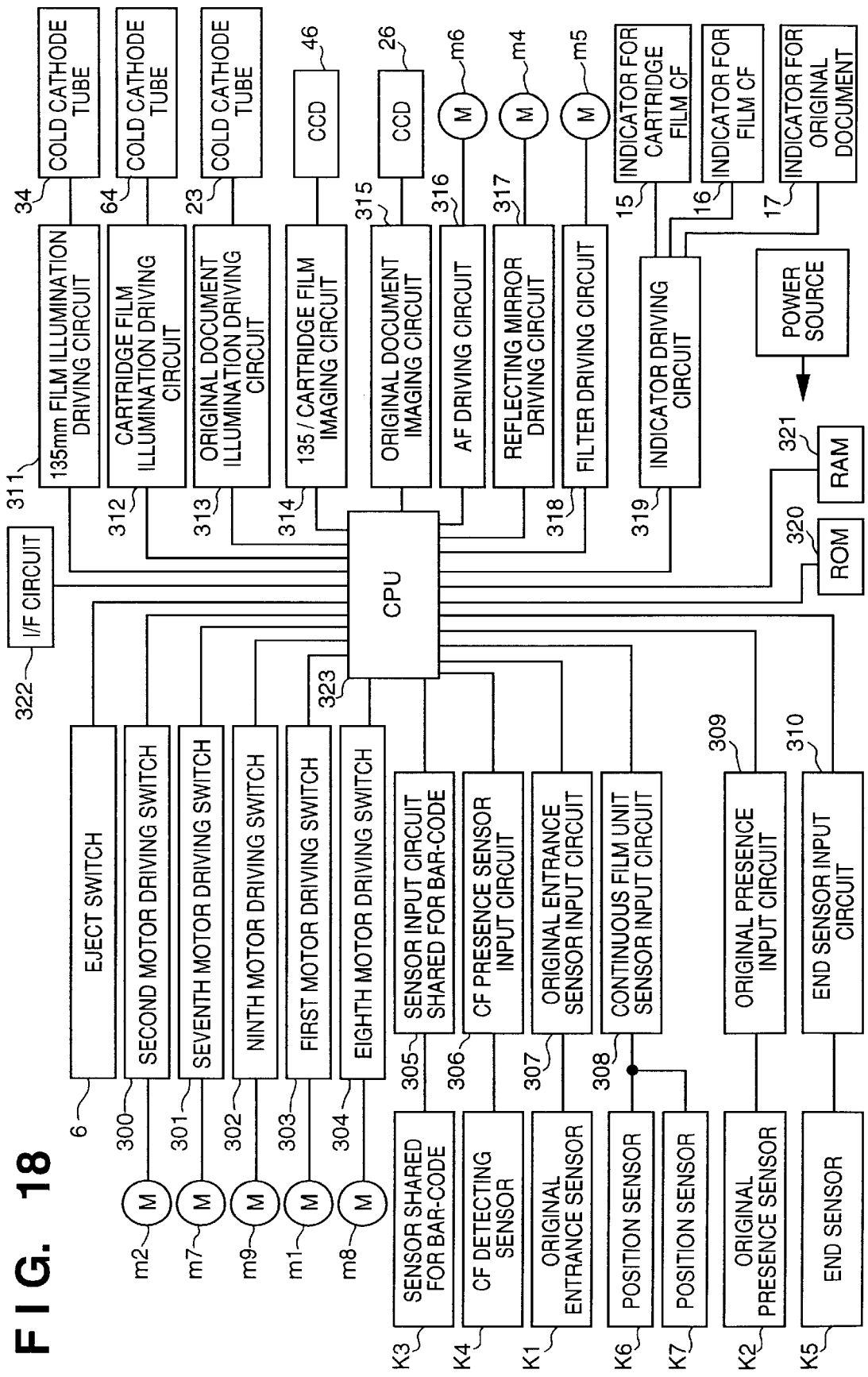
FIG. 18 is a block diagram illustrating the configuration of the control circuitry of the scanner device.

Next, the control circuit of the above-described scanner device will be described. FIG. 18 is a block diagram illustrating the configuration of the control circuitry of the scanner device.

As shown in FIG. 18, the CPU 323 is a controller which handles control of the entire scanner device. The interface (I/F) circuit 322 enables transmission of image data and various types of control data with a personal computer connected with an I/F cable. The ROM 320 is program memory storing control programs to be executed by the CPU 323, and RAM 321 is dynamic memory for storing various types if data (various types of control data, image data, etc.).

As also shown in FIG. 4, the eject switch 6 also serves as an opening/closing switch for the mounting unit 11 and a forced ejecting switch for other film or originals, the on/off signal being output to the CPU 323. The second motor driving circuit 300 controls the second motor m2 for scanning the 135 mm film based on control of the CPU 323. The seventh motor driving circuit 301 controls the seventh motor m7 for storing the cartridge film CF within the case, based on control of the CPU 323. The ninth motor driving circuit 302 controls the ninth motor m9 for feeding the cartridge film CF from the case and performing scanning thereof, based on control of the CPU 323. The first motor driving circuit 303 controls the first motor m1 for scanning original documents based on control of the CPU 323. The eighth motor driving circuit 304 controls the eighth motor m8 for inserting and removing the mounting unit 11, based on control of the CPU 323.

The sensor input circuit 305 shared for bar-code outputs detection signals of the sensor K3 shared for bar-code to the CPU 323. The CF presence sensor input circuit 306 outputs detection signals of the sensor K4 to the CPU 323. The original entrance sensor input circuit 307 outputs detection signals of the original entrance sensor K1 to the CPU 323. The continuous film unit sensor input circuit 308 outputs detection signals of the position sensors K6 and K7 for detecting feeding of the 135 mm film to the CPU 323. The original presence input circuit 309 outputs detection signals of the original presence sensor K2 to the CPU 323. The end sensor input circuit 310 outputs detection signals of the end sensor K5 which detects the end of the continuous film unit 100 to the CPU 323.

The 135 mm film illumination driving circuit 311 performs lighting control of the cold-cathode 34 for irradiating light upon the 135 mm film based on the control data of the CPU 323. The cartridge film illumination driving circuit 312 performs lighting control of the cold-cathode 34 for irradiating light upon the cartridge film CF, based on the control data of the CPU 323. The original document illumination driving circuit 313 performs lighting control of the cold-cathode 23 for irradiating light upon the original document G, based on the control data of the CPU 323.

The 135/cartridge film imaging circuit 314 performs driving control of the line image CCD 46 which converts 135 mm film images and cartridge film images into electrical signals and images the signals, based on the control data of the CPU 323. The original document imaging circuit 315 performs driving control of the line image CCD 26 which converts original document images into electrical signals and images the signals, based on the control data of the CPU 323. The AF (auto-focus) driving circuit 316 performs driving control of the sixth motor m6 for automatic adjustment of the focus of the converging lens 45 by driving the lens barrel 44, based on the control data of the CPU 323. The reflecting mirror driving circuit 317 performs driving control of the fourth motor m4 for driving the reflecting mirror 48, based on the control data of the CPU 323. The filter driving circuit 318 performs driving control of the fifth motor m5 for driving the filters 41, based on the control data of the CPU 323.

The indicator driving circuit 319 lights or blinks the cartridge film CF indicator 15, film F indicator 16, and original document G indicator 17, based on the control data of the CPU 323.

[Description of Operation of the Scanner Device]

Next, description of operation of the scanner device according to the present embodiment will be made.

<First Embodiment>

Figure 19:
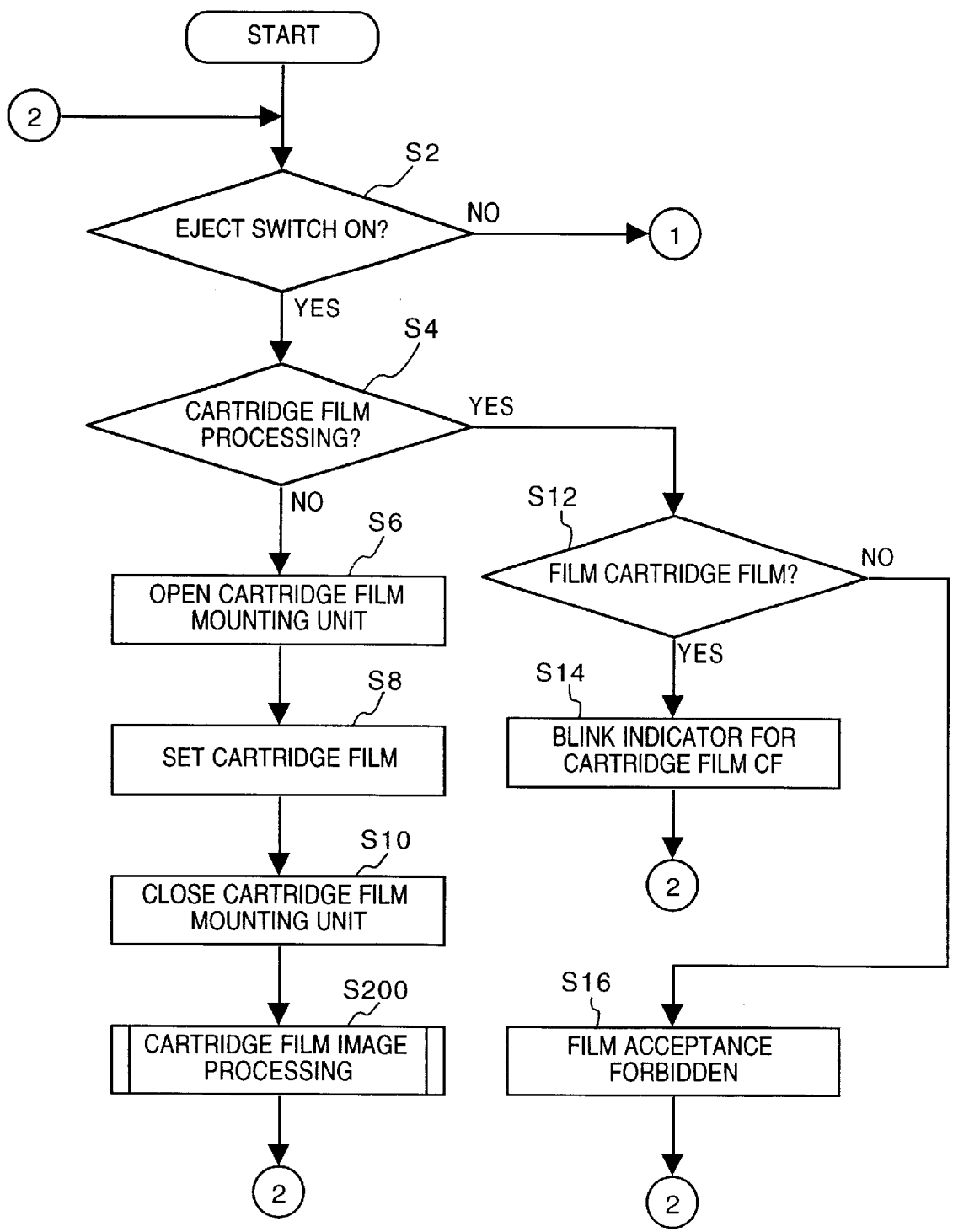
FIG. 19 is a flowchart illustrating the operation of a first embodiment.
Figure 20:
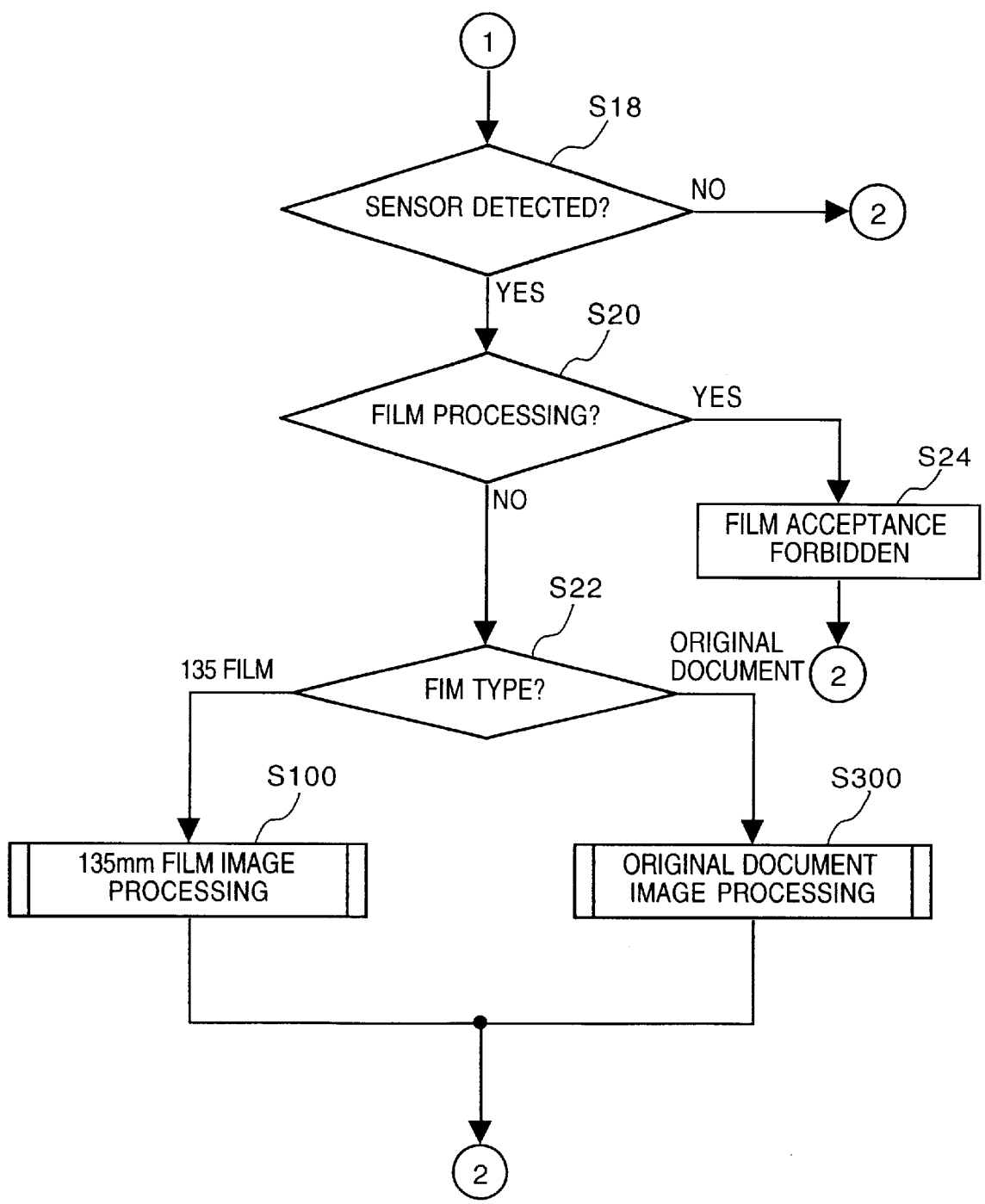
FIG. 20 is another flowchart illustrating the operation of the first embodiment.

First, description will be made regarding a first embodiment according to the present invention. FIG. 19 and FIG. 20 are flowcharts illustrating the operations of the first embodiment.

With the first embodiment, the scanner device is arranged such that, for example, in the event that mounting of the continuous film unit 100 or the slide film unit 200 is attempted for processing 135 mm film while cartridge film CF is being processed, control is made so that mounting of the continuous film unit 100 or the slide film unit 200 is prohibited until reading processing of the cartridge film is completed.

Making more specific description, as shown in FIG. 19, in step S2, the CPU judges whether or not the eject switch 6 is on or not. In the event that the eject switch 6 is on in step S2 (Yes in step S2), the flow proceeds to step S4, and in the event that the eject switch 6 is not on in step S2 (No in step S2), the flow proceeds to a later-described step S18.

In step S4, the CPU judges whether any of the film types is being currently processed. Judgment of whether processing of film is being performed or not is made according to the detection signals of the sensor K3 shared for bar-code, the CF present sensor F4, and the original document presence sensor K2. In the event that processing of film is not being performed in step S4 (No in step S4), the flow proceeds to step S6 and sends the Cartridge film mounting unit 11 to the open position. The operator mounts the cartridge film CF to the mounting hole 12 in step S8, and the detection signals for the CF detecting sensor K4 are output to the CPU 323. In the case that judgment is made in step S10 that cartridge film CF is present, based on the output signals of the CF detecting sensor K4, the Cartridge film mounting unit 11 is stored in the closed position. Subsequently, the flow proceeds to step S200, and executes a later-described sub-routine program for processing the cartridge film images.

In the event that processing of film is being performed in step S4 (Yes in step S4), the flow proceeds to step S12 and judges whether or not the film being processed is cartridge film CF or not. In the event that the film being processed in step S12 is cartridge film CF (Yes in step S12), the flow proceeds to step S14 and forbids acceptance of film, and also blinks the red light of the cartridge film CF indicator 15 to notify the user that cartridge film CF is being processed. In the event that the film being processed in step S12 is not cartridge film CF (No in step S12), the flow proceeds to step S16 and forbids acceptance of any type of film.

Next, as shown in FIG. 20, in the event that the eject switch is not on in step S2 (No in step S2), the flow proceeds to step S18, and makes judgment whether any of film F, cartridge film CF, or original documents G have been mounted to the scanner device, based on detection signals of the sensor K3 shared for bar-code, CF presence sensor K4 or original document sensor K2. Now, the sensor K3 shared for bar-code detects mounting of negative film, unmounted positive film, and mounted positive film. In the event that any of the sensors detects mounting in step S18 (Yes in step S18), the flow proceeds to step S20, and in the event that none of the sensors detects mounting in step S18 (No in step S18), the flow returns to step S2.

In step S20, the CPU 323 makes judgment whether any of types of film are being processed. Judgment of whether any of types of film are being processed or not is made based on detection signals of the sensor K3 shared for bar-code, CF presence sensor K4 or original document sensor K2. In the event that film is not being processed in step S20 (No in step S20), the flow proceeds to step S22 and judges the type of film mounted to the scanner device. In the event that 135 mm film F is mounted in step S22, the flow proceeds to step S100, and performs the 135 mm film image processing sub-routine program described in FIG. 24. Also, in the event that an original document G is mounted in step S22, the flow proceeds to step S300, and performs the original document image processing sub-routine program described in FIG. 27.

Next, in the event that there is film being processed in step S20 (Yes in step S20), the flow proceeds to step S24 and forbids acceptance of any type of film.

Hence, according to the first embodiment, the operator can be notified by forbidding processing a one type of film while another is being processed, thereby preventing mistaken operation.

<Second Embodiment>

Figure 21:
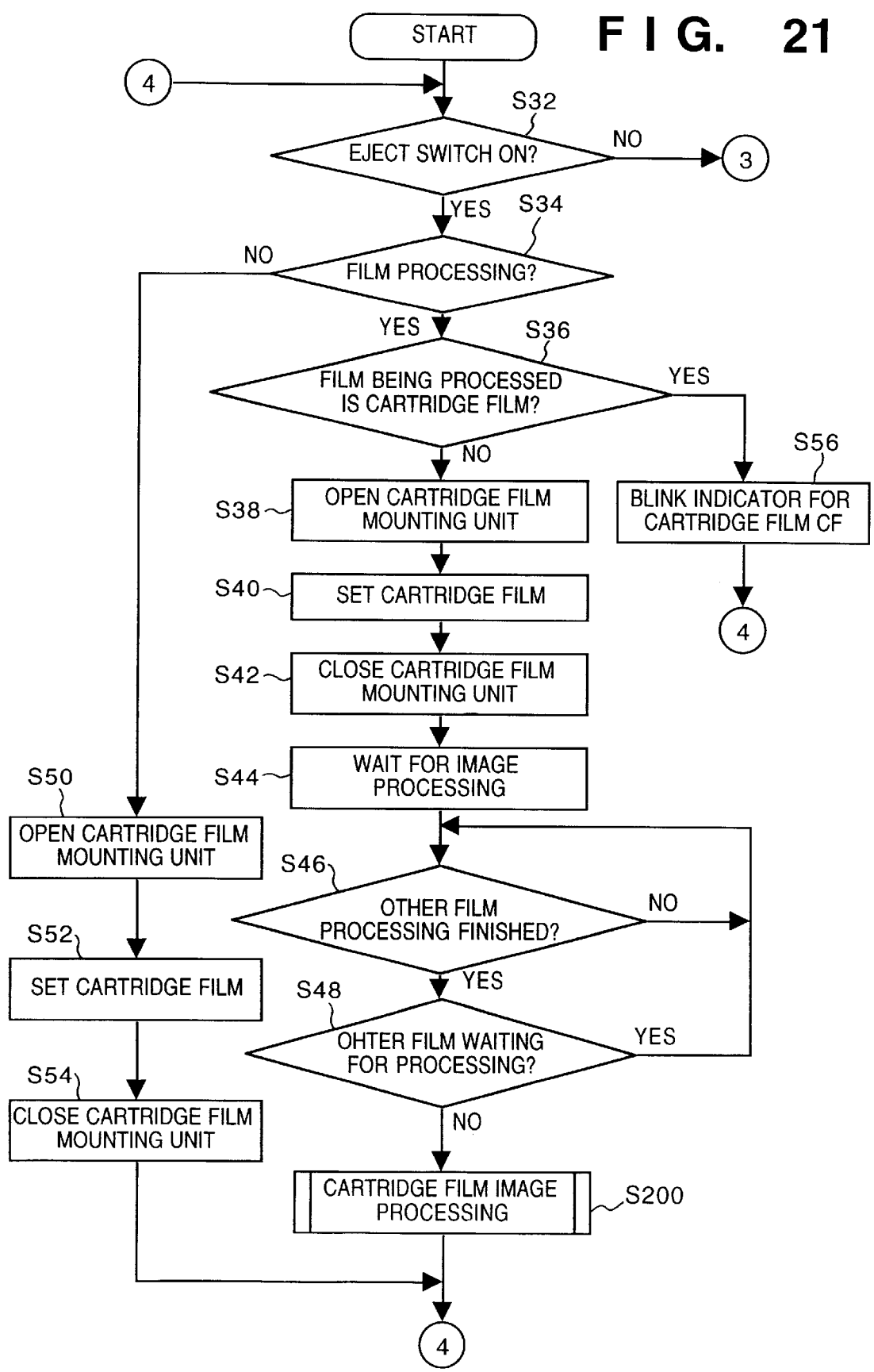
FIG. 21 is a flowchart illustrating the operation of a second embodiment.
Figure 22:
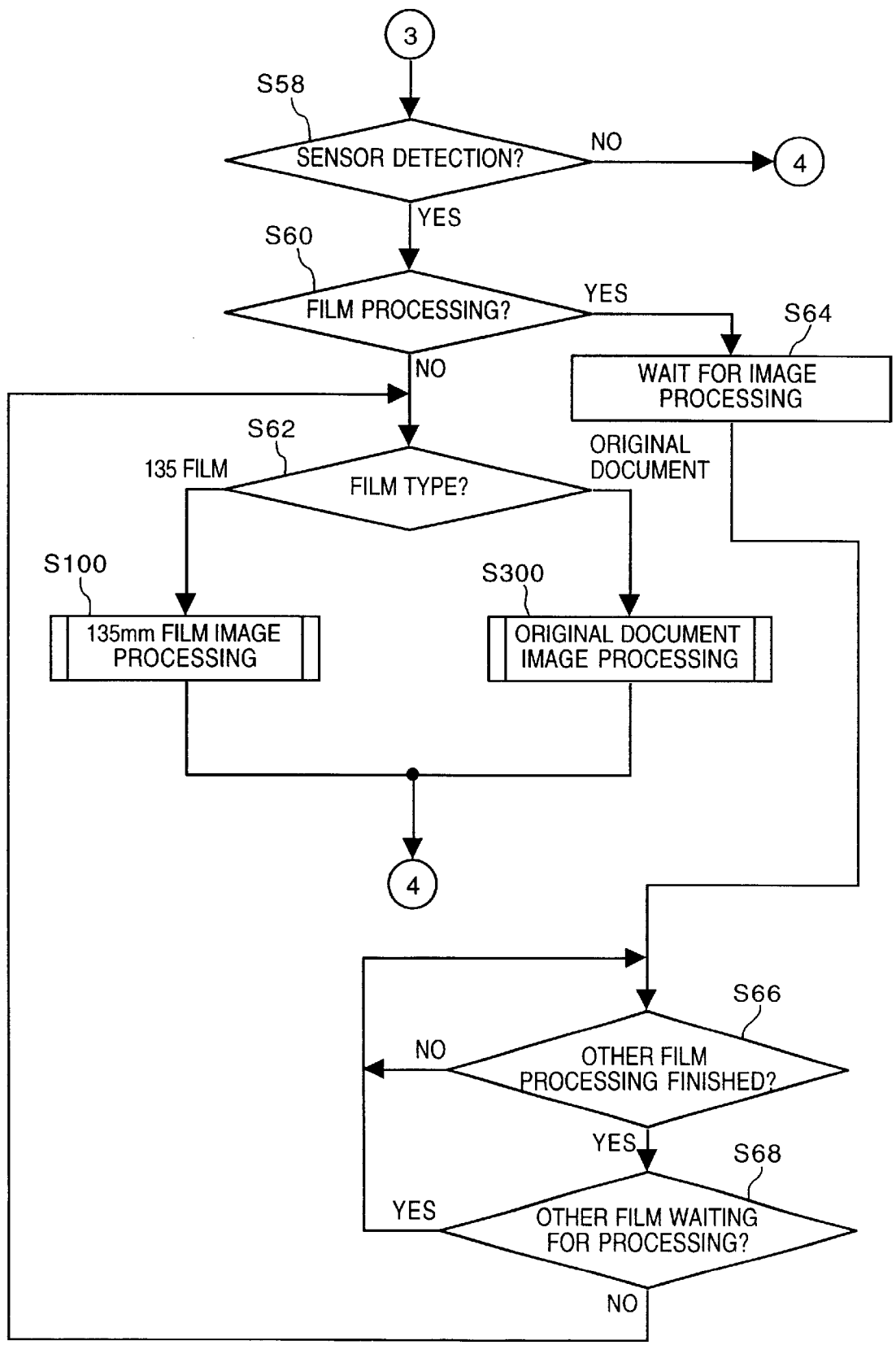
FIG. 22 is another flowchart illustrating the operation of the second embodiment.

Next, description will be made regarding a second embodiment according to the present invention. FIG. 21 and FIG. 22 are flowcharts illustrating the operations of the second embodiment.

With the second embodiment, the scanner device is arranged such that, for example, in the event that mounting of the 135 mm film is attempted while cartridge film CF is being processed, control is made so that the 135 mm film is accepted and image processing preparations are made, and processing of the 135 mm film is conducted following processing of the cartridge film being completed. In other words, with the second embodiment, control is performed so that image processing is performed in the order that the 135 mm film, cartridge film or original document is mounted.

Making more specific description, as shown in FIG. 21, in step S32, the CPU judges whether or not the eject switch 6 is on or not. In the event that the eject switch 6 is on in step S32 (Yes in step S32), the flow proceeds to step S34, and in the event that the eject switch 6 is not on in step S32 (No in step S32), the flow proceeds to a later-described step S58.

In step S34, the CPU 323 judges whether any of the film types is being currently processed. Judgment of whether processing of film is being performed or not is made according to the detection signals of the sensor K3 shared for bar-code, the CF present sensor F4, and the original document presence sensor K2. In the event that processing of film is not being performed in step S34 (No in step S34), the flow proceeds to step S50 and sends the Cartridge film mounting unit 11 to the open position. The operator mounts the cartridge film CF to the mounting hole 12 in step S8, and the detection signals of the CF detecting sensor K4 are output to the CPU 323. In the case that judgment is made in step S54 that cartridge film CF is present, based on the output signals of the CF detecting sensor K4, the Cartridge film mounting unit 11 is stored in the closed position. Subsequently, the flow proceeds to step S200, and executes a sub-routine program described in FIG. 26 for processing the cartridge film images.

In the event that processing of film is being performed in step S34 (Yes in step S34), the flow proceeds to step S36 and judges whether or not the film being processed is cartridge film CF or not. In the event that the film being processed in step S36 is cartridge film CF (Yes in step S36), the flow proceeds to step S56 and forbids acceptance of film, and also blinks the red light of the cartridge film CF indicator 15 to notify the user that cartridge film CF is being processed. In the event that the film being processed in step S36 is not cartridge film CF (No in step S36), the flow proceeds to step S38 and sends the Cartridge film mounting unit 11 to the open position. The operator mounts the cartridge film CF to the mounting hole 12 in step S38, and the detection signals of the CF detecting sensor K4 are output to the CPU 323. In the case that judgment is made in step S42 that cartridge film CF is present, based on the output signals of the CF detecting sensor K4, the Cartridge film mounting unit 11 is stored in the closed position. Subsequently, in step S44, other film is being processed, so the state is that of waiting for image processing of cartridge film. In this image processing waiting state, the mounted cartridge film is held in the Cartridge film mounting unit 11 in the event that it is not in use. In step S46, the CPU 323 waits until the processing of the other film is completed, and when the processing of the other film is completed (Yes in step S46), judgment is made in step S48 whether or not there is other film waiting for processing or not. In the event that there is other film waiting for processing in step S48, (Yes in step S48), the flow returns to step S46 and waits until the processing of the other film is completed. In the event that there is no other film waiting for processing in step S48, (No in step S48), the flow proceeds to step S200, and executes a sub-routine program described in FIG. 26 for processing the cartridge film images.

Next, as shown in FIG. 22, in the event that the eject switch is not on in step S32 (No in step S32), the flow proceeds to step S58, and makes judgment whether any of film F, cartridge film CF, or original documents G have been mounted to the scanner device, based on detection signals of the sensor K3 shared for bar-code, CF presence sensor K4 or original document sensor K2. In the event that any of the sensors detects mounting in step S58 (Yes in step S58), the flow proceeds to step S60, and in the event that none of the sensors detects mounting in step S58 (No in step S58), the flow returns to step S32.

In step S60, the CPU 323 makes judgment whether any of types of film are being processed. Judgment of whether any of types of film are being processed or not is made based on detection signals of the sensor K3 shared for bar-code, CF presence sensor K4 or original document sensor K2. In the event that film is not being processed in step S60 (No in step S20), the flow proceeds to step S62 and judges the type of film mounted to the scanner device. In the event that 135 mm film F is mounted in step S62, the flow proceeds to step S100, and performs the 135 mm film image processing sub-routine program described in FIG. 24. Also, in the event that an original document G is mounted in step S62, the flow proceeds to step S300, and performs the original document image processing sub-routine program described in FIG. 27.

Next, in the event that there is film being processed in step S60 (Yes in step S60), the flow proceeds to step S64, and since other film is being processed, the state is that of waiting for image processing of the 135 mm film or original document. In this image processing waiting state, the mounted the 135 mm film or original document is held in the continuous film unit 100 or the reflective original document reading unit 20 in the event that it is not in use. In step S66, the CPU 323 waits until the processing of the other film is completed, and when the processing of the other film is completed (Yes in step S66), judgment is made in step S68 whether or not there is other film waiting for processing or not. In the event that there is other film waiting for processing in step S68, (Yes in step S68), the flow returns to step S66 and waits until the processing of the other film is completed. In the event that there is no other film waiting for processing in step S68, (No in step S68), the flow proceeds to step S62 and judges the type of film mounted to the scanner device, and executes subsequent processing.

Hence, according to the second embodiment, film is processed in the order that it is mounted, so there is no need to wait for film being processed to finish in order to mount film, meaning that processing efficiency and handiness is improved.

<Third Embodiment>

Figure 23:
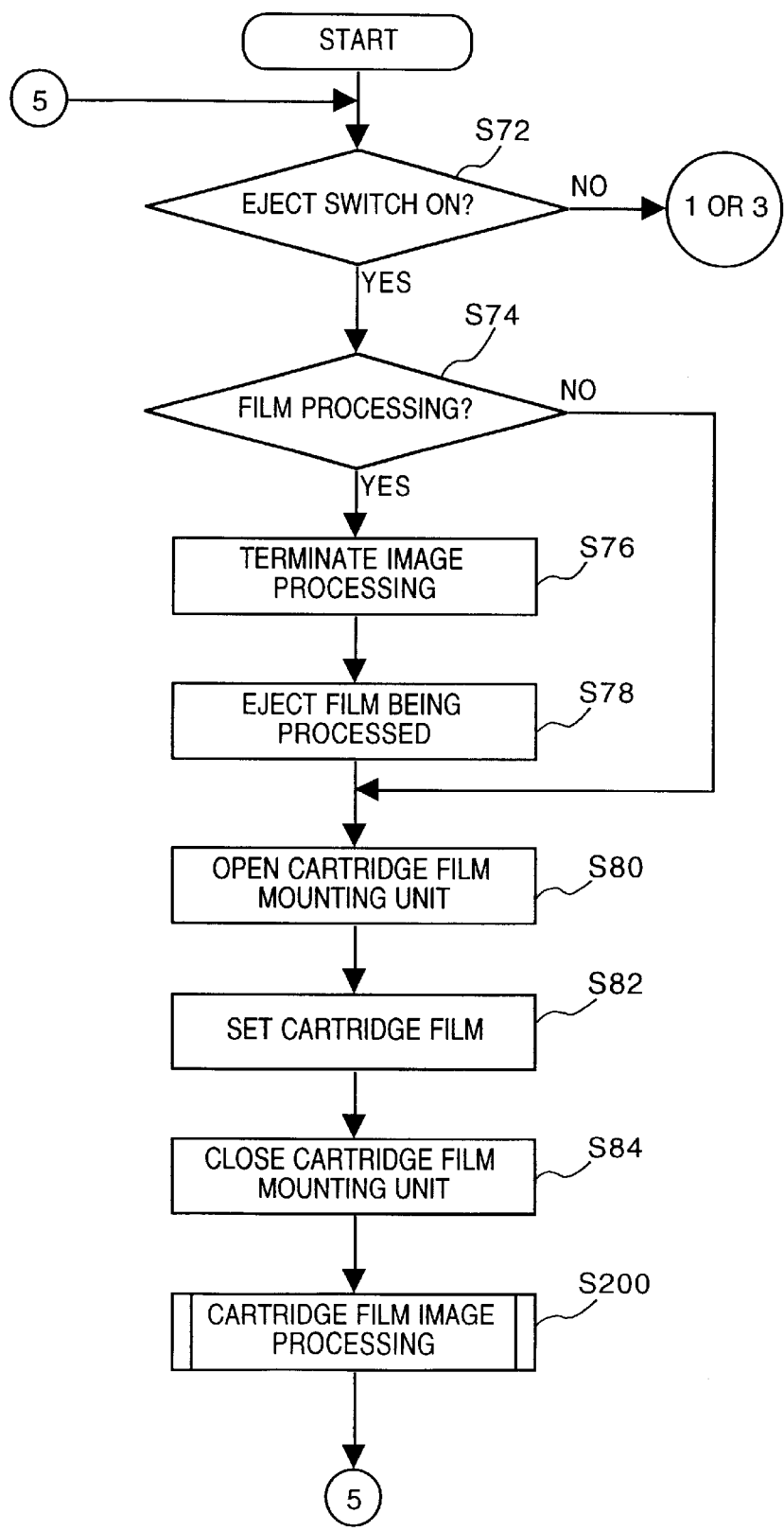
FIG. 23 is a flowchart illustrating the operation of a third embodiment.

Next, description will be made regarding a third embodiment according to the present invention. FIG. 23 is a flowchart illustrating the operations of the third embodiment.

With the third embodiment, the scanner device is arranged such the eject switch 6 serves both for opening and closing the Cartridge film mounting unit 11 and forced ejection functions of film being processed. In the event that the operator presses the eject switch 6 during processing of any of the 135 mm film, cartridge film, or original document, the processing is terminated and the film is ejected, or, in the event that there is no film being processed, the Cartridge film mounting unit 11 is open/close controlled.

Making more specific description, as shown in FIG. 23, in step S72, the CPU judges whether or not the eject switch 6 is on or not. In the event that the eject switch 6 is on in step S72 (Yes in step S72), the flow proceeds to step S74, and in the event that the eject switch 6 is not on in step S72 (No in step S72), the flow proceeds to either the above-described step S18 or step S58.

In step S74, the CPU 323 judges whether any of the film types is being currently processed. Judgment of whether processing of film is being performed or not is made according to the detection signals of the sensor K3 shared for bar-code, the CF present sensor F4, and the original document presence sensor K2. In the event that processing of film is not being performed in step S74 (No in step S74), the flow proceeds to step S80 and sends the Cartridge film mounting unit 11 to the open position. The operator mounts the cartridge film CF to the mounting hole 12 in step S8, and the detection signals of the CF detecting sensor K4 are output to the CPU 323. In the case that judgment is made in step S84 that cartridge film CF is present, based on the output signals of the CF detecting sensor K4, the Cartridge film mounting unit 11 is stored in the closed position. Subsequently, the flow proceeds to step S200, and executes a sub-routine program described in FIG. 26 for processing the cartridge film images.

In the event that film is being processed in step S74 (Yes in step S74), the flow proceeds to step S76 and terminates the film image processing that is currently being processed, and ejects the film of which processing has been terminated in step S78. Subsequently, the flow proceeds to step S80, and sends the Cartridge film mounting unit 11 to the open position.

Thus, according to the third embodiment, sharing functions of the film opening and closing switch and forced ejection switch simplifies the switching circuitry and reduces costs.

<Image Processing Operation for 135 mm Film>

Figure 24:
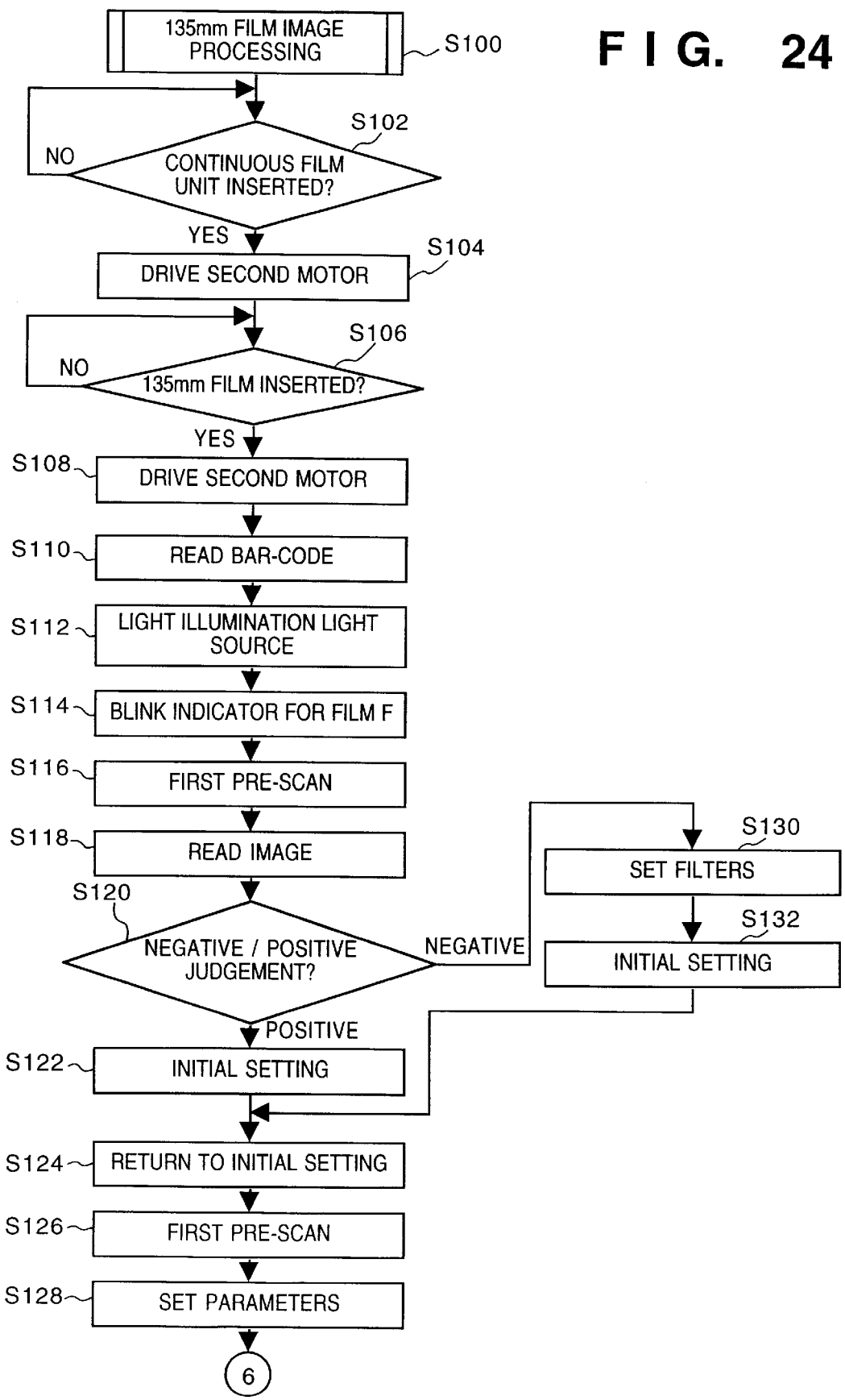
FIG. 24 is a flowchart illustrating the operation of image processing for 135 mm film.
Figure 25:
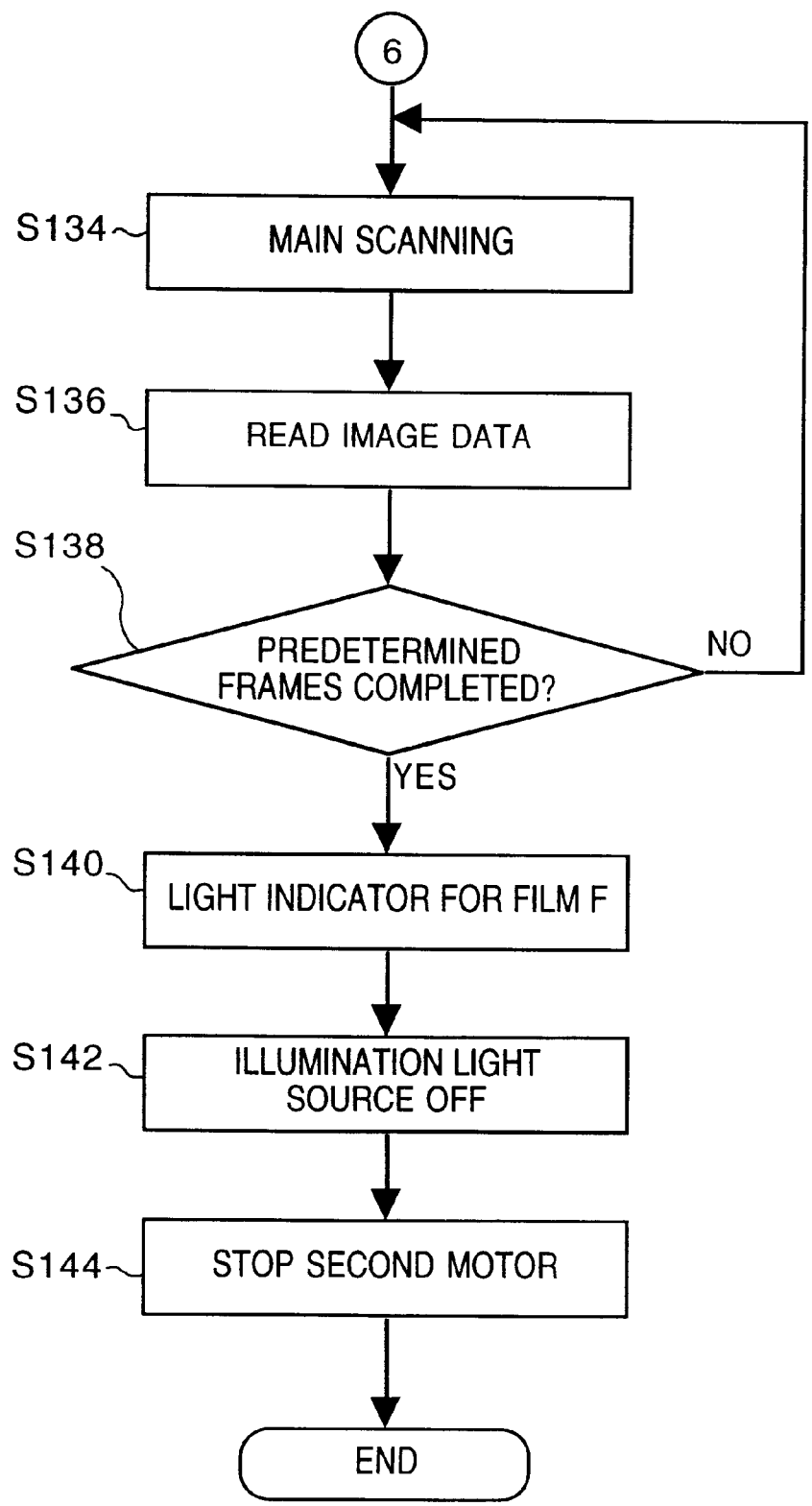
FIG. 25 is another flowchart illustrating the operation of image processing for 135 mm film.

Next, image processing operation of 135 mm film with the scanner device will be described. FIG. 24 and FIG. 25 are flowcharts illustrating this image processing operation of 135 mm film.

With the image processing operation of 135 mm film, the scanner device performs both detection of insertion and reading of the bar-code with the sensor K3 shared for bar-code. The 135 mm film is fed out to around the center of the first frame in the first pre-scan, around the center of the first frame of the 135 mm film is read, and AF processing is executed. Subsequently, the 135 mm film is returned to the original position, all of the frames of the 135 mm film are fed out in the second pre-scan in which the various parameters are set, following which control is performed to read image data from the 135 mm film in the main scan. Incidentally, as shown in FIG. 1, the 135 mm film is developed negative film F, unmounted positive film, and mounted positive film MF.

Specifically, as shown in FIG. 24, in step S102, the CPU 323 waits for the continuous film unit to be mounted. In the event that mounting of the continuous film unit is detected in step S102 (Yes in step S102), the second motor is driven in step S104 and the continuous film unit is driven to the predetermined position. After the continuous film unit is detected by the sensor K3 shared for bar-code, the second motor is driven until detected by the end sensor K5.

In step S106, the flow waits for the 135 mm film to be mounted. Once the sensor K3 shared for bar-code detects mounting of the 135 mm film in step S106 (Yes in step S106), the second motor is driven in step S108 and is sent to the initial position. In step S110, the barcode provided to the top and bottom portions of the film is read by the sensor K3 shared for bar-code as the 135 mm film F is fed to the initial position. This bar-code has recorded information such as the film manufacture, ISO value, and so forth.

In step S112, the cold cathode tube which serves as an illumination light source is lit. In step S114, the F indicator 16 blinks green to indicate that film is being scanned. In step S116, the 135 mm film or slide film unit is fed out to around the center of the first frame in the first pre-scan (See FIG. 17(b)), and in step S118, around the center of the first frame of the film is read, and in step S120 judgment is made from the image concentration of the read first frame whether the film is negative or positive film. In the event that the film fed in step S120 is positive film, the flow proceeds to step S122, and executes AF processing as an initial setting. Also, in the event that the film fed in step S120 is negative film, the flow proceeds to step S130, the filter 41 is set, and executes AF processing as an initial setting in step S132. The reason that the filter is set in step S130 is in order to remove the orange color of the negative film.

Figure 17C:
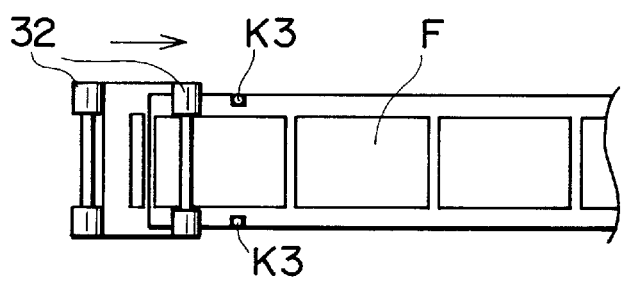
Figure 17D:
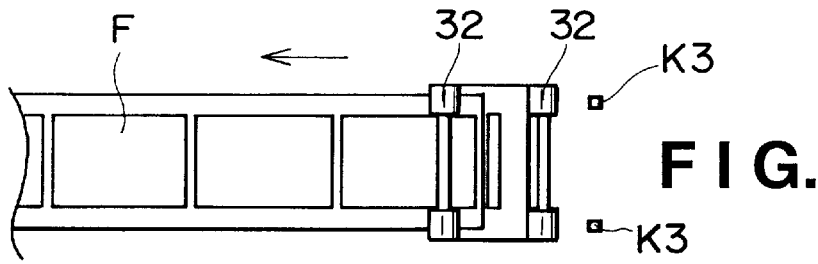

In step S124, the 135 mm film or slide film unit is returned to the initial position (See FIG. 17(c)), and in step S126 all of the frames of the 135 mm film or slide film unit are fed out as a second pre-scan (See FIG. 17(d)), and in step S128, parameters such as brightness of the light source, accumulation time for the CCD, exposure amount such as gain, are set, thereby preparing to read the image.

Figure 17E:
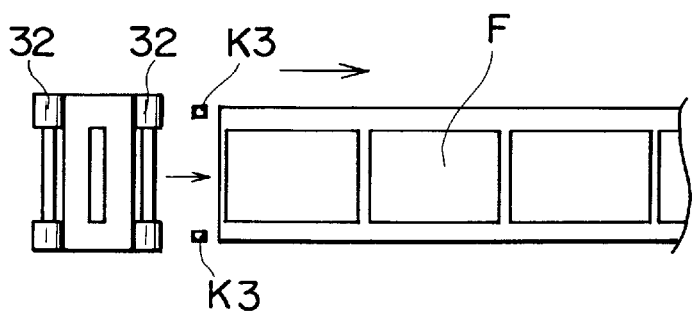

Next, as shown in FIG. 25, in step S134, the second motor is reversed as main scanning and the film is fed in the reverse direction (See FIG. 17(e)), and the image of each frame is read in step S136. In step S138, the processing of steps S134 and 136 is repeated until the images of all frames have been read, and at the point that images of the certain number of frames have been read, the flow proceeds to step S140 and switches the F indicator 16 from blinking green to solid green, indicating that image reading has been completed. In step S142, the cold-cathode 34 serving as the light source is turned off, and the second motor is stopped in S144 and image processing of the 135 mm film or positive film is completed.

As described above, the scanner device performs both detection of insertion and reading of the bar-code with the sensor K3 shared for bar-code, meaning that the number of sensors can be reduced, simplifying the sensor circuitry and reducing cost.

Also, performing auto-focusing and judging whether the film is negative film or positive film in a first pre-scan using the first frame of the film prior to the second pre-scan for setting film parameters allows for image reading with the film format having been accurately judged.

<Image Processing Operation of Cartridge Film>

Figure 26:
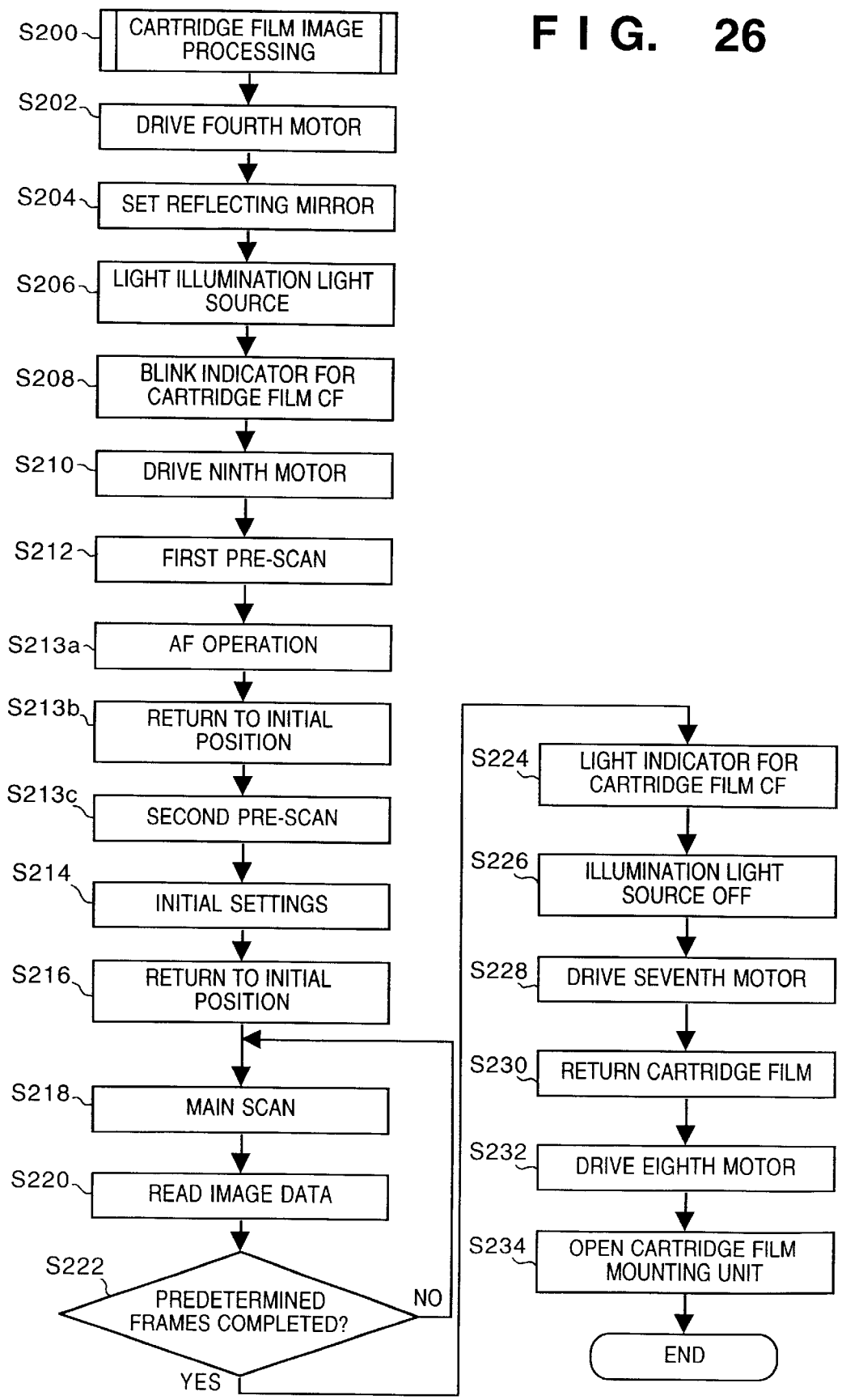
FIG. 26 is a flowchart illustrating the operation of image processing for APS film.

Next, the image processing operation of cartridge film will be described. FIG. 26 is a flowchart indicated the image processing operation of cartridge film.

With image processing operation of cartridge film, the scanner device is controlled so as to first feed out all frames of the cartridge film in a pre-scan and perform color correction, and then subsequently read the images from the cartridge film in the main scanning.

Specifically, as shown in FIG. 26, in step S202, the CPU 323 activates the fourth motor, and in step S204 sets the reflecting mirror 48 in the direction of the cartridge film. In step S206, the cold cathode tube 64 which serves as an illumination light source is lit. In step S208, the film indicator 16 blinks green to indicate that film is being scanned. In step S210, the ninth motor is activated, and in step S212, film is fed out to around the center of the first frame approaches the imaging optical axis as a first pre-scan, and one line of image is read. After executing AF processing with that data in step S213a, the film is rewound to the initial position in step S213b, following which all of the frames are fed out as a second pre-scan and roughly read in step S213c. In step S214, the various parameters are set, thereby preparing to read the image.

Next, in step S216, the cartridge film of which all frames had been fed out is rewound to original position. In step S218, the cartridge film is fed out again for main scanning, and the image of the certain frames is read in step S220. In step S222, the processing of steps S218 and S220 is repeated until the images of all frames have been read, and at the point that images of the certain number of frames have been read, the flow proceeds to step S224 and switches the film indicator 16 from blinking green to solid green, indicating that image reading has been completed. In step S226, the cold-cathode 64 serving as the light source is turned off, and the seventh motor is driven in steps S228 and S230 to rewind the cartridge film, and the eighth motor is driven in steps S232 and S234 to move the Cartridge film mounting unit 11 to the open position, thus completing image processing of the cartridge film.

<Image Processing Operation of Original Documents>

Figure 27:
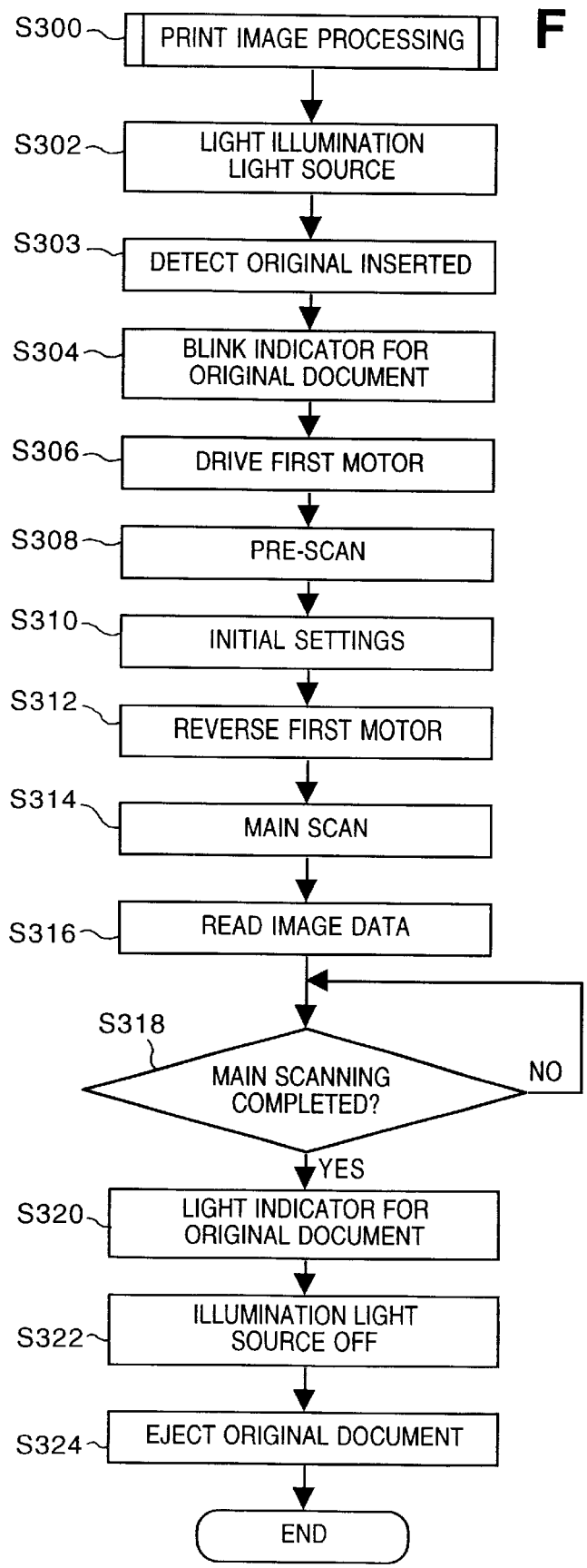
FIG. 27 is a flowchart illustrating the operation of image processing for original documents.

Next, the image processing operation of original documents will be described. FIG. 27 is a flowchart indicated the image processing operation of original documents.

With image processing operation of original documents, the scanner device is controlled so as to first feed out the entire original document in a pre-scan and perform color correction, and then subsequently read the image from the original document in the main scanning.

Specifically, as shown in FIG. 27, in step S302, the CPU 323 lights the cold cathode tube 23 which serves as an illumination light source. Upon the sensor K1 detecting insertion of the original document in step S303, the G indicator 16 blinks green in step S304 to indicate that an original document is being scanned. In step S306, the first motor is activated, and in step S308, the entire original document is fed out as a pre-scan, and in step S310, the various parameters are set, thereby preparing to read the image.

Next, in step S312, the first motor is reversed, main scanning is performed in step S314, and the entire image of the original document is read in step S316. The flow waits in step S318 until the main scanning is completed, and once the main scanning is completed, the flow proceeds to step S320 and switches the original document indicator 17 from blinking green to solid green, indicating that image reading of the original document has been completed. In step S322, the cold-cathode 23 serving as the light source is turned off, and the first motor is reverse-driven in step S324 to return the original document to the original document insertion/ejecting opening, thus completing image processing of the original document.

[Fourth Embodiment]

Figure 28:
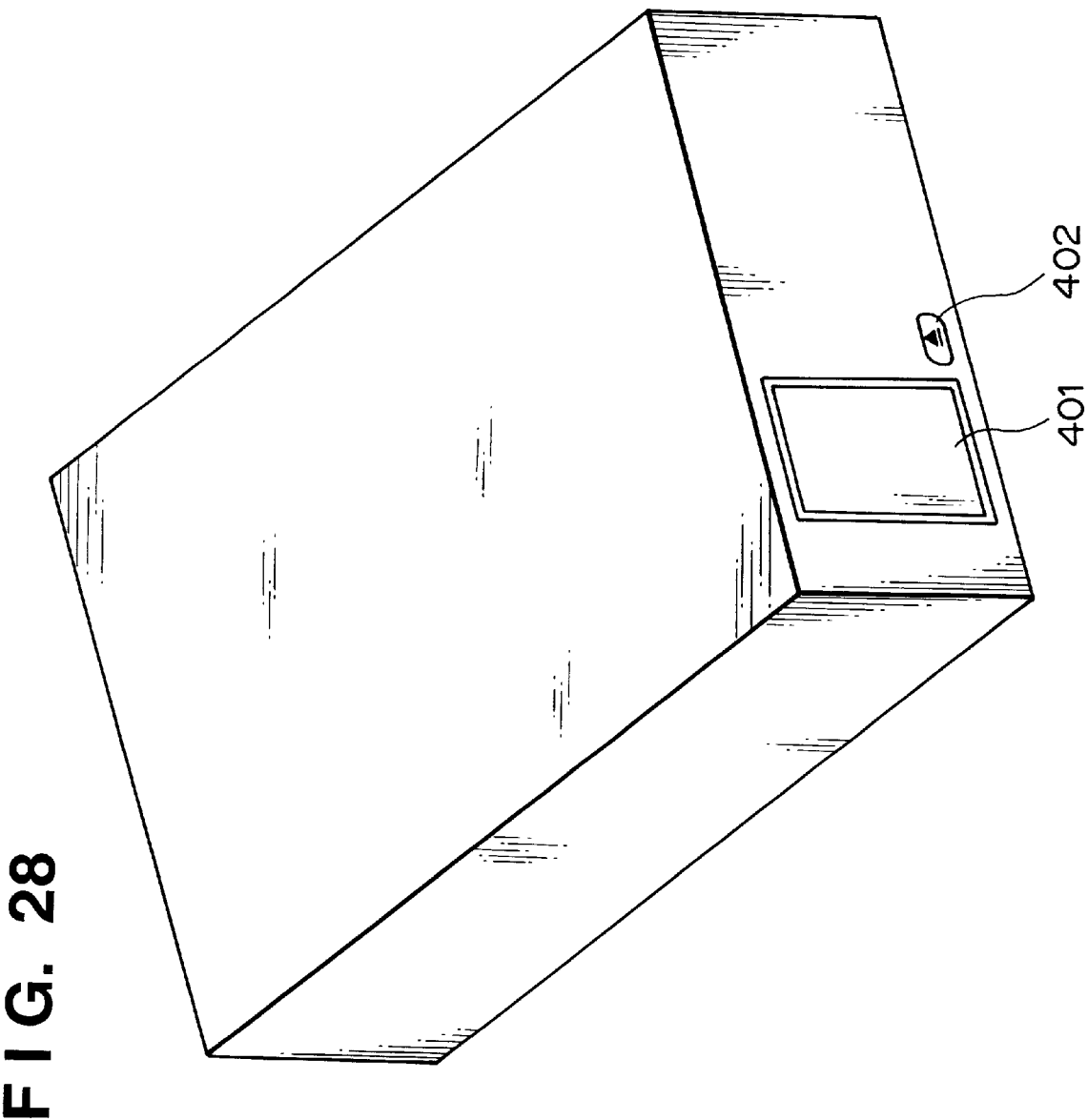
FIG. 28 is an external perspective view of a film scanner device according to the fourth embodiment of the present invention.

FIG. 28 is an external perspective view of the film scanner device according to the fourth embodiment. This film scanner device is connected to an unshown host computer, and operations other than inserting and removing the film cartridge (e.g., reading a film image) are performed according to commands input from a host computer.

In FIG. 28, 401 denotes a cartridge tray, and 402 is an eject switch for causing the cartridge tray to extend from or to be stored inside the main unit.

Figure 29:
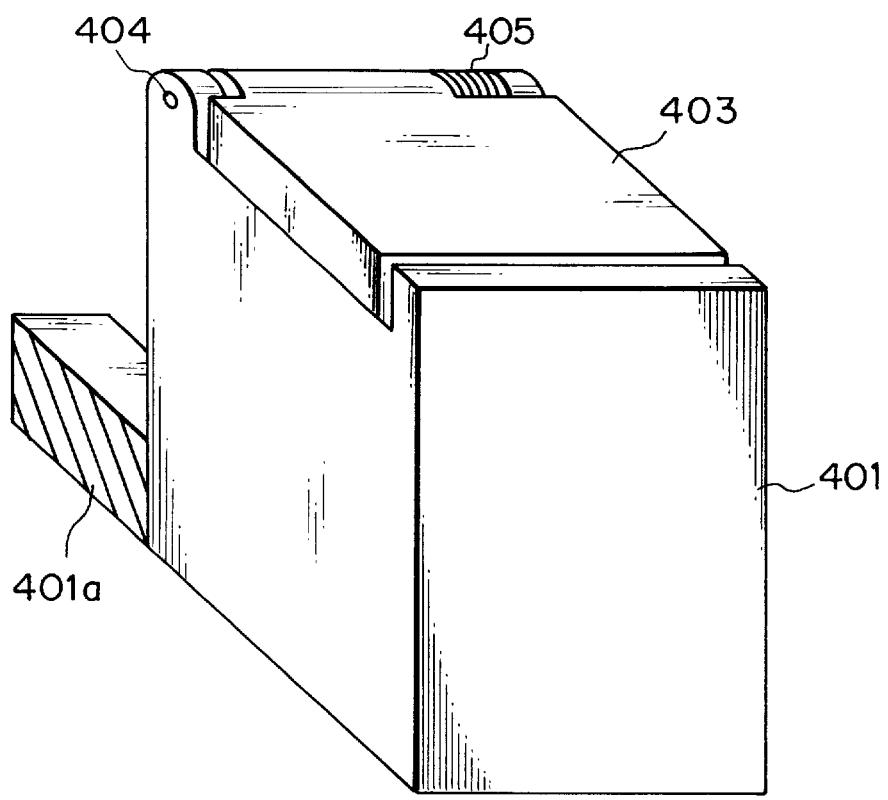
FIG. 29 is a perspective view of a cartridge tray unit in the state of being stored in the scanner main unit.
Figure 30:
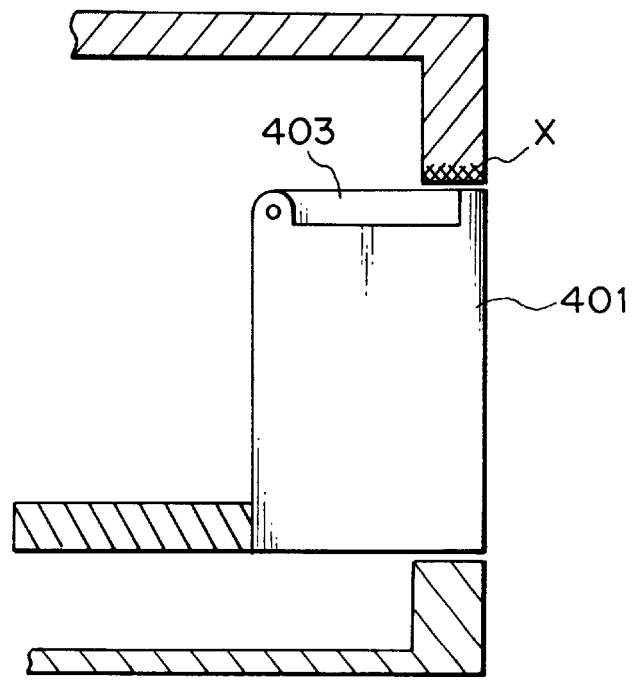
FIG. 30 is a partial cross-sectional view of the cartridge tray unit in the state of being stored in the scanner main unit.
Figure 31:
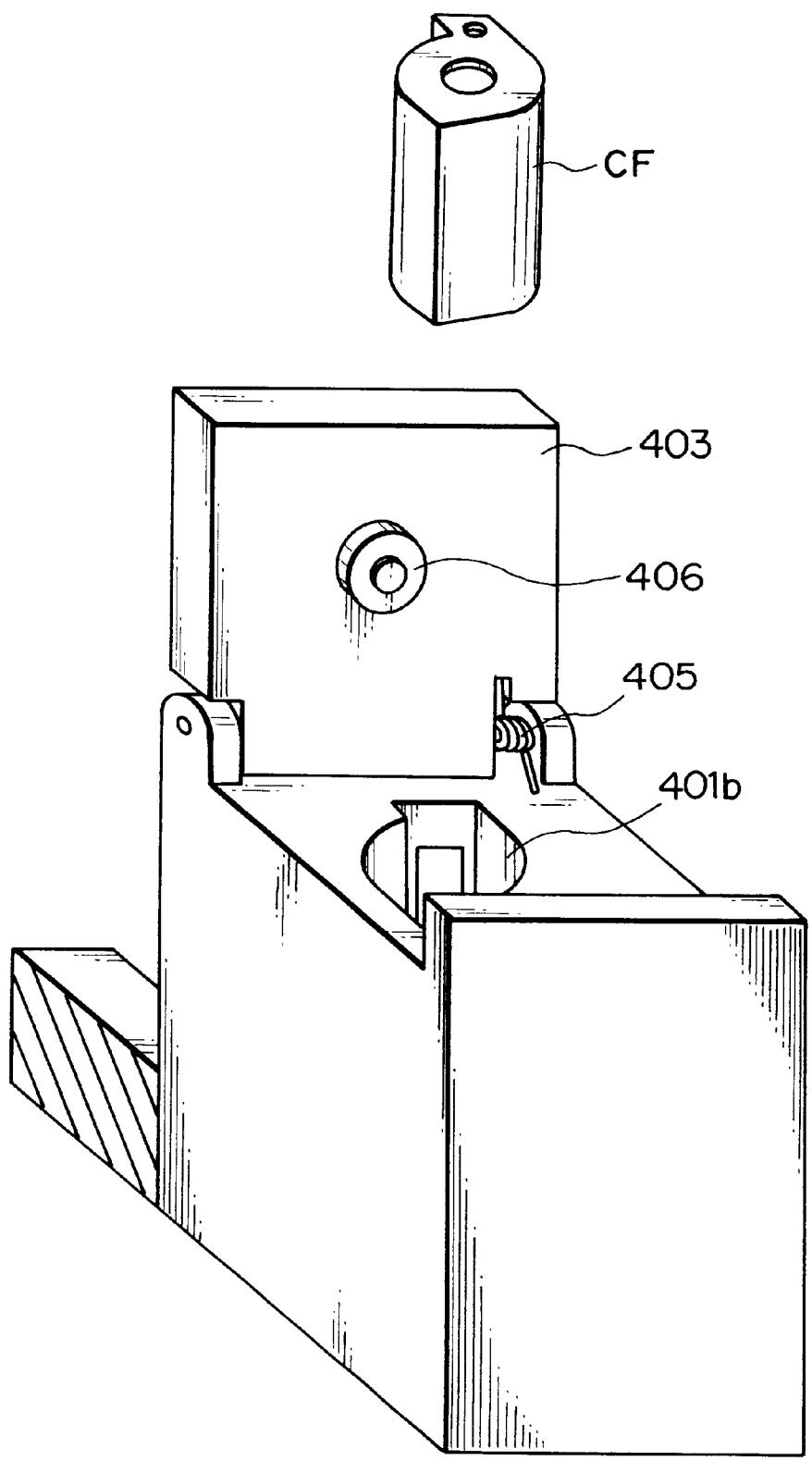
FIG. 31 is a perspective view of a cartridge tray unit in the state of being extended from the scanner main unit.

FIGS. 29 through 31 illustrate the detailed construction of the cartridge tray 411. In FIG. 29 and FIG. 31, 401a denotes a rack portion (with the rack teeth and the like being omitted and indicated by slanted lines), wherein driving force being transmitted from an unshown motor to the rack portion causes the cartridge tray 401 to be extended from or stored to the main unit. As shown in FIG. 31, formed above the cartridge tray 401 is a cartridge chamber 401b of which the top is open, the cartridge CF being mounted to and removed from this cartridge chamber 401b.

403 denotes a tray lid, which is rotatably attached to the upper portion of the cartridge tray 401 by a pin 404. A cartridge depressor 406 is formed on the rear side of this tray lid 403, positioning the cartridge CF within the cartridge chamber 401b in the event that the tray lid 403 is closed, as shown in FIG. 29 and FIG. 30. 405 denotes a torsion spring, which presses the tray lid 403 in the direction of opening.

Figure 32:
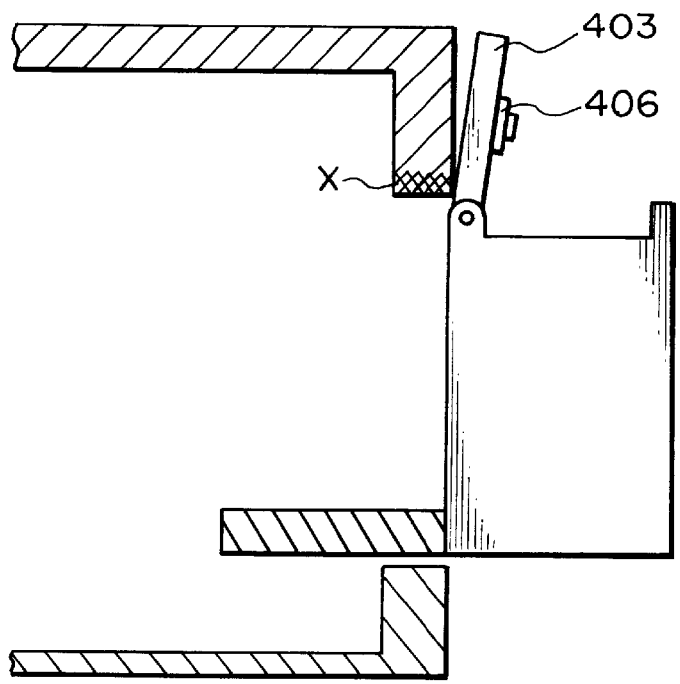
FIG. 32 is a partial cross-sectional view of the cartridge tray unit in the state of being extended from the scanner main unit.

The cartridge tray 1 constructed such is extended from the cart tray 1, as shown in FIG. 32. Since the tray lid 403 does not come into contact with the X portion of the scanner main unit in this extended state, so the tray lid 403 opens by means of the pressing force of the torsion spring 405, thereby allowing mounting of the cartridge CF to the cartridge chamber 401b. Then, once the cartridge tray 401 is stored within the scanner main unit, as shown in FIG. 30, the tray lid 403 is pressed by the X portion of the scanner main unit, and is closed against the force of the torsion spring 405.

Now, the cartridge CF has a light-shielding door which opens and closes the film ejecting opening, the leading end of the film being extended to a redetermined position within the scanner by means of the light-shielding door being opened in the state that the cartridge CF is positioned within the cartridge chamber 401b and by means of the spool within the cartridge being rotatably driven by a later-described fork.

Figure 33:
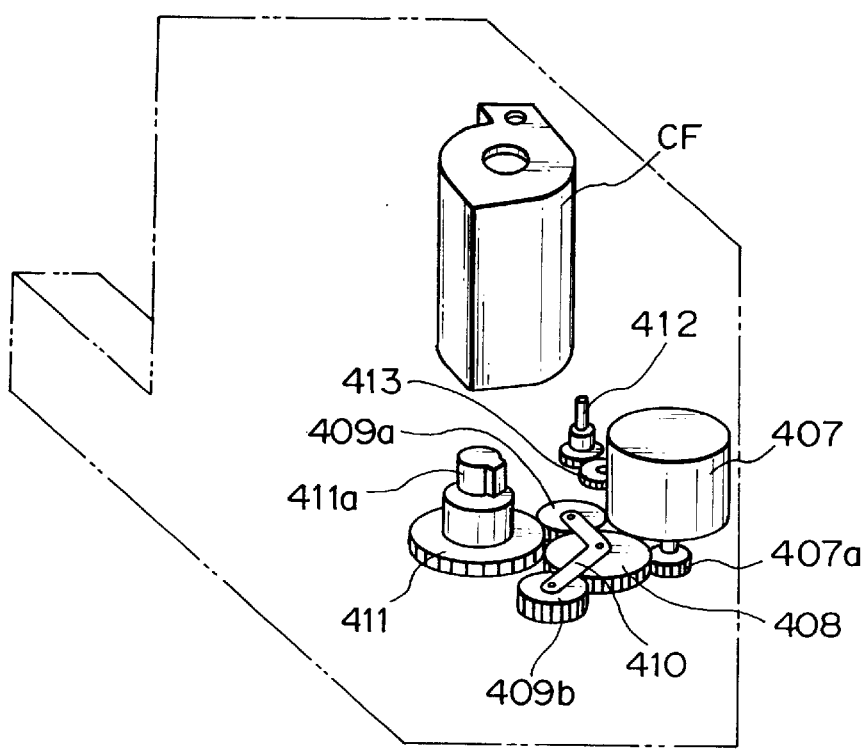
FIG. 33 is a perspective view illustrating the internal construction of the cartridge tray unit.

Accordingly, a thrust mechanism illustrated in FIG. 33 is provided within the cartridge tray 401. In FIG. 33, 407 denotes a thrust motor, which is fixed within the cartridge tray 401, and generates driving force for extending film from the cartridge CF and rewinding film into the cartridge CF.

408 denotes a sun gear, which receives driving force from a pinion gear 407a pressed into the thrust motor 407. 409a and 409b are planetary gears, and are rotatably held by a rotatable planetary arm 408 with the rotational axis of the sun gear as the center thereof. The planetary gears 409a and 409b are meshed with the sun gear 408, these gears comprising a known planetary mechanism.

411 is a fork gear, integrally comprising a fork 411a which engages a spool within the cartridge CF mounted to the cartridge chamber 401b.

412 is a door gear which integrally comprises a lever for engaging the light-shielding door of the cartridge CF for opening/closing driving thereof, with the driving force from an unshown motor being transmitted thereto, and meshing with a transmission gear 413.

Figure 34:
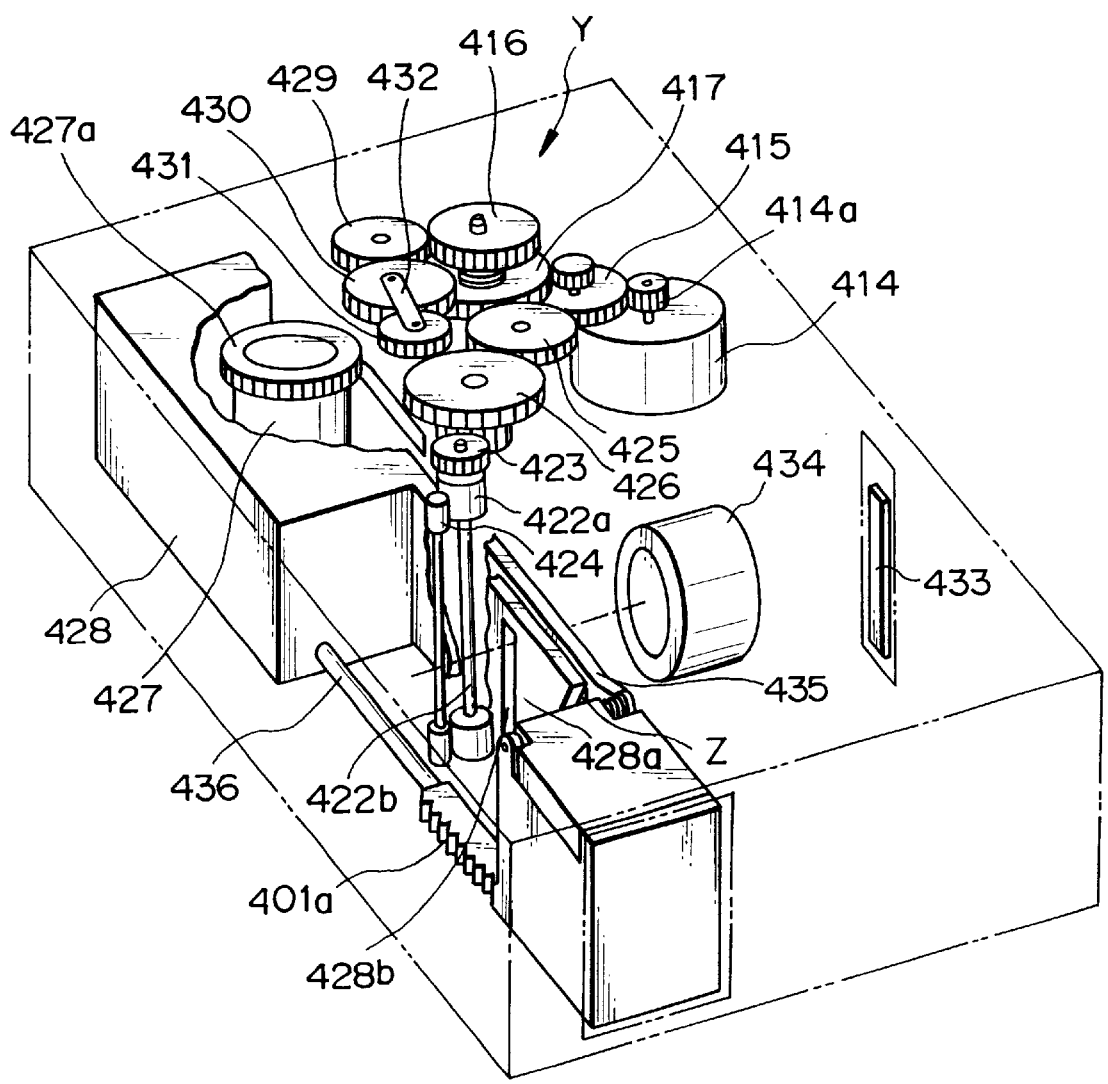
FIG. 34 is a perspective view illustrating the internal construction of the film scanner device.

On the other hand, a film feeding mechanism shown in FIG. 34 is provided within the scanner main unit. Incidentally, FIG. 34 illustrates the state of the cartridge tray stored.

414 denotes a stepping motor which is fixed to an unshown main unit base. 415 is a deceleration gear, and the large-diameter gear portion engages with a pinion gear 14a pressed into the output shaft of the stepping motor, and the small-diameter gear portion engages with a lower friction gear 417 of a friction gear unit Y, so that the motor driving force received from the pinion gear 414 is transmitted to the lower friction gear 417 while amplifying the force thereof.

Figure 35:
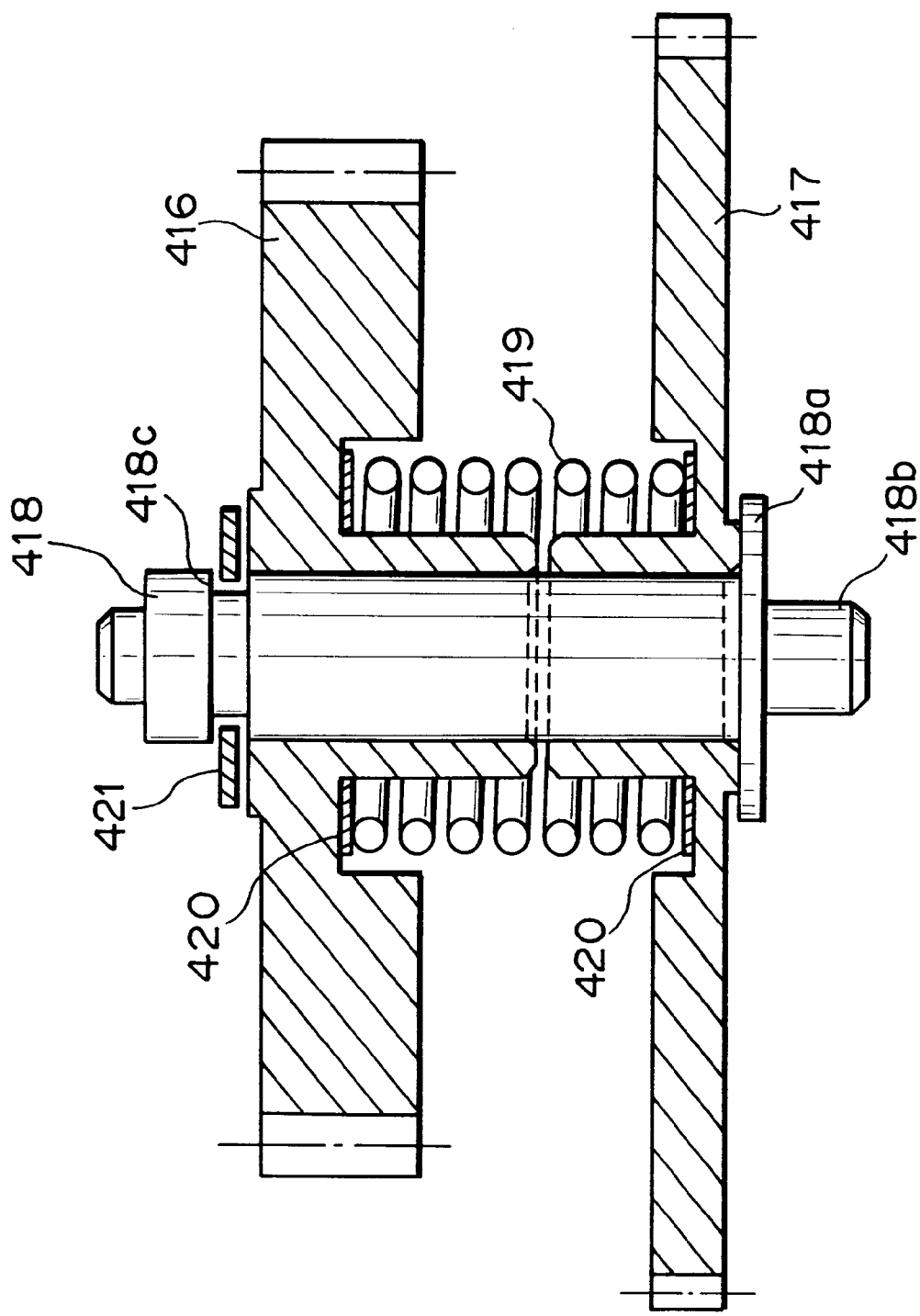
FIG. 35 is a cross-sectional view of the friction gear unit of the film scanner device.

A detailed construction of the lower friction gear 417 is illustrated in FIG. 35.

In FIG. 35, 416 is an upper friction gear for transmitting driving force to a later-described winding spool, and 417 is a lower friction gear for transmitting driving force to a later-described feeding roller. 418 denotes the friction gear shaft, with the lower flange 418a thereof restricting the position of the lower side of the lower friction gear 417, and also rotatably fitting to the main unit base at a fitting portion 418b.

419 is a pressure spring, pressing the upper friction gear 416 upwards and the lower friction gear 417 downwards. 402 is a washer, for generating appropriate friction between the friction gears 416 and 417 and the pressure spring 419. 421 is a position restricting ring, which is pressed into a groove 418c of the friction gear shaft 418, and restricts the position of the upper side of the upper friction gear 416.

According to such a construction, with the friction gear unit Y, the force transmitted to the lower friction gear 417 is only transmitted to the upper friction gear 416 only in the event that the rotational load of the upper friction gear is smaller than the above-described friction, and in the event that friction greater than that is applied to the upper friction gear 416, slippage occurs between the upper friction gear 416 and the pressure spring 419, so the driving force of the lower friction gear 417 is not transmitted to the upper friction gear 416.

The spool chamber forming material 428 shown in FIG. 34 forms a spool chamber opposite the storage unit of the cartridge tray 401 in the scanner main unit. A rail portion 428a which extends to the side of the cartridge tray 401 is formed to the spool chamber forming material 428. 435 is a pressing plate, which forms a film path Z with the rail portion 428a of the spool chamber forming material 428.

422 denotes a feeding roller, integrally comprising upper and lower rubber portions 422a and a shaft 422b which coaxially connects the rubber portions, the feeding roller 422 being rotatably held by the main unit base. 424 is a sub-roller, and is pressed against the rubber portions 422a by means of an unshown spring in order to nip the film passing through the film passage Z, in cooperation with the rubber portions 422a of the feeding roller 422. Incidentally, portions of the pressing plate 435 and rail portion are notched, in order to allow the rubber portions 422a of the feeding roller 422 and the sub-roller 424 to protrude into the film path Z.

425 is an idler gear, and 426 is a roller deceleration gear. The idler gear 425 meshes with the lower friction gear 417 and the large diameter gear portion of the roller deceleration gear 426, while the small diameter gear portion of the roller deceleration gear 426 meshes with the roller driving gear 423.

427 denotes a winding spool, which is rotatably supported within the spool chamber. This winding spool 427 winds film fed by the feeding roller 422 by its own rotation. Incidentally, a spool gear 427a is integrally formed to the upper portion of the winding spool 427.

429 is a spool transmitting gear, which meshes with the upper friction gear 416 and a clutch sun gear 430. 431 denotes a clutch planetary gear, which is rotatably held by a clutch arm 432 which rotates with the rotational axis of the clutch sun gear 430 as the center thereof. In other words, the clutch planetary gear orbits between a position of meshing with the spool gear 427a according to the direction of rotation of the sun gear 430, and a position of meshing with none of the gears.

433 is a line sensor, which is fixed to a base plate provided to the side of the imaging surface side. This line sensor 433 converts a film image, formed upon the line sensor via the photography optical system 434, into electrical signals (i.e., reads the film image) and sends the electrical signals to the host computer.

Light from a back-light is provided to the photography optical system 434 at a position such that the light is cast through a slit 428b formed to the rail portion 428a of the spool chamber forming member 428, and an unshown slit in the pressing plate. Accordingly, the image of the portion of the film in the film passage Z passing over these slits is imaged on the line sensor 433 via the photography optical system 434.

436 denotes a tray guide bar, which guides the movement of the cartridge tray 401 relative to the scanner main unit.

Next, description will be made regarding the operation of the scanner device. First, when the eject switch 402 shown in FIG. 28 is pressed, the cartridge tray 401 receives driving force from an unshown motor to the rack portion 401a thereof, and is extended from the scanner (see FIG. 32), being guided by the cart tray guide bar 436. Then, the cartridge CF is inserted from the top into the cartridge chamber of which the tray lid 403 is opened. Pressing the eject switch 402 once more causes the aforementioned unshown motor to rotate in reverse, so that the cartridge tray 401 is stored within the scanner main unit (see FIG. 30). At this time, the tray lid 403 is pressed by the X portion and gradually closes against the force of the torsion spring 405.

Next, film feeding operation in the direction of winding the film is started, by instruction from the unshown host computer. First, an unshown door motor is rotated forwards, thus driving the transmission gear 413 shown in FIG. 33, and rotating the door gear in the forward direction.

In the event that the thrust motor 407 is rotated forwards in this state, the planetary gear 409a meshes with the fork gear 411, causing forward rotation thereof, so the film is fed out from the cartridge CF.

In the event that the stepping motor 414 is also rotated forwards while the thrust motor 407 is rotated forwards, the driving force thereof is transmitted to the feeding roller 422, via the lower friction gear 417, idling gear 425, roller deceleration gear 426, and roller driving gear 423. The film which has been fed out to the position at which it is pinched between the feeding roller 422 and sub-roller 424 begins being driven in the winding direction by these rollers 422 and 424. Incidentally, the film feeding speed of the fork gear 411 is made to be slower than the film feeding speed of the feeding roller 422, thereby placing driving force from the film upon the fork gear 411 so that the engagement between the planetary gear 409a and the fork gear 411 is dissolved, and consequently the fork gear 411 rotates freely. Accordingly, the only member driving the feeding of the film is the feeding roller 422 alone, and accurate film feeding can be conducted by controlling the stepping motor 414. Moreover, the film feeding speed of the fork gear 411 is made to be slower than the film feeding speed of the feeding roller 422, so there is no flexing of film positioned between the feeding roller 422 and the spool within the cartridge (fork gear 411). Accordingly, reading of the film image by the line sensor can be performed properly.

On the other hand, the rotation of the lower friction gear 417 is transmitted to the upper friction gear 416 by friction between the washer 420 and pressure spring 419, is further transmitted to the spool gear 427a via the spool transmission gear 494, and the clutch planetary gear 431 which has orbited to a position of meshing with the clutch sun gear 430 and spool gear 427a, thereby rotating the winding spool 427. The winding spool 427 winds the film which has been fed into the spool chamber by means of the feeding roller 422. The film winding speed of the winding spool 427 is set to be somewhat faster than the film feeding speed of the roller 422 by means of the gear ratio of the gears, so there is no flexing of film positioned between the feeding roller 422 and the winding spool 427 and the film is wound onto the winding spool 427.

Now, since the film wound onto the winding spool 427 increases in diameter as the amount of the film increases, the film winding speed at the perimeter of the film increases even though the rotation speed of the winding spool is the same. However, in the event that the film winding speed as to the film feeding speed by the feeding roller accelerates to a speed exceeding a certain range (a range within which there is no effect on film feeding by the feeding roller 422), the rotational load of the winding spool 427 which pulls the film nipped between the feeding roller 422 and the sub-roller 424 increases, so slippage occurs between the washer 420 attached to the upper friction gear 416 to which the load is transmitted and the pressure spring 419, thereby decreasing the rotational speed of the winding spool 427. Accordingly, the film winding speed is automatically controlled so that there is always an appropriate degree of tension to the film feeding speed by the roller 422, and consequently, the feeding roller 422 can constantly feed film in the winding direction at a constant speed.

In the event that a rewinding instruction is input from the host computer, the stepping motor 414 starts reverse rotation. Accordingly, the feeding roller 422 also reverse and the film is driven in the direction of being rewound.

Also, the thrust motor 407 is also rotated in reverse simultaneously with the reverse rotation of the stepping motor 414. Accordingly, the planetary gear 409a and the fork gear 411 mesh and the fork gear 411 rotates, so the spool is rotated within the cartridge engaged with the fork 411a and film rewinding is started.

Now, the film rewinding speed by the fork gear 411 (spool within the cartridge) is set to be somewhat faster than the film feeding speed of the roller 422, so there is no flexing of film and the film is rewound into the cartridge CF at a constant speed.

On the other hand, in the event that the stepping motor is reversed, the meshing between the planetary gear 431 and the spool gear is disengaged, so the winding spool is free. Accordingly, the only member driving the feeding of the film is the feeding roller 422 alone, and accurate film feeding can be conducted by controlling the stepping motor 414. Moreover, the film rewinding speed of the fork gear 411 and spool in the cartridge is made to be faster than the film feeding speed of the feeding roller 422, so there is no flexing of film positioned between the feeding roller 422 and the spool within the cartridge (fork gear 411). Accordingly, reading of the film image by the line sensor 433 can be performed properly even during the process of rewinding.

Incidentally, in the event that the film rewinding speed increases according to the increase in film wound onto the spool within the cartridge, it is preferable for means to be provided for controlling the driving speed of the fork gear 411 so that the film rewinding speed as to the film feeding speed by the feeding roller 422 does not accelerate to a speed exceeding a certain range (a range within which there is no effect on film feeding by the feeding roller 422), so that the feeding roller 422 can constantly feed film in the rewinding direction at a constant speed.

Once the film has been thus rewound, the unshown door motor is reversed and the transmission gear 413 is driven, reversing the door gear 412 so that the light-shielding door of the cartridge CF is closed. Then, pressing the eject switch 402 extends the cartridge tray 401 from the scanner main unit, thereby allowing the cartridge CF to be removed from the cartridge tray 401.

Incidentally, in the above embodiment, the driving by the feeding roller 422 and winding spool 427 is performed by a single stepping motor 414 at the time of winding film, in order to reduce the number of motors and related parts, but the present intention can be applied to a scanner of a construction wherein the feeding roller 422 and winding spool 427 are driven by separate motors.

As described above, according to the present embodiment, the film between the feeding roller and cartridge can be fed at a constant speed and without flexing, for both winding and rewinding of the film. Accordingly, employing the film feeding device according to the present invention facilitates realizing of a film reading device which is capable of accurate reading of film images for both winding and rewinding of the film.

Also, employing means for maintaining the difference between the film winding speed by the winding spool and the film feeding speed by the feeding roller within a certain range, and means for maintaining the difference between the film rewinding speed by the spool within the cartridge and the film feeding speed by the feeding roller within a certain range, allows for the film feeding speed by the feeding roller to be maintained at a constant speed regardless of the amount of film on either spool.

OTHER EMBODIMENTS

Incidentally, the present invention may be applied to a system comprised of a plurality of devices (e.g., host computer, interface equipment, reader, printer, etc.), or to a free-standing device (e.g., photocopier, facsimile device, etc.).

Also, it is needless to say that it is an object of the present invention to provide to system or devices a recording medium in which a software program code for realizing the aforementioned functions of the embodiment, so that the functions are realized by the computer (or CPU or MPU) of the system or device reading and executing the program code stored in the storage medium.

In this case, the program code itself read from the recording medium realizes the functions of the embodiment, and thus the storage medium storing the program code comprises the present invention.

Types of storage medium for supplying the computer code include but are not limited to: e.g., floppy disks, hard disks, optical discs, optical-magnetic disks, CD-ROM, CD-R, magnetic tape, non-volatile memory cards, ROM, and so forth.

Also, executing the program code read by a computer not only realizes the above-described functions of the embodiment, but it is needless to say that the present embodiment also encompasses cases in which an operating system or the like operating on the computer performs part or all of the actual processing and the above-described functions of the embodiment are realized as the result of such processing.

Further, it is needless to say that the present embodiment also encompasses cases in which the program code read from the storage medium is read into memory relating to a function expansion board or to a function expansion unit connected to the computer, following which a CPU or the like provided to the function expansion board or function expansion unit performs part or all of the actual processing based on the instruction of the program code and the above-described functions of the embodiment are realized as the result of such processing.

In the case of applying the present invention to the above storage medium, the storage medium will store program code corresponding to the above-described flowcharts.

a first image reading unit for performing photo-electric conversion of light from negative or positive developed silver-salt-type film;

a second image reading unit for performing photo-electric conversion of light from a reflective original document;

a third image reading unit for performing photo-electric conversion of light from cartridge film in which developed silver-salt-type film is stored in a case;

a base which forms the external form of said scanner device;

first transporting means for relatively moving an image of said silver-salt-type film as to said first image reading unit;

second transporting means for relatively moving an image of said reflective original document as to said second image reading unit; and third transporting means for relatively moving an image of said cartridge film to said third image reading unit;

wherein the above are provided to a single plane including the front surface of said base, thus enabling said silver-salt-type film and said reflective original document and said cartridge film to be loaded and ejected from said front surface and the same plane.

What is claimed is:

1. A scanner device, comprising:

a first image reading unit arranged to perform photoelectric conversion while performing relative movement of an image of negative or positive developed silver-salt-type film as to said first image reading unit;

a second image reading unit arranged to perform photoelectric conversion while performing relative movement of an image of a reflective original document to the second image reading unit; and a third image reading unit arranged to perform photoelectric conversion while performing relative movement of an image of cartridge film in which developed silver-salt-type film is stored in a case, wherein the first, second and third image reading units are integrally located within the scanner device.

2. A scanner device according to claim 1, provided with a right opening and a left opening each opening to the right and left directions on said front surface, for mounting said silver-salt-type film to said first transporting unit, structured such that said mounting unit and said left opening come into close proximity.

3. A scanner device according to claim 1, further comprising:

first transporting unit arranged to run said silver-salt-type film as to said first image reading unit;

second transporting unit arranged to relatively move said reflective original document as to said second image reading unit;

third transporting unit having a transporting unit arranged to run said cartridge film to said third image reading unit; and rollers of a cylindrical elastic urethane rubber member formed integrally with a shaft provided to each of said first transporting unit, said second transporting unit, and said third transporting unit, and used as a transporting roller subjected to predetermined driving.

4. A scanner device according to claim 3, wherein said cylindrical elastic member of said roller is integrally formed with said shaft at the portion at which contact is made with the upper/lower edges of said silver-salt-type film, the document surface of said reflective original document, or the upper/lower edges of said cartridge film.

5. A scanner device according to claim 1, further comprising:

a base which forms the external form of said scanner device;

first transporting unit arranged to relatively move an image of said silver-salt-type film as to said first image reading unit;

second transporting unit arranged to relatively move an image of said reflective original document as to said second image reading unit; and third transporting unit having a transporting unit arranged to relatively move an image of said cartridge film in a direction generally orthogonal to a plane which includes the front surface of said base in order to transport said cartridge film as to said third image reading unit;

wherein the structure is such that said silver-salt-type film and said reflective original document and said cartridge film can be loaded and ejected from the same plane including said front surface.

6. A scanner device according to claim 5, comprising optical path changing unit arranged to selectively set between the optical axis between said first image reading unit and said first transporting unit and the optical axis between said third image reading unit and said third transporting unit, in order to share the photo-electric converting device and optical system provided to said first image reading unit and said third image reading unit.

7. A scanner device according to claim 1, further comprising:

a base which forms the external form of said scanner device;

first transporting unit arranged to relatively move an image of said silver-salt-type film as to said first image reading unit;

second transporting unit arranged to relatively move an image of said reflective original document as to said second image reading unit; and third transporting unit arranged to relatively move an image of said cartridge film to said third image reading unit;

wherein the above are provided to the front surface of said base, thus enabling said silver-salt-type film and said reflective original document and said cartridge film to be loaded and ejected from said front surface; and wherein said scanner device further comprises optical path changing unit arranged to selectively set between the optical axis between said first image reading unit and said first transporting unit and the optical axis between said third image reading unit and said third transporting unit, in order to share the photo-electric converting device and optical system provided to said first image reading unit and said third image reading unit.

8. A scanner device according to claim 1, further comprising:

a base which forms the external form of said scanner device, and wherein the first, second and third image reading units are integrally located within the scanner device;

first transporting unit arranged to relatively move an image of said silver-salt-type film as to said first image reading unit;

second transporting unit arranged to relatively move an image of said reflective original document as to said second image reading unit; and third transporting unit arranged to relatively move an image of said cartridge film to said third image reading unit;

wherein the said image reading units and transporting unit are provided to a single plane including the front surface of said base, thus enabling said silver-type film, and said reflective original document and said cartridge film to be loaded and ejected from said front surface and the same plane.

9. A scanner device according to claim 8, wherein the external dimensions of said base include a top plate or bottom capable of loading a flat-bed scanner device arranged to read reflective original documents of certain size including A4 size in the state of being loaded, structured such that said silver-salt-type film and said reflective original document and said cartridge film can be loaded and ejected from said front side in the state of said flat-bed scanner device being loaded to the top or to the bottom.

10. A scanner device according to claim 8, further comprising display on said front surface arranged to display the operating state of said first transporting unit and said second transporting unit and said third transporting unit.

11. A scanner device according to claim 8, further comprising display on said front surface arranged to display the state of electric power for the device.

12. A scanner device according to claim 8, further comprising:
   a cartridge film mounting unit arranged to move said cartridge film to said third transporting unit, constructed so as to be movable forwards from said front surface; and
   an operating switch for said cartridge film mounting unit provided at a certain lower position on said front surface.

13. A scanner device according to claim 8, provided with a right opening and a left opening each opening to the right and left directions on said front surface, arranged to move said silver-salt-type film to said first transporting unit, structured such that said cartridge film mounting unit and said left opening come into close proximity.

14. A scanner device according to claim 13, provided with an opening for inserting and ejecting said reflective original document to and from said second transporting unit, at a position below said right opening.

15. A scanner device, comprising:
   an image reading unit arranged to perform photo-electric conversion while running developed continuous silver-salt-type film of a plurality of continuous frames or individual silver-salt-type photography film of a single frame;
   a base which forms the external form of said scanner device; and
   transporting unit configured to run said continuous silver-salt-type film or individual silver-salt-type film relative to said image reading unit, wherein the loading and removal of said continuous and individual films occurs in the same plane including said front surface of said base,
   wherein said transporting unit comprises a right opening and a left opening each opening to the right and left directions on the front of said base or on the same surface;
   a driving unit and a driven unit positioned so as to be mutually removed by a certain spacing between said right opening and said left opening; and
   a continuous film transporting unit and slide transporting unit mounted detachably from said right opening in order to run said continuous silver-salt-type film or said individual silver-salt-type film;
   selectively using said continuous film transporting unit or said slide transporting unit structured to obtain force for said running from said driving means by filing said certain spacing.

16. A scanner device according to claim 15, wherein on one hand, said certain spacing is set to be the width dimensions of the base of said slide transporting unit plus clearance, and the front and rear walls of said base directly come into contact with said driving member and said driven member, thus enabling transporting by said driving unit and driven unit;
   and wherein on the other hand said continuous film transporting unit is arranged such that said continuous silver-salt-type film is directly brought into contact with said driving unit and said driven unit via a free roller filling said certain spacing, thus enabling transporting by said driving unit and driven unit.

17. A scanner device which reads images of a plurality of film formats as image data, said scanner device comprising:
   a plurality of film mounting unit capable of independently mounting images of said plurality of formats of film each at differing positions;
   a plurality of image processing unit arranged to independently read the images of each film mounted to said film mounting unit as image data;
   a plurality of detecting unit arranged to detect whether or not film is mounted to each of said film mounting unit; and
   forbidding unit arranged to forbid image data reading of another film by said image processing unit, in the event that one of said detecting unit detects mounted film.

18. A scanner device according to claim 17, wherein said film mounting units comprise:
   first film mounting unit capable of mounting film of a first format;
   second film mounting unit capable of mounting film of a second format;
   third film mounting unit capable of mounting film of a third format;
   wherein said image processing units comprise first image processing unit for reading as image data the image of the film of the first format mounted to said first film mounting unit;
   second image processing unit arranged to read as image data the image of the film of the second format mounted to said second film mounting unit;
   third image processing unit arranged to read as image data the image of the film of the third format mounted to said third film mounting unit;
   wherein said film detecting units comprise first film detecting unit arranged to detect whether or not film of the first format is mounted to said first film mounting unit;
   second film detecting unit arranged to detect whether or not film of the second format is mounted to said second film mounting unit;
   third film detecting unit arranged to detect whether or not film of the third format is mounted to said third film mounting unit; and
   wherein said forbidding unit forbids to read image data by said second and said third image processing units, in the event that said first detecting unit detects mounted film of said first format.

19. A scanner device according to claim 18, further comprising switching unit arranged to terminate the reading of image data of the film mounted to any of said first through said third film mounting units, and ejecting said film.

20. A scanner device according to claim 18, wherein said forbidding unit forbids mounting of film to said second and third film mounting units, in the event that said first detecting unit detects mounted film of said first format.

21. A scanner device according to claim 18, wherein the plurality of formats of film include at least the following three film types: developed 135 mm film, film stored in cartridges, and printed originals.

22. A scanner device according to claim 17, wherein, in the event that one of said detecting unit detects mounted film, and mounting of film to another of the film mounting unit is performed in this state, said forbidding unit causes image reading of the other film by the corresponding image processing unit to be performed following completion of the undergoing image processing.

23. A scanner device according to claim 17, wherein, in the event that one of said detecting unit detects mounted film, mounting of film to another of the film mounting unit is forbidden by said forbidding unit.

24. A scanner device according to claim 17, wherein the plurality of formats of film include at least the following three film types: developed 135 mm film, film stored in cartridges, and printed originals.

25. A scanner device which reads images of a plurality of film formats as image data, said scanner device comprising:

first film mounting unit capable of mounting film of a first format;

second film mounting unit capable of mounting film of a second format;

third film mounting unit capable of mounting film of a third format;

first image processing unit arranged to read as image data the image of the film of the first format mounted to said first film mounting unit;

second image processing unit arranged to read as image data the image film of the second format mounted to said second film mounting unit;

third image processing unit arranged to read as image data the image of the film of the third format mounted to said third film mounting unit;

first film detecting unit arranged to detect whether or not film of the first format is mounted to said first film mounting unit;

second film detecting unit arranged to detect whether or not film of the second format is mounted to said second film mounting unit;

third film detecting unit arranged to detect whether or not film of the third format is mounted to said third film mounting unit; and removal unit, wherein in the event that said first detecting means detects mounted film of said first format and film is mounted to said second or said third film mounting unit, the image reading by said first image processing unit is terminated, and the film of said first format is removed.

26. A scanner device according to claim 25, wherein the plurality of formats of film include at least the following three film types: developed 135 mm film, film stored in cartridges, and printed originals.

27. A scanner device according to claim 25, further comprising switching unit arranged to terminate the reading of image data of the film mounted to any of said film mounting unit, and disengaging said film.

28. A scanner device according to claim 25, wherein, in the event that said first detecting unit detects mounted film of said first format, and mounting of film to said second or third film mounting unit is preformed in this state, said forbidding unit causes image reading by the second or third image processing unit to be performed following the image processing by said first image processing unit.

* * * * *

UNITED STATES PATENT AND TRADEMARK OFFICE
CERTIFICATE OF CORRECTION

PATENT NO.   : 6,542,262 B1
DATED        : April 1, 2003
INVENTOR(S)  : Kiyoshi Tachibana et al.

It is certified that error appears in the above-identified patent and that said Letters Patent is hereby corrected as shown below:

Column 4,
Line 42, please delete "c113"

Column 30,
Please delete lines 55-67

Column 31,
Please delete lines 1-10

Signed and Sealed this

Fifth Day of April, 2005

JON W. DUDAS
*Director of the United States Patent and Trademark Office*